United States Patent
Wang et al.

(10) Patent No.: US 12,508,316 B2
(45) Date of Patent: Dec. 30, 2025

(54) SYNTHESIS OF BIOMIMETIC CELL WALL STRUCTURE

(71) Applicant: THE PENN STATE RESEARCH FOUNDATION, University Park, PA (US)

(72) Inventors: Yong Wang, State College, PA (US); Peng Shi, State College, PA (US)

(73) Assignee: THE PENN STATE RESEARCH FOUNDATION, University Park (PA)

( * ) Notice: Subject to any disclaimer, the term of this patent is extended or adjusted under 35 U.S.C. 154(b) by 1165 days.

(21) Appl. No.: 17/432,821

(22) PCT Filed: Feb. 21, 2020

(86) PCT No.: PCT/US2020/019312
§ 371 (c)(1),
(2) Date: Aug. 20, 2021

(87) PCT Pub. No.: WO2020/172590
PCT Pub. Date: Aug. 27, 2020

(65) Prior Publication Data
US 2022/0118094 A1  Apr. 21, 2022

Related U.S. Application Data

(60) Provisional application No. 62/808,358, filed on Feb. 21, 2019.

(51) Int. Cl.
| | | |
|---|---|---|
| A61K 47/26 | (2006.01) | |
| A61K 47/22 | (2006.01) | |
| A61K 47/28 | (2006.01) | |
| A61K 47/42 | (2017.01) | |

(52) U.S. Cl.
CPC .............. *A61K 47/26* (2013.01); *A61K 47/22* (2013.01); *A61K 47/28* (2013.01); *A61K 47/42* (2013.01)

(58) Field of Classification Search
CPC ........ A61K 47/26; A61K 47/22; A61K 47/28; A61K 47/42
USPC ........................................................ 536/22.1
See application file for complete search history.

(56) References Cited

U.S. PATENT DOCUMENTS

| | | | |
|---|---|---|---|
| 9,975,916 B2 * | 5/2018 | Yin | .................... C12N 15/1031 |
| 2004/0033576 A1 | 2/2004 | Sleytr et al. | |
| 2014/0011984 A1 | 1/2014 | Ralph et al. | |
| 2017/0166952 A1 * | 6/2017 | Wang | ..................... G01N 33/68 |

OTHER PUBLICATIONS

Hennink et al. Novel crosslinking methods to design hydrogels. Advanced Drug Delivery Reviews 64 (2012) 223-236. (Year: 2012).*
International Search Report and Written Opinion mailed Jun. 4, 2020 in PCT/US2020/019312 (8 pages).
Diehl et al., "Preparation And Characterization Of Lignin Protein Covalent Linkages", Publication [online], <URL: https://etda.libraries.psu.edu/files/final_submissions/9736>, pp. 1-99; abstract, p. 55, second paragraph; p. 93, third paragraph, (May 2014).
Shi, Peng et al., "DNA-Templated Synthesis Of Biomimetic Cell Wall For Nanoencapsulation And Protection Of Mammalian Cells", Nature Communications, May 20, 2019, 10:2223, pp. 1-11; https://doi.org/10.1038/s41467-019-10231-y.

\* cited by examiner

*Primary Examiner* — Yih-Horng Shiao
(74) *Attorney, Agent, or Firm* — Meunier Carlin & Curfman LLC

(57) ABSTRACT

The present invention relates generally to methods of generating a biomimetic cell wall (BCW) on a target surface, compositions comprising the BCW, and methods of use of the compositions, including biomedical applications of the BCW coated compositions.

21 Claims, 31 Drawing Sheets
Specification includes a Sequence Listing.

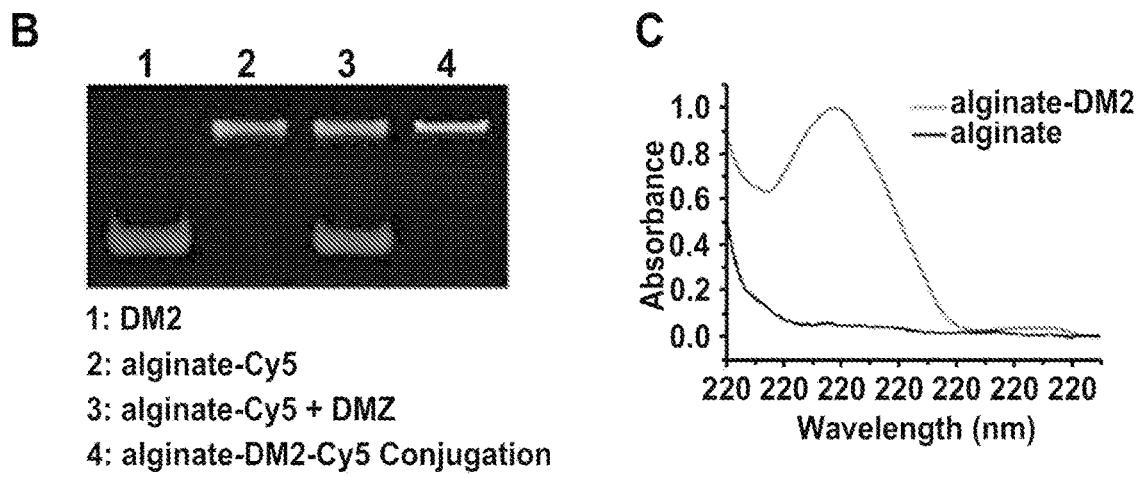
FIGS. 3B-3C
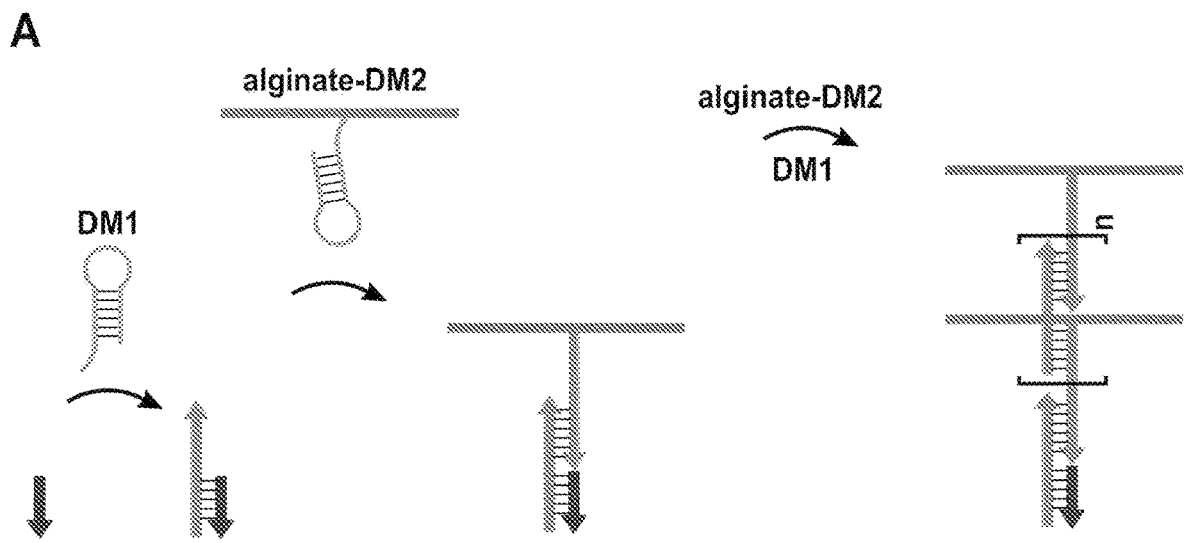
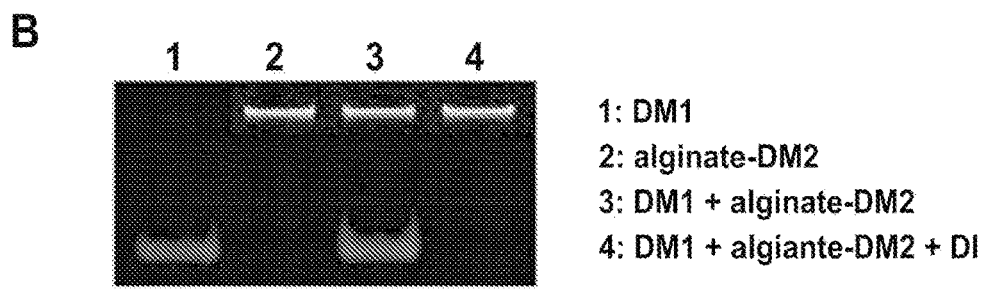
FIGS. 4A-4B

A
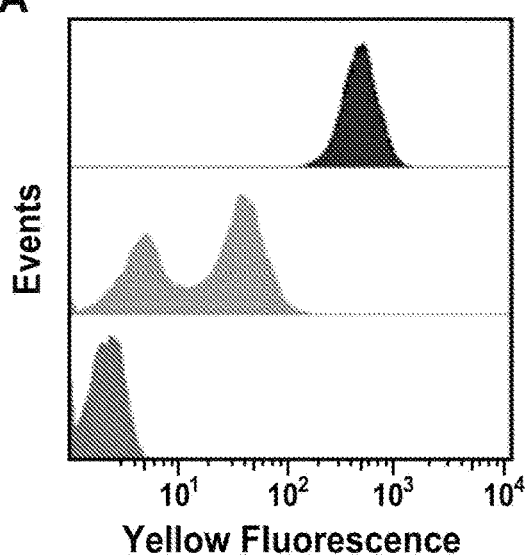 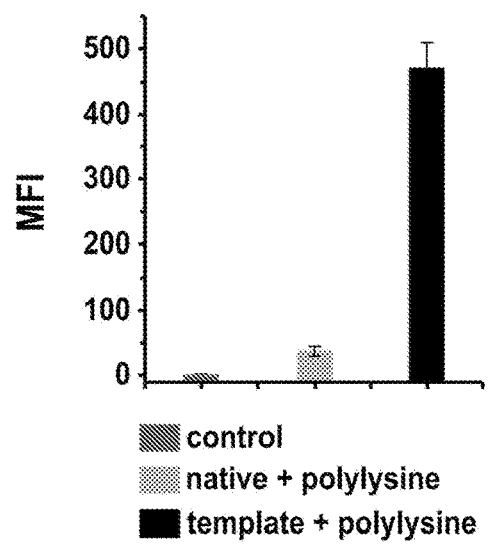
B
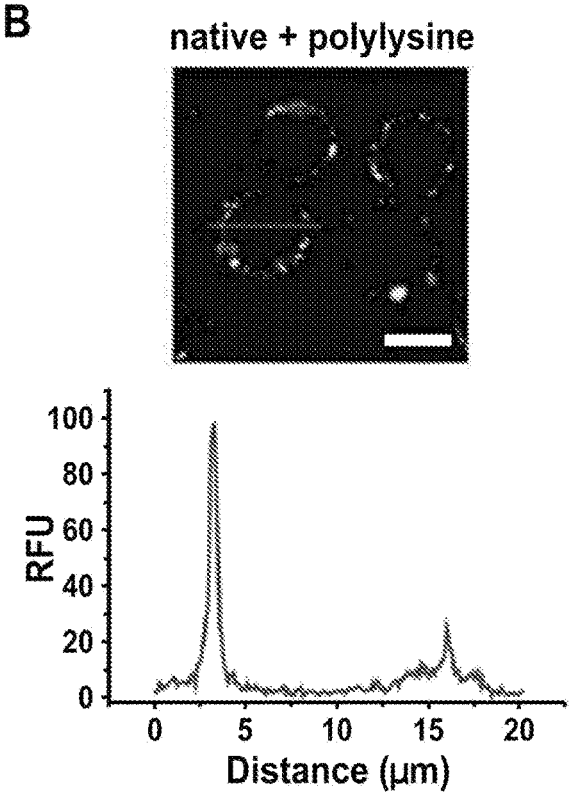 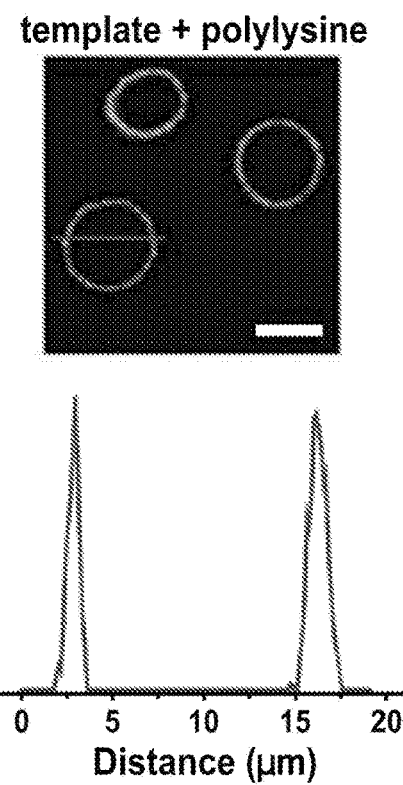
FIGS. 9A-9B

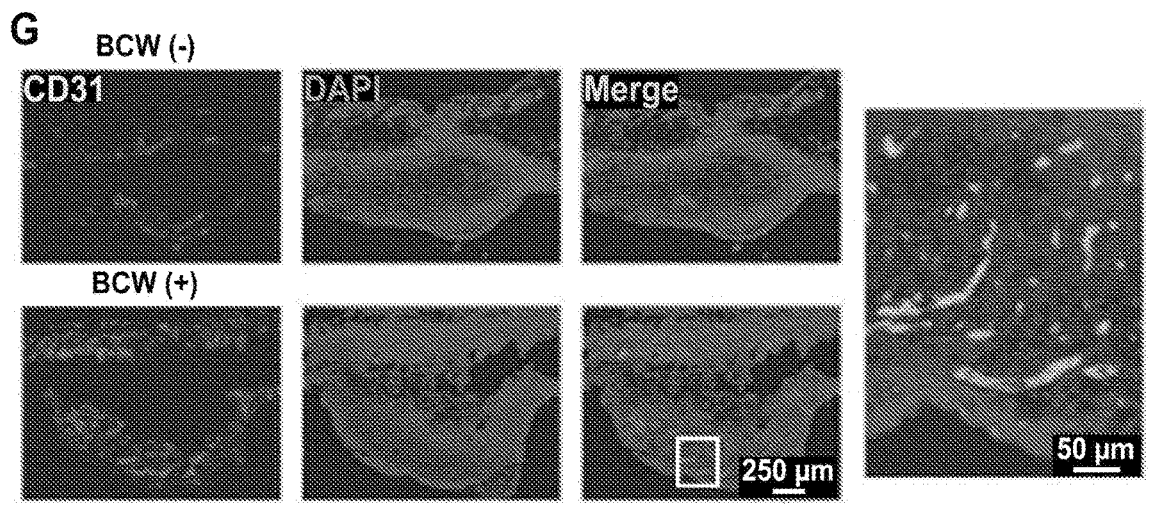
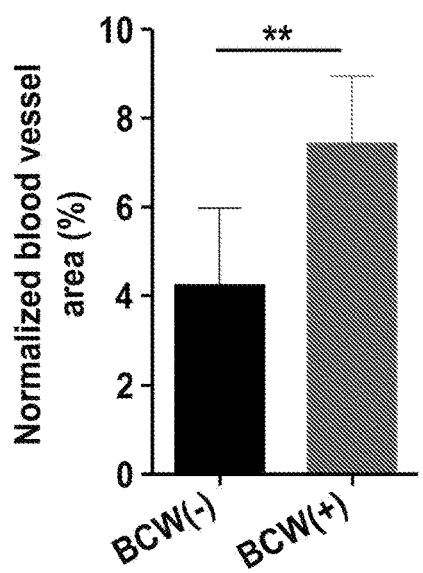
FIG. 13G
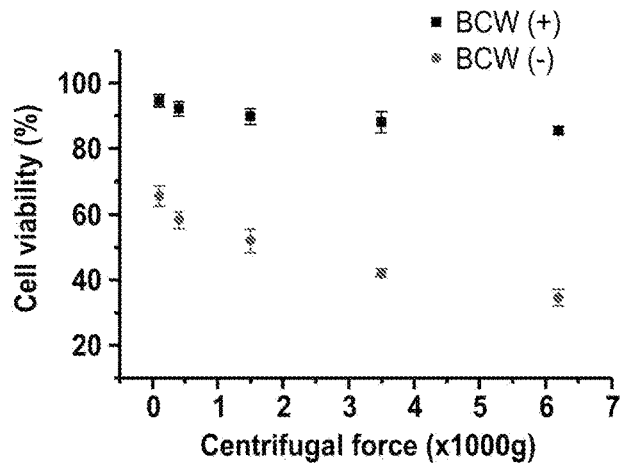
FIG. 14

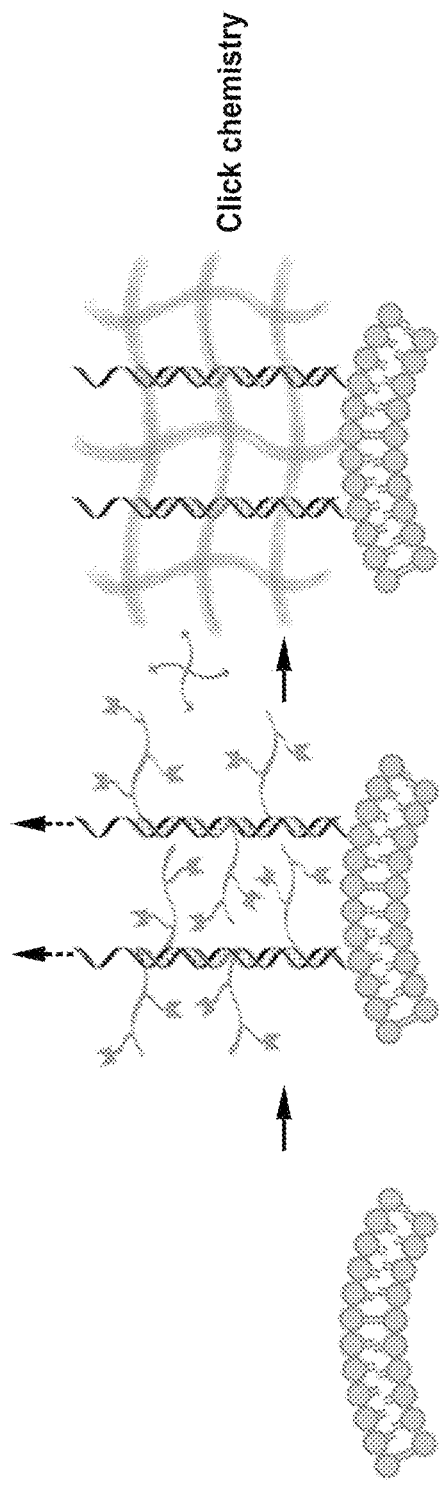
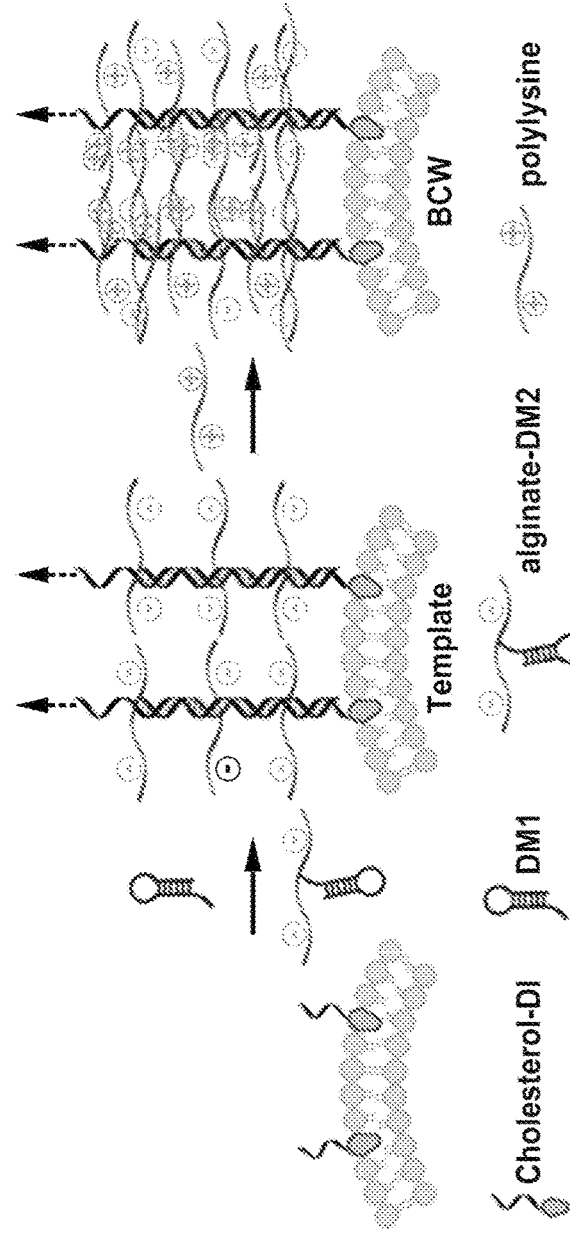
FIG. 15 CONT.
FIG. 16

A
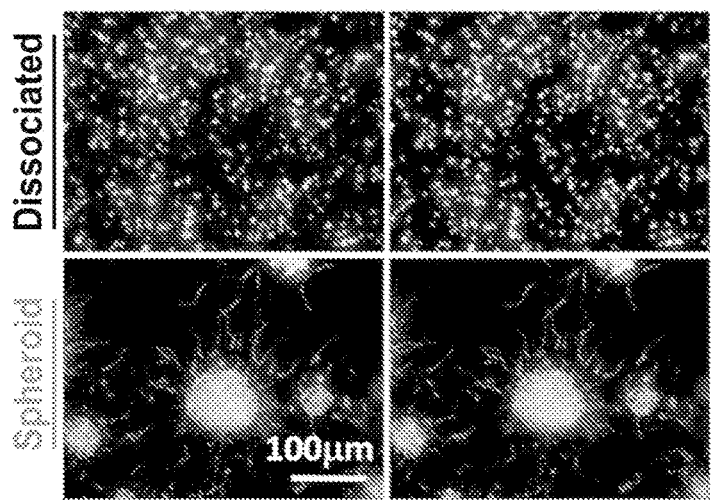 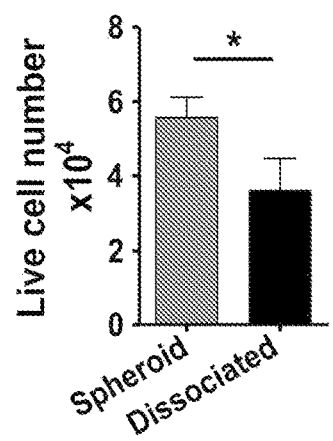
B
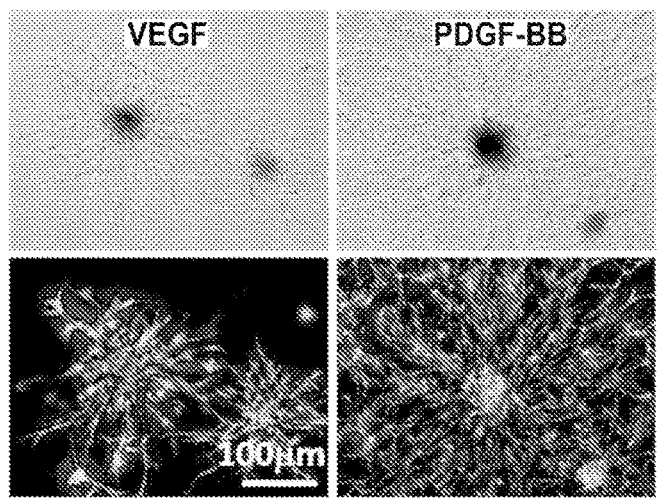 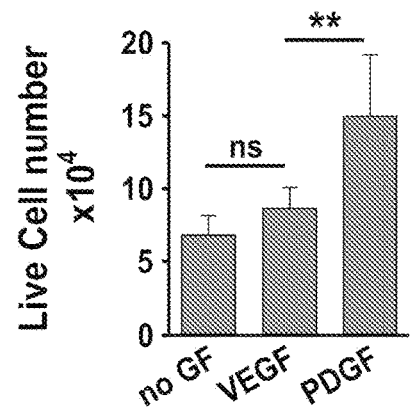
FIGS. 20A-20B

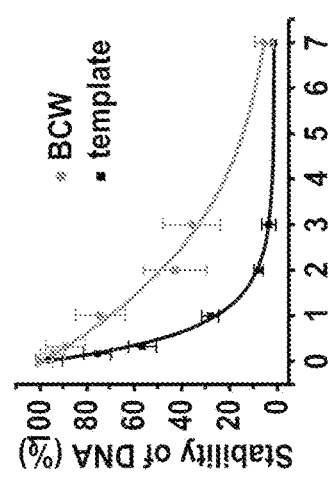
FIG. 23 (SUP FIG. 3)
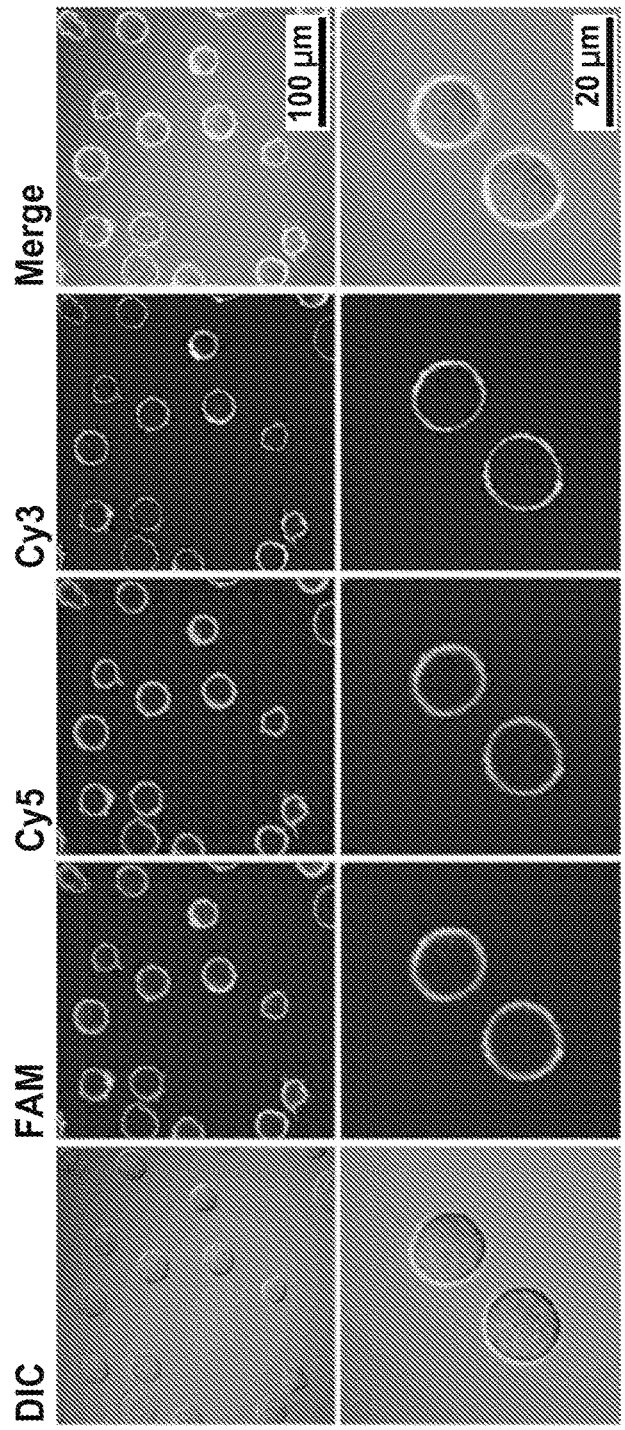
FIG. 24

| DI concentration | Number of DNA/cell | The average distance between two adjacent DNA |
|---|---|---|
| 0.1 μM | 3.3 x 10⁶ | 12.7 nm |
| 0.25 μM | 3.5 x 10⁶ | 10.8 nm |
| 0.5 μM | 3.6 x 10⁶ | 9.7 nm |
| 1 μM | 3.9 x 10⁶ | 8.2 nm |
| 2 μM | 4.3 x 10⁶ | 7.7 nm |
| 5 μM | 5.1 x 10⁶ | 7.3 nm |
| 10 μM | 5.2 x 10⁶ | 6.5 nm |

| Osmotic imbalance ($\Delta P/P^0$) | Cell viability (%) | |
|---|---|---|
| | BCW(+) | BCW(-) |
| 1/9 | 98.6±0.05 | 95.4±0.6 |
| 2/9 | 97.5±4.2 | 92.0±2.8 |
| 3/9 | 79.0±1.7 | 60.3±2.6 |
| 4/9 | 69.0±1.9 | 38.8±0.2 |
| 5/9 | 50.0±3.1 | 21.8±5.2 |
| 6/9 | 37.6±0.5 | 17.1±1.7 |
| 7/9 | 11.3±4.9 | 7.0±2.0 |
| 8/9 | 5.9±0.9 | 5.8±1.8 |

FIG. 34

| Osmotic imbalance ($\Delta P/P^0$) | Cell viability (%) | |
|---|---|---|
| | BCW(+) | BCW(-) |
| 1/9 | 98.6±0.05 | 95.4±0.6 |
| 2/9 | 97.5±4.2 | 92.0±2.8 |
| 3/9 | 79.0±1.7 | 60.3±2.6 |
| 4/9 | 69.0±1.9 | 38.8±0.2 |
| 5/9 | 50.0±3.1 | 21.8±5.2 |
| 6/9 | 37.6±0.5 | 17.1±1.7 |
| 7/9 | 11.3±4.9 | 7.0±2.0 |
| 8/9 | 5.9±0.9 | 5.8±1.8 |

SYNTHESIS OF BIOMIMETIC CELL WALL STRUCTURE

STATEMENT OF BENEFIT OF PRIORITY

This application is a United States National Phase Patent Application of International Patent Application Number PCT/US2020/019312, filed on Feb. 21, 2020, which claims the benefit of U.S. Provisional Application No. 62/808,358, filed on Feb. 21, 2019, applications which are incorporated herein by reference in their entirety.

STATEMENT REGARDING FEDERALLY SPONSORED RESEARCH OR DEVELOPMENT

This invention was made with government support under Grant No. HL122311, awarded by The National Institutes of Health. The Government has certain rights in the invention.

BACKGROUND OF THE INVENTION

Most plant and microbial cells have an exterior cell wall that has been developed during evolution with a framing structure and a crosslinked matrix. This cell wall functions as a shield to protect the cells from environmental assaults. Mammalian cells, however, do not have a cell wall. The development of methods to cover mammalian cells may lead to advanced research and applications such as biocatalysis, bioanalysis, bioproduction and transplantation (Fakhrullin et al., 2012, Chem. Soc. Rev. 41:4189-4206; Kellam et al., 2003, Chem. Soc. Rev. 32:327-337; Park et al., 2016, Chem. Res. 49:792-800). Numerous elegant methods have been studied to cast polymeric or even metallic materials on the cell surface (Park et al., 2016, Chem. Res. 49:792-800; Lim and Sun, 1980, Science 210:908-910; Niu et al., 2017, Nat. Chem. 9:537; Mao et al., 2016, Nat. Mater. 16, 236), yet their success is limited by intrinsic factors such as the involvement of harsh reactions, cell contact with toxic polymers and high material-to-cell ratios (Kellam et al., 2003, Chem. Soc. Rev. 32:327-337; Collins et al., 2015, Lab Chip 15:3439-3459; Kamperman et al., Trends Biotechnol. 36:850-865).

Thus, there is a need in the art to develop new methods for generating a biomimetic cell wall structure. The present invention satisfies this unmet need.

SUMMARY OF THE INVENTION

In one embodiment, the invention relates to a method of generating a biomimetic cell wall (BCW) structure on a surface, the method comprising generating polymerized oligonucleotide structures comprising at least one side group on the surface and crosslinking the side groups of the polymerized oligonucleotide structures. In one embodiment, the method of generating polymerized oligonucleotide structures on a surface comprises the steps of: a) contacting a surface with a first initiator oligonucleotide molecule (DI), wherein the initiator oligonucleotide molecule comprises an oligonucleotide region which is not bound to the surface and a binding region which becomes bound to the surface; b) contacting the surface with at a first DNA monomer (DM), wherein the first DM comprises an oligonucleotide sequence complementary to a region of the DI and further comprises an oligonucleotide sequence that is not complementary to the DI, such that a portion of the DM hybridizes to the DI and a portion of the DM does not hybridize to the DI; and c) contacting the surface with at a second DNA monomer (DM), wherein the second DM comprises an oligonucleotide sequence complementary to the region of the first DM which is not complementary to the DI and further comprises an oligonucleotide sequence that identical to a nucleotide sequence of the DI, such that a portion of the second DM hybridizes to the first DM and a portion of the second DM serves as a DI to initiate a next round of hybridization. In one embodiment, at least one of the first DM and the second DM is linked to a molecule which forms a side group of the polymerized oligonucleotide structure.

In one embodiment, the DI comprises an oligonucleotide molecule linked to at least one of biotin, cholesterol-TEG, an antibody, a protein, a peptide, and a receptor ligand. In one embodiment, the DI comprises a sequence as set forth in SEQ ID NO: 1.

In one embodiment, the first DM comprises a set forth in SEQ ID NO: 2 In one embodiment, the second DM comprises a sequence as set forth in SEQ ID NO: 3.

In one embodiment, the side group is selected from the group consisting of a charged side group, a free-radical polymerizable side group and a chemically reactive side group.

In one embodiment, the side group is a charged side group and the method of crosslinking comprises contacting the polymerized oligonucleotide structures with a composition comprising a charged molecule, wherein the charged molecule comprises an opposing charge to the side group. In one embodiment, the side group comprises is an anionic side group, and the method comprises contacting the polymerized oligonucleotide structures with a composition comprising a polycationic molecule. In one embodiment, the polycationic molecule is polylysine, chitosan, polyornithine, a cationic cellulose derivative; a cationic polyacrylate, DEAE-Dextran or poly(dimethylaminoethyl methacrylate). In one embodiment, the side group comprises alginate and the polycationic molecule is polylysine.

In one embodiment, the side group is a chemically reactive side group comprising at least one moiety capable of undergoing a cycloaddition reaction. In one embodiment, the moiety capable of undergoing a cycloaddition reaction is an azide or an alkyne moiety.

In one embodiment, the side group is capable of being crosslinked through free radical polymerization. In one embodiment, the side group is photopolyermizable.

In one embodiment, the invention relates to a BCW comprising crosslinked polymerized oligonucleotide structures. In one embodiment, the BCW is generated by a method comprising generating polymerized oligonucleotide structures comprising at least one side group and crosslinking the side groups of the polymerized oligonucleotide structures.

In one embodiment, the invention relates to a composition comprising a surface that has been coated with a BCW. In one embodiment, the surface is a cell surface, a tissue surface or the surface of a biomedical device.

In one embodiment, the composition is a therapeutic agent. In one embodiment, the therapeutic agent is a biodegradable microparticle or nanoparticle coated with the BCW, or a cell for administration to a subject in need thereof.

In one embodiment, the invention relates to a method of treating a disease or disorder in a subject in need thereof comprising administering to the subject a therapeutic agent comprising a surface that has been coated with a BCW.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 1A depicts a schematic illustration of BCW synthesis. HCR: hybridization chain reaction; PC: polyelectrolyte complexation. FIG. 1B depicts fluorescence imaging of the particle suspension using alginate-Cy5 and polylysine-Cy3. FIG. 1C depicts the examination of template- or BCW-covered particles incubated in fetal bovine serum (10%) using flow cytometry. FIG. 1D depicts the examination of template formation on the cell surface using flow cytometry. DM1 was labeled with FAM and alginate was labeled with Cy5. FIG. 1E depicts confocal fluorescence images of BCW on live cells. DM1, alginate and polylysine were labeled with FAM, Cy5 and Cy3, respectively. A representative line was drawn horizontally through the center of the cell for showing fluorescence distribution. Scale bar: 30 μm. FIG. 1F depicts the zeta potential of the cell surface at each step during the formation of BCW. Tem: template; PLL: polylysine; Alg: alginate. FIG. 1G depicts the examination of BCW on the cell surface using TEM. C: cytosol; N: nucleus. BCW is indicated by the arrows. Scale bar: 500 nm. Data were presented as mean±s.d, n=3.

FIG. 2A depicts the functionalization of alginate with dibenzocyclooctyne (DBCO). FIG. 2B depicts the conjugation of DM2 and Cy5 to alginate.

FIGS. 3A-3C depict the characterization of alginate-DM2 macromer. FIG. 3A depicts the $^1$H NMR spectrum of alginate before and after modification with azide. FIG. 3B depicts a gel electrophoresis image showing the effective alginate-DM2 conjugation. FIG. 3C depicts the UV/Vis absorption spectra of alginate (bottom) and alginate-DM2 macromer (top).

FIGS. 4A-4B depict the illustration and characterization of DM1 and alginate-DM2 polymerization. FIG. 4A depicts a schematic diagram of polymerization. FIG. 4B depicts a gel image demonstrating the success of the polymerization.

FIG. 5A depicts a size analysis using dynamic light scattering. The mean sizes are shown on the y axis. FIG. 5B depicts a zeta potential analysis.

FIG. 6A depicts confocal fluorescence images. Scale bar: 30 μm. FIG. 6B depicts a comparison of fluorescence intensity of alginate-Cy5 on the cell surface. FIG. 6C depicts the effect of reaction time on the number of alginate per template.

FIGS. 9A and 9B depict a comparison of native and template-covered cells in binding to polylysine. FIG. 9A depicts a flow cytometry analysis that demonstrates 1) the amount of polylysine attached on the template-covered cells was 13 times more than that on the native cells and 2) the direct binding of polylysine to the native cells was heterogeneous. FIG. 9B depicts confocal fluorescence images that confirm that the direct binding of polylysine to the native cells was heterogeneous whereas the binding of polylysine to the template-covered cells was relatively much more uniform. Scale bar: 10 μm.

FIG. 10A depicts the effect of incubation time on the amount of DI on the cell surface. The concentration of DI was 1 μM. FIG. 10B depicts the effect of DI concentration on its amount on the cell surface. The incubation time was 30 min.

FIGS. 13A-13G depict an evaluation of shielding enhancement. FIG. 13A depicts an examination of cell viability. The viability of native cells was used as 100%. 0 h: analysis of the cells right after the BCW synthesis. FIG. 13B depicts a schematic comparison of the cells covered with (bottom) or without (top) BCW when exposed to environmental assaults. FIG. 13C depicts the shielding enhancement-centrifugal force relationship. After the assault, the cells were cultured and examined with the LIVE/DEAD staining. Green: live; red: dead. Representative images were taken at the centrifugal force of 6,200 g. FIG. 13D depicts the shielding enhancement-osmotic imbalance relationship. The cells were first stained with Calcein-AM (green) and then exposed to the conditions of osmotic imbalance. Representative images of the cells incubated in the solution of 0.4% NaCl. FIG. 13E depicts an examination of cell protection by BCW from immune attack. Representative images were taken at the 2.5:1 effector/target ratio. Scale bars: 50 μm. Data were presented as mean±s.d, n=3. FIG. 13F depicts in vivo imaging of human bone marrow MSCs expressing red fluorescence protein (RFP). BF: bright field. (−): cells without BCW; (+): cells covered with BCW. FIG. 13G depicts staining of endothelial cells using anti-CD31 antibody. **, p<0.01. Data were presented as mean±s.d, n=6.

FIG. 14 depicts the effect of centrifugal force on the viability of cells covered with or without BCW.

FIG. 16 shows schematic illustration of biomolecular surface engineering. Cholesterol-conjugated DNA initiator (DI) is inserted into the cell membrane. DI initiates the assembly of DNA monomer 1 (DM1) and DM2-alginate macromer to form a supramolecular DNA template. The template directs alginate assembly and polyelectrolyte complexation (PC).

FIG. 18A shows formation of MSC spheroids. FIG. 18B shows immunostaining of MSC markers. FIG. 18C shows measurement of VEGF and PDGF-BB. ***, p<0.001. ns: not significant.

FIG. 19A shows SEM image. FIG. 19B shows fluorescence images of aFn. Hydrogel was treated with a FAM-labeled complementary sequence of the aptamer for staining. FIG. 19C shows release of VEGF and PDGF-BB from control Fn (left; no apt) and aFn (right; with apt) hydrogels. Apt: aptamer.

FIGS. 20A-20B show examination of dissociated MSCs and naked MSC spheroids in aFn. FIG. 20A shows without GF; hypoxic culture for 5 days. FIG. 20B shows with GF; hypoxic culture for 5 days. GF: growth factor (VEGF; PDGF-BB). Green/red: live/dead. *, p<0.05; **, p<0.01; ns: not significant.

FIG. 23 shows examination of the stability of DNA in the template or BCW on the particle surface. DM1 was labeled with FAM. The flow cytometry analysis was performed to examine the change of the FAM signal (indication of DNA stability) as the function of time. Data are presented as mean±standard deviation as indicated by error bars (n=3).

FIG. 24 shows confocal microscopy images of CCRF-CEM cells. DM1, alginate and polylysine were labeled with FAM, Cy5 and Cy3, respectively.

FIG. 34 shows calculation of the average distance between two adjacent DNA templates. The distance was calculated using the imdistline matlab function. 10 pairs of adjacent dots were randomly chosen to calculate the average distance. Specifically, the cell was assumed as a sphere with a radius of 6 μm to calculate the total surface area of a cell. As one DNA initiator was assumed to induce the formation of one DNA template, we got N templates randomly distributed on the cell surface. One dot represented one DNA initiator or template. Thus, N dots represented how many DNA initiators or templates were distributed onto the surface area of a cell in the calculation.

DETAILED DESCRIPTION

Figures 1A, 1B, 1C:
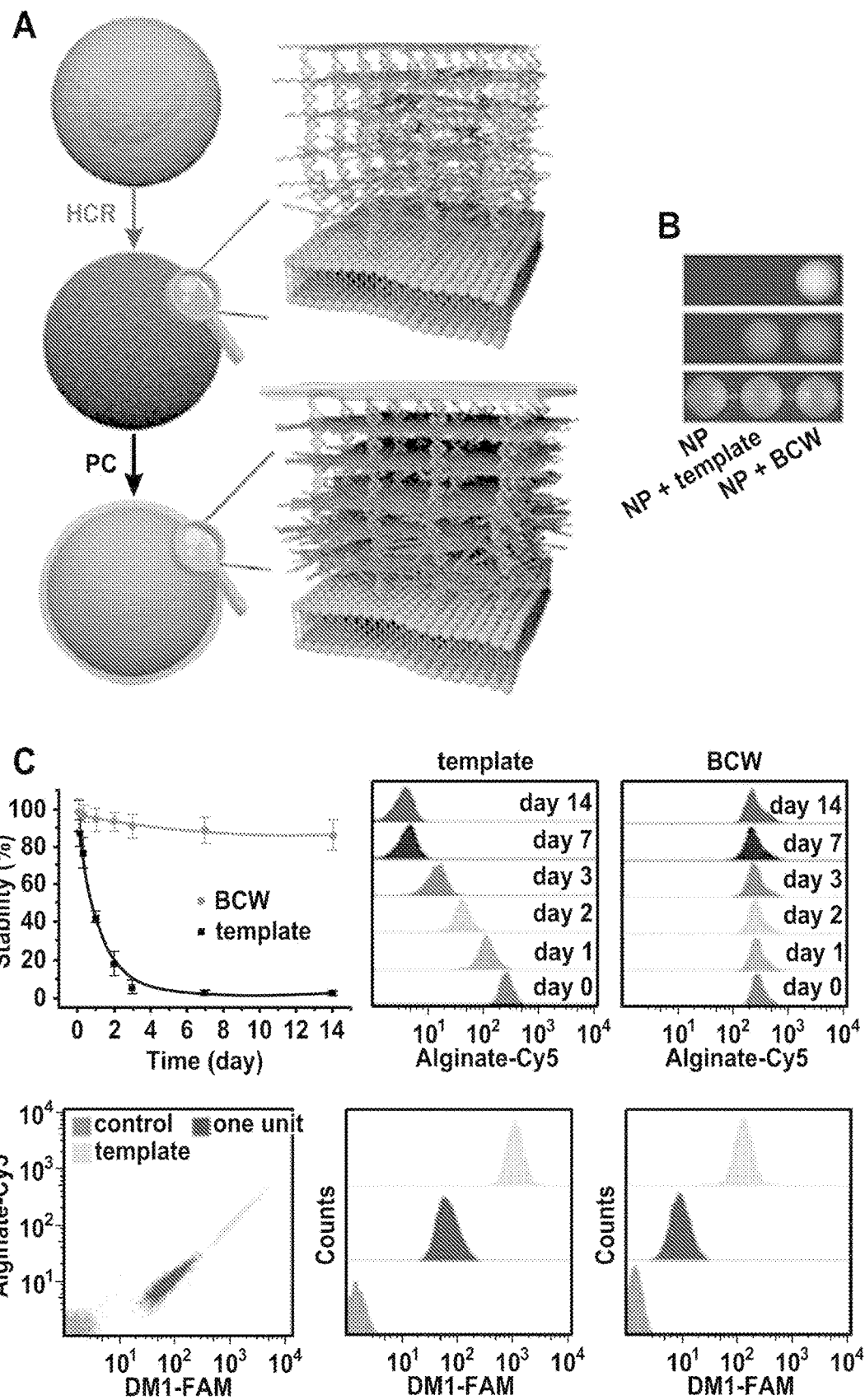
FIGS. 1A-1G depict the synthesis and characterization of BCW on mammalian cells.

The present invention relates generally to compositions comprising biomimetic cell wall (BCW) structures, methods of generating the compositions, and method of use of the compositions. The present invention is based, at least in part, on the design of nucleic acid oligonucleotides such that they can be used as molecular building blocks which can be assembled (polymerized) to form polymerized oligonucleotide structures with extending side groups that can be crosslinked to form a BCW coating on a surface.

In one embodiment, the invention allows generation of a BCW on any surface to which the initiating oligonucleotide monomer can be attached, including, but not limited to the surface of a cell, a tissue, a microparticle, a nanoparticle, and a biomedical device. In one embodiment, the BCW of the invention provides protection of the coated substance from the immune response.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

It is also to be understood that the terminology used herein is for the purpose of describing particular embodiments only, and is not intended to be limiting.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, or ±10%, or ±5%, or ±1%, or ±0.1% from the specified value, as such variations are appropriate to perform the disclosed methods.

The terms "biomarker" and "marker" are used herein interchangeably. They refer to a substance that is a distinctive indicator of a biological process, biological event and/or pathologic condition.

"Complementary" as used herein to refer to a nucleic acid, refers to the broad concept of sequence complementarity between regions of two nucleic acid strands or between two regions of the same nucleic acid strand. It is known that an adenine residue of a first nucleic acid region is capable of forming specific hydrogen bonds ("base pairing") with a residue of a second nucleic acid region which is antiparallel to the first region if the residue is thymine or uracil. Similarly, it is known that a cytosine residue of a first nucleic acid strand is capable of base pairing with a residue of a second nucleic acid strand which is antiparallel to the first strand if the residue is guanine. A first region of a nucleic acid is complementary to a second region of the same or a different nucleic acid if, when the two regions are arranged in an antiparallel fashion, at least one nucleotide residue of the first region is capable of base pairing with a residue of the second region. Preferably, the first region comprises a first portion and the second region comprises a second portion, whereby, when the first and second portions are arranged in an antiparallel fashion, at least about 50%, and preferably at least about 75%, at least about 90%, or at least about 95% of the nucleotide residues of the first portion are capable of base pairing with nucleotide residues in the second portion. More preferably, all nucleotide residues of the first portion are capable of base pairing with nucleotide residues in the second portion.

As used herein, "conjugated" refers to covalent attachment of one molecule to a second molecule.

"Contacting" refers to a process in which two or more molecules or two or more components of the same molecule or different molecules are brought into physical proximity such that they are able undergo an interaction. Molecules or components thereof may be contacted by combining two or more different components containing molecules, for example by mixing two or more solution components, preparing a solution comprising two or more molecules such as target, candidate or competitive binding reference molecules, and/or combining two or more flowing components. Alternatively, molecules or components thereof may be contacted combining a fluid component with molecules immobilized on or in a substrate, such as a polymer bead, a membrane, a polymeric glass substrate or substrate surface derivatized to provide immobilization of target molecules, candidate molecules, competitive binding reference molecules or any combination of these. Molecules or components thereof may be contacted by selectively adjusting solution conditions such as, the composition of the solution, ion strength, pH or temperature. Molecules or components thereof may be contacted in a static vessel, such as a microwell of a microarray system, or a flow-through system, such as a microfluidic or nanofluidic system. Molecules or components thereof may be contacted in or on a variety of media, including liquids, solutions, colloids, suspensions, emulsions, gels, solids, membrane surfaces, glass surfaces, polymer surfaces, vesicle samples, bilayer samples, micelle samples and other types of cellular models or any combination of these.

The term "depolymerization" as used herein includes the process of two DNA sequences attaching together through hybridization such that one of the DNA sequences which was previously hybridized in a polymerization of DNA oligonucleotides is now hybridized to a single oligonucleotide and no longer is a participant in the dsDNA polymerization product.

The term "DNA" as used herein is defined as deoxyribonucleic acid.

The term "ssDNA" includes a single free strand of polymerized deoxyribonucleic acids consisting of repeated polymer bases of adenine (A), cytosine (C), guanine (G), and/or thymine (T), where each strand has directionality and runs from five prime (5') to three prime (3').

The term "dsDNA" includes a complex of two ssDNA strands that are hybridized to each other in a complimentary fashion (adenine:thymine and cytosine:guanine), the two strands run anti-parallel to each other and form a helical structure, such that at any given end a 5'-end from one strand and a 3'-end from another strand are present. As used herein, the term "dsDNA" includes pseudo-dsDNA molecules.

"Homologous, homology" or "identical, identity" as used herein, refer to comparisons among amino acid and nucleic acid sequences. When referring to nucleic acid molecules, "homology," "identity," or "percent identical" refers to the percent of the nucleotides of the subject nucleic acid sequence that have been matched to identical nucleotides by a sequence analysis program. Homology can be readily calculated by known methods. Nucleic acid sequences and amino acid sequences can be compared using computer programs that align the similar sequences of the nucleic or amino acids and thus define the differences. In preferred methodologies, the BLAST programs (NCBI) and parameters used therein are employed, and the ExPaSy is used to align sequence fragments of genomic DNA sequences. However, equivalent alignment assessments can be obtained through the use of any standard alignment software.

The term "hybridization" refers to the process in which two single-stranded nucleic acids bind non-covalently to form a double-stranded nucleic acid; triple-stranded hybridization is also theoretically possible. Complementary sequences in the nucleic acids pair with each other to form a double helix. The resulting double-stranded nucleic acid is a "hybrid." Hybridization may be between, for example, two complementary or partially complementary sequences. The hybrid may have double-stranded regions and single stranded regions. The hybrid may be, for example, DNA:DNA, RNA:DNA or DNA:RNA. Hybrids may also be formed between modified nucleic acids. One or both of the nucleic acids may be immobilized on a solid support. Hybridization techniques may be used to detect and isolate specific sequences, measure homology, or define other characteristics of one or both strands.

The stability of a hybrid depends on a variety of factors including the length of complementarity, the presence of mismatches within the complementary region, the temperature and the concentration of salt in the reaction.

A first oligonucleotide anneals with a second oligonucleotide with "high stringency" if the two oligonucleotides anneal under conditions whereby only oligonucleotides which are at least about 75%, and preferably at least about 90% or at least about 95%, complementary anneal with one another. The stringency of conditions used to anneal two oligonucleotides is a function of, among other factors, temperature, ionic strength of the annealing medium, the incubation period, the length of the oligonucleotides, the G-C content of the oligonucleotides, and the expected degree of non-homology between the two oligonucleotides, if known.

As used herein, an "immunoassay" refers to any binding assay that uses an antibody capable of binding specifically to a target molecule to detect and quantify the target molecule.

The term "interact" or "interaction" refers to a measurable chemical or physical interaction between a target molecule and a candidate molecule that is capable of affecting the structure and/or composition of a target molecule, a candidate molecule or both such that the biological activity of the target molecule, the candidate molecule or both is affected. Interactions capable of affecting the structure and/or composition of a molecule include, but are not limited to, reactions resulting in the formation of one or more covalent bonds, resulting in the breaking of one or more covalent bonds, electrostatic associations and repulsions, formation and/or disruption of hydrogen bonds, formation and/or disruption of electrostatic forces such as dipole-dipole interactions, formation and/or disruption of van der Waals interactions or processes comprising combinations of these.

"Measuring" or "measurement," or alternatively "detecting" or "detection," means assessing the presence, absence, quantity or amount (which can be an effective amount) of either a given substance within a clinical or subject-derived sample, including the derivation of qualitative or quantitative concentration levels of such substances, or otherwise evaluating the values or categorization of a subject's clinical parameters.

The term "nucleotide base," as used herein, refers to a substituted or unsubstituted aromatic ring or rings. In certain embodiments, the aromatic ring or rings contain at least one nitrogen atom. In certain embodiments, the nucleotide base is capable of forming Watson-Crick and/or Hoogsteen hydrogen bonds with an appropriately complementary nucleotide base. Exemplary nucleotide bases and analogs thereof include, but are not limited to, naturally occurring nucleotide bases adenine, guanine, cytosine, 6 methyl-cytosine, uracil, thymine, and analogs of the naturally occurring nucleotide bases, e.g., 7-deazaadenine, 7-deazaguanine, 7-deaza-8-azaguanine, 7-deaza-8-azaadenine, N6 delta 2-isopentenyladenine (6iA), N6-delta 2-isopentenyl-2-methylthioadenine (2 ms6iA), N2-dimethylguanine (dmG), 7methylguanine (7mG), inosine, nebularine, 2-aminopurine, 2-amino-6-chloropurine, 2,6-diaminopurine, hypoxanthine, pseudouridine, pseudocytosine, pseudoisocytosine, 5-propynylcytosine, isocytosine, isoguanine, 7-deazaguanine, 2-thiopyrimidine, 6-thioguanine, 4-thiothymine, 4-thiouracil, 06-methylguanine, N6-methyladenine, 04-methylthymine, 5,6-dihydrothymine, 5,6-dihydrouracil, pyrazolo[3,4-D]pyrimidines (see, e.g., U.S. Pat. Nos. 6,143,877 and 6,127,121 and PCT published application WO 01/38584), ethenoadenine, indoles such as nitroindole and 4-methylindole, and pyrroles such as nitropyrrole. Certain exemplary nucleotide bases can be found, e.g., in Fasman, 1989, Practical Handbook of Biochemistry and Molecular Biology, pp. 385-394, CRC Press, Boca Raton, Fla., and the references cited therein.

The term "nucleotide," as used herein, refers to a compound comprising a nucleotide base linked to the C-1' carbon of a sugar, such as ribose, arabinose, xylose, and pyranose, and sugar analogs thereof. The term nucleotide also encompasses nucleotide analogs. The sugar may be substituted or unsubstituted. Substituted ribose sugars include, but are not limited to, those riboses in which one or more of the carbon atoms, for example the 2'-carbon atom, is substituted with one or more of the same or different Cl, F, —R, —OR, —NR2 or halogen groups, where each R is independently H, C1-C6 alkyl or C5-C14 aryl. Exemplary riboses include, but are not limited to, 2'-(C1-C6)alkoxyribose, 2'-(C5-C14)aryloxyribose, 2',3'-didehydroribose, 2'-deoxy-3'-haloribose, 2'-deoxy-3'-fluororibose, 2'-deoxy-3'-chlororibose, 2'-deoxy-3'-aminoribose, 2'-deoxy-3'-(C1-C6)alkylribose, 2'-deoxy-3'-(C1-C6)alkoxyribose and 2'-deoxy-3'-(C5-C14)aryloxyribose, ribose, 2'-deoxyribose, 2',3'-dideoxyribose, 2'-haloribose, 2'-fluororibose, 2'-chlororibose, and 2'-alkylribose, e.g., 2'-O-methyl, 4'-anomeric nucleotides, 1'-anomeric nucleotides, 2'-4'- and 3'-4'-linked and other "locked" or "LNA", bicyclic sugar modifications (see, e.g., PCT published application nos. WO 98/22489, WO 98/39352; and WO 99/14226). The term "nucleic acid" typically refers to large polynucleotides.

The term "oligonucleotide" typically refers to short polynucleotides, generally, no greater than about 50 nucleotides. It will be understood that when a nucleotide sequence is represented by a DNA sequence (i.e., A, T, G, C), this also includes an RNA sequence (i.e., A, U, G, C) in which "U" replaces "T." The term "oligonucleotide" includes a DNA molecule having from 8 bases to 1000 bases in length and being single stranded.

The term "overhang," as used herein, refers to terminal non-base pairing nucleotide(s) resulting from one strand or region extending beyond the terminus of the complementary strand to which the first strand or region forms a duplex. One or more polynucleotides that are capable of forming a duplex through hydrogen bonding can have overhangs. The single-stranded region extending beyond the 3' end of the duplex is referred to as an overhang.

The terms "patient," "subject," "individual," and the like are used interchangeably herein, and refer to any animal, or cells thereof whether in vitro or in situ, amenable to the methods described herein. In certain non-limiting embodiments, the patient, subject or individual is a human.

The term "polymerization hybridization" includes the process of two DNA sequences attaching together through hybridization in a repeating fashion to create a double stranded DNA strand longer than either of the individual sequences.

The term "polynucleotide" as used herein is defined as a chain of nucleotides. Furthermore, nucleic acids are polymers of nucleotides. Thus, nucleic acids and polynucleotides as used herein are interchangeable. One skilled in the art has the general knowledge that nucleic acids are polynucleotides, which can be hydrolyzed into the monomeric "nucleotides." The monomeric nucleotides can be hydrolyzed into nucleosides. As used herein polynucleotides include, but are not limited to, all nucleic acid sequences which are obtained by any means available in the art, including, without limitation, recombinant means, i.e., the cloning of nucleic acid sequences from a recombinant library or a cell genome, using ordinary cloning and amplification technology, and the like, and by synthetic means. An "oligonucleotide" as used herein refers to a short polynucleotide, typically less than 100 bases in length.

Conventional notation is used herein to describe polynucleotide sequences: the left-hand end of a single-stranded polynucleotide sequence is the 5'-end. The DNA strand having the same sequence as an mRNA is referred to as the "coding strand"; sequences on the DNA strand which are located 5' to a reference point on the DNA are referred to as "upstream sequences"; sequences on the DNA strand which are 3' to a reference point on the DNA are referred to as "downstream sequences." In the sequences described herein:
A=adenine,
G=guanine,
T=thymine,
C=cytosine, The skilled artisan will understand that all nucleic acid sequences set forth herein throughout in their forward orientation, are also useful in the compositions and methods of the invention in their reverse orientation, as well as in their forward and reverse complementary orientation, and are described herein as well as if they were explicitly set forth herein.

The term "probe" as used herein refers to nucleic acid oligomers prepared using a solid support or amidite of the invention. In various embodiments, the probes produce a detectable response upon interaction with a binding partner. The probes include at least one detectable moiety, or a pair of moieties that form an energy transfer pair detectable upon some change of state of the probe in response to its interaction with a binding partner.

The term "pseudo-dsDNA" as used herein includes any base-paired DNA molecule that is not fully paired. It will be understood that pseudo-dsDNA molecules may contain nicks, gaps (regions of ssDNA) or un-hybridized ssDNA side groups interspersed among dsDNA regions.

The term "sequence" includes the specific nucleotide base configuration in a linear 5-prime to 3-prime order.

The term "side group" as used herein, refers to unhybridized ssDNA regions that extend from a pseudo-dsDNA polymerization product. The term "side group" includes ssDNA regions having between 1 and 40 nucleotides.

In some instances, the terms "specific binding" or "specifically binding", can be used in reference to the interaction of an antibody, a protein, or a peptide with a second chemical species, to mean that the interaction is dependent upon the presence of a particular structure (e.g., an antigenic determinant or epitope) on the chemical species; for example, an antibody recognizes and binds to a specific protein structure rather than to proteins generally. If an antibody is specific for epitope "A", the presence of a molecule containing epitope A (or free, unlabeled A), in a reaction containing labeled "A" and the antibody, will reduce the amount of labeled A bound to the antibody.

The term "strand" includes oligonucleotide.

The term "structure" as used herein refers any formation of polymerized oligonucleotides or pseudo-dsDNA molecule that is formed from a polymerization hybridization reaction.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

Polymerizable oligonucleotide molecules that can be crosslinked to generate a biomimetic cell wall (BCW) structure are disclosed, as well as methods of generating a BCW on a surface, and methods of using such BCWs for modifying surfaces such as cell surfaces or biomedical devices.

BCW Composition

The BCW matrix of the invention comprises polymerized oligonucleotide structures with side chains that can be crosslinked to form the BCW. The polymerized oligonucleotide structures are generated through polymerization of oligonucleotide monomers.

Polymerized Oligonucleotide Structures

In one embodiment, polymerization is initiated at a surface by a ssDNA oligonucleotide, referred to herein as a DNA polymerization initiator or DI. In one embodiment, the DI serves to localize a polymerization reaction to a molecule or surface of interest. In one embodiment, the polymerization reaction results in a dsDNA product complexed to the surface or molecule of interest. In one embodiment, the DI is linked to a molecule for binding to a target surface. Molecules for binding to a target surface include, but are not limited to, biotin, cholesterol-TEG, antibodies, proteins, peptides, and receptor ligands. DI can also be attached onto a target surface through chemical reactions. For example, an alkyne modified DI can be linked to an azide-displayed surface.

In one embodiment, a polymerized oligonucleotide structure is generated through repeated hybridization of DNA monomers (DM) to a growing oligonucleotide polymer initiated from the DI. In one embodiment, polymerization requires interaction of one or more DM with the DI. In one embodiment, a mixture of DM is required for a polymerization reaction, for example, a mixture of a first DM having (a) a first region having a nucleotide sequence that binds to a region of the DI and (b) a second having a nucleotide sequence that binds to a region of a second DM, and a second DM having (a) a first region having a nucleotide sequence that binds to the second region of the first DM and (b) a second having a nucleotide sequence that binds to the first region of the first DM.

In one embodiment, one or more of the DM include regions that do not participate in the polymerization reaction. In this embodiment, the regions form unhybridized side groups extending from the polymerized oligonucleotide structure. In one embodiment, the side groups may be oligonucleotide based side groups, peptide based side groups or small molecule side groups. In various embodiments, the side groups are necessary for crosslinking the polymerized oligonucleotide structures to generate the BCW. Exemplary molecules that can be linked to a DM monomer to function as side groups include, but are not limited to, biocompatible polymers such as natural polymers like collagen, fibrin, heparin and heparan sulfate, or synthetic polymers like polyethylene glycol, small molecules, such as dibenzocyclooctyne (DBCO), and anionic or cationic molecules, such as alginate. For example, in one embodiment, at least one DM monomer may comprise a nucleic acid oligonucleotide linked to DBCO (DNA-DBCO), such that after polymerization the polymerized oligonucleotide structure comprises at least one DBCO side group. In one embodiment, at least one DM monomer or DNA-DBCO monomer be linked to alginate to form an alginate-DM macromer, such that after polymerization the polymerized oligonucleotide structure comprises at least one alginate side group.

In one embodiment, a polymerized oligonucleotide structure is formed by contacting an initiating oligonucleotide comprising a sequence as set forth in SEQ ID NO: 1 with a mixture of DNA hairpin monomers in which one DNA hairpin monomer comprises an oligonucleotide sequence as set forth in SEQ ID NO: 2 and a second DNA hairpin monomer comprises an oligonucleotide sequence as set forth in SEQ ID NO: 3.

BCW Formation

The BCW of the invention is formed through crosslinking the side groups of the polymerized oligonucleotide structure. Crosslinking of the side groups can be performed by various methods depending on the type of side group, including but not limited to, through polyelectrolyte complexation, free-radical polymerization, through the use of chemically reactive side groups, or through a combination of these methods.

Polyelectrolyte Complexation

In one embodiment, the side groups of the polymerized oligonucleotide structure are charged such that they can be crosslinked through polyelectrolyte complexation. In one embodiment, the side groups are anionic side groups which are crosslinked using a polycationic molecule, to form a matrix structure with a backbone formed of polymerized oligonucleotides. In one embodiment, the side groups are cationic side groups which are crosslinked using a polyanionic molecule.

Polycationic polymers refer to natural or synthetic polymers that have a positive charge. Exemplary polycations that can be used as side groups or for crosslinking anionic side groups include, but are not limited to, polyethyleneimine (PEI), poly(amidoamine), poly (hexa-methylenebiguanide) (PHMB), polylysine, chitosan, polyornithine, cationic cellulose derivatives; cationic polyacrylates, DEAE-Dextran, and poly(dimethylaminoethyl methacrylate).

Polyanionic polymers refer to natural or synthetic polymers that have a negative charge and can include families of repeat units, such as maleic, itaconic, and sulfonate repeat units. Exemplary polyanions that can be used as side groups or for crosslinking cationic side groups include, but are not limited to, poly-γ-glutamic acid, dextran sulfate (DX), pentosan polysulfate (PS), dermatan sulfate (DS), chondroitin sulfate (CS), keratan sulfate (KS), heparan sulfate (HS), heparin (HN), alginate (AL), carrageenan, xanthan gum, carboxymethylcellulose (CMC), CARBOPOL®, anionic polyalkylene oxide derivatives, anionic polyalkylene glycol derivatives such as methoxypoly(ethylene glycol) sulfonate (MPEG sulfonate), polycarboxylic acids, anionic surfactants, anionic phospholipids, and carboxyalkylcelluloses. In one exemplary embodiment, the side groups are alginate side groups and the BCW matrix is formed through crosslinking of the side groups with polylysine polymers.

Other biocompatible polymers suitable for use in the formation of the disclosed BCW include but are not limited to polysaccharides such as hyaluronic acid; hydrophilic polypeptides; proteins such as collagen, fibrin, and gelatin; poly(amino acids) such as poly-L-glutamic acid (PGS), gamma-polyglutamic acid, poly-L-aspartic acid, poly-L-serine, or poly-L-lysine; polyalkylene glycols and polyalkylene oxides such as polyethylene glycol (PEG), polypropylene glycol (PPG), and poly(ethylene oxide) (PEO); poly(oxyethylated polyol); poly(olefinic alcohol); polyvinylpyrrolidone); poly(hydroxyalkylmethacrylamide); poly(hydroxyalkylmethacrylate); poly(saccharides); poly(hydroxy acids); poly(vinyl alcohol), polyhydroxyacids such as poly(lactic acid), poly (gly colic acid), and poly (lactic acid-co-glycolic acids); polyhydroxyalkanoates such as poly3-hydroxybutyrate or poly4-hydroxybutyrate; polycaprolactones; poly (orthoesters); polyanhydrides; poly(phosphazenes); poly (lactide-co-caprolactones); polycarbonates such as tyrosine polycarbonates; polyamides (including synthetic and natural polyamides), polypeptides, and poly(amino acids); polyesteramides; polyesters; poly(dioxanones); poly(alkylene alkylates); hydrophobic polyethers; polyurethanes; polyetheresters; polyacetals; polycyanoacrylates; polyacrylates; polymethylmethacrylates; polysiloxanes; poly(oxyethylene)/poly(oxypropylene) copolymers; polyketals; polyphosphates; polyhydroxyvalerates; polyalkylene oxalates; polyalkylene succinates; poly(maleic acids), as well as copolymers thereof. Biocompatible polymers can also include polyamides, polycarbonates, polyalkylenes, polyalkylene glycols, polyalkylene oxides, polyalkylene terephthalates, polyvinyl alcohols (PVA), methacrylate PVA (m-PVA), polyvinyl ethers, polyvinyl esters, polyvinyl halides, polyvinylpyrrolidone, polyglycolides, polysiloxanes, polyurethanes and copolymers thereof, alkyl cellulose, hydroxyalkyl celluloses, cellulose ethers, cellulose esters, nitro celluloses, polymers of acrylic and methacrylic esters, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, cellulose sulphate sodium salt, poly (methyl methacrylate), poly(ethylmethacrylate), poly(butylmethacrylate), poly(isobutylmethacrylate), poly(hexlmethacrylate), poly(isodecylmethacrylate), poly(lauryl methacrylate), poly (phenyl methacrylate), poly (methyl acrylate), poly(isopropyl acrylate), poly(isobutyl acrylate), poly(octadecyl acrylate), polyethylene, polypropylene, poly(ethylene glycol), poly(ethylene oxide), poly (ethylene terephthalate), poly(vinyl alcohols), poly(vinyl acetate, poly vinyl chloride polystyrene and polyvinylpryrrolidone, derivatives thereof, linear and branched copolymers and block copolymers thereof, and blends thereof. Exemplary biodegradable polymers include polyesters, poly (ortho esters), poly(ethylene amines), poly(caprolactones), poly(hydroxybutyrates), poly(hydroxyvalerates), polyanhydrides, poly(acrylic acids), polyglycolides, poly(urethanes), polycarbonates, polyphosphate esters, polyphospliazenes, derivatives thereof, linear and branched copolymers and block copolymers (including triblock copolymers) thereof, and blends thereof.

In some embodiments the particle contains biocompatible and/or biodegradable polyesters or polyanhydrides such as poly(lactic acid), poly(glycolic acid), and poly(lactic-co-glycolic acid). The particles can contain one more of the following polyesters: homopolymers including glycolic acid units, referred to herein as "PGA", and lactic acid units, such as poly-L-lactic acid, poly-D-lactic acid, poly-D,L-lactic acid, poly-L-lactide, poly-D-lactide, and poly-D,L-lactide5 collectively referred to herein as "PLA", and caprolactone units, such as poly(e-caprolactone), collectively referred to herein as "PCL"; and copolymers including lactic acid and glycolic acid units, such as various forms of poly(lactic acid-co-glycolic acid) and poly(lactide-co-glycolide) characterized by the ratio of lactic acid:glycolic acid, collectively referred to herein as "PLGA"; and polyacrylates, and derivatives thereof. Exemplary polymers also include copolymers of polyethylene glycol (PEG) and the aforementioned polyesters, such as various forms of PLGA-PEG or PLA-PEG copolymers, collectively referred to herein as "PEGylated polymers". In certain embodiments, the PEG region can be covalently associated with polymer to yield "PEGylated polymers" by a cleavable linker. In one aspect, the polymer comprises at least 60, 65, 70, 75, 80, 85, 89, 90, 91, 92, 93, 94, 95, 96, 97, 98, or 99 percent acetal pendant groups.

The triblock copolymers disclosed herein comprise a core polymer such as, example, polyethylene glycol (PEG), polyvinyl acetate, polyvinyl alcohol, polyvinyl pyrrolidone (PVP), polyethyleneoxide (PEO), poly(vinyl pyrrolidone-co-vinyl acetate), polymethacrylates, polyoxyethylene alkyl ethers, polyoxyethylene castor oils, polycaprolactam, polylactic acid, polyglycolic acid, poly(lactic-glycolic) acid, poly(lactic co-glycolic) acid (PLGA), cellulose derivatives, such as hydroxymethylcellulose, hydroxypropylcellulose and the like.

Free Radical Polymerization

In one embodiment, the side groups of the polymerized oligonucleotides can be crosslinked directly or indirectly through free radical polymerization. In one embodiment, the side groups of the polymerized oligonucleotide structure are photopolymerizable with light alone or in the presence of an initiator and/or catalyst, such as a free radical photoinitiator, wherein the light is in the visible or long wavelength ultraviolet range, that is, greater than or equal to 320 nm. Other reactive conditions may also be suitable to initiate free radical polymerization. In one embodiment, the catalyst or free radical initiator is non-toxic under the conditions of use. Photopolymerizable substituents that can be included in a side group of the invention to allow for free radical polymerization of the BCW include acrylates, diacrylates, oligoacrylates, dimethacrylates, or oligomethoacrylates, and other biologically acceptable photopolymerizable groups.

Any dye which absorbs light having a frequency between 320 nm and 900 nm, can form free radicals, is at least partially water soluble, and is non-toxic to the biological material at the concentration used for polymerization can be used for initiating free radical polymerization of the BCW. There are a large number of photosensitive dyes that can be used to optically initiate polymerization, such as ethyl eosin, eosin Y, fluorescein, 2,2-dimethoxy-2-phenyl acetophenone, 2-methoxy, 2-phenylacetophenone, camphorquinone, rose bengal, methylene blue, erythrosin, phloxime, thionine, riboflavin, methylene green, acridine orange, xanthine dye, and thioxanthine dyes.

Coatalysts useful with the photoinitiating dyes are nitrogen based compounds capable of stimulating the free radical reaction. Primary, secondary, tertiary or quaternary amines are suitable cocatalysts, as are any nitrogen atom containing electron-rich molecules. Cocatalysts include, but are not limited to, triethanolamine, triethylamine, ethanolamine, N-methyl diethanolamine, N,N-dimethyl benzylamine, dibenzyl amine, N-benzyl ethanolamine, N-isopropyl benzylamine, tetramethyl ethylenediamine, potassium persulfate, tetramethyl ethylenediamine, lysine, ornithine, histidine and arginine.

In some cases, the dye may absorb light and initiate polymerization, without any additional initiator such as the amine. In these cases, only the dye and the macromer need be present to initiate polymerization upon exposure to light. The generation of free radicals is terminated when the laser light is removed. Some photoinitiators, such as 2,2-dimethoxy-2-phenylacetophenone, do not require any auxiliary amine to induce photopolymerization; in these cases, only the presence of dye, macromer, and appropriate wavelength light is required.

Light sources that can be used for free radical polymerizationinclude various lamps and lasers having a wavelength of about 320-800 nm, most preferably about 365 nm or 514 nm.

This light can be provided by any appropriate source able to generate the desired radiation, such as a mercury lamp, longwave UV lamp, He—Ne laser, or an argon ion laser, or through the use of fiber optics.

Means other than light can be used for polymerization. Examples include initiation by thermal initiators, which form free radicals at moderate temperatures, such as benzoyl peroxide, with or without triethanolamine, potassium persulfate, with or without tetramethylethylenediamine, and ammonium persulfate with sodium bisulfite.

Chemically Reactive Side Groups

In one embodiment, the side groups of the polymerized oligonucleotides can be crosslinked directly or indirectly through chemical reactions of the side groups. For example, in one embodiment, the side groups of the polymerized oligonucleotides are capable of undergoing a click chemistry reaction to form a BCW matrix.

In many of the embodiments described herein, the monomers used to form the polymerized oligonucleotide structure include one or more reactive side groups, which are reacted in order to form the BCW.

In one embodiment, monomers which contain one or more reactive side groups are incorporated into the polymerized oligonucleotide structure in a random fashion, in order to form the BCW by mixing monomers contain one or more reactive side groups with monomers that do not include these reactive groups during the polymerization of the oligonucleotide structure.

Examples of reactive side groups that it can be incorporated in the growing oligonucleotide structure that can then be reacted to form a BCW of the invention include, but are not limited to, side groups that can be linked using chemical reactions. For example, a depsipeptide (cyclic dimer of an amino acid) can be prepared from lysine, in which the epsilon amine group is protected, for example, with a t-boc protecting group. The protecting group can be removed, and the resulting amine groups are reactive with hydrophilic polymers which include leaving groups such as tosylates, tresylates, mesylates, triflates and other leaving groups well known to those of skill in the art.

Alternatively, the reactive monomer can include a leaving group that can be displaced with a nucleophilic group on a hydrophilic polymer. An example of a suitable hydrophilic polymer containing a nucleophilic group is a PEG with a terminal amine group. Using the chemistry described herein, along with the general knowledge of those of skill in the art, one can prepare polymer backbones which include suitable leaving groups or nucleophiles for subsequent coupling reactions with suitably functionalized hydrophilic polymers.

In one embodiment, the chemically reactive side groups are capable of undergoing click chemistry reactions to form the BCW. Click reactions tend to involve high-energy ("spring-loaded") reagents with well-defined reaction coordinates, that give rise to selective bond-forming events of wide scope. Examples include, but are not limited to, nucleophilic trapping of strained-ring electrophiles (epoxide, aziridines, aziridinium ions, episulfonium ions), certain carbonyl reactivity (e.g., the reaction between aldehydes and hydrazines or hydroxylamines), and several cycloaddition reactions.

Accordingly, in one embodiment, the side group comprises a moiety or functional group which is capable of undergoing a cycloaddition reaction. In one embodiment, polar cycloaddition reactions such as the Huisgen cycloaddition, which is also known as a 1,3-dipolar cycloaddition or as azide-alkyne cycloaddition, are useful to carry out the invention. This reaction between an azide and an alkyne leads to the formation of a cyclic 1,2,3-triazole structure. It is often used in combination with a copper-(I) or -(II) catalyst, preferably with copper sulphate in the presence of a reducing agent such as sodium ascorbate.

For example, in order to make use of the azide-alkyne cycloaddition, the side groups may be modified such as to have an azide or alkyne group. Click reactions involving the use of biomolecules are disclosed in Gramlich et al., 2008, Angew. Chem. Int. Ed., 47:8350-8358; Lutz and Zarafshani, 2008, Adv Drug Deliv Rev, 60:958-970; WO 2006/11767, WO2008/052775 and US20090247651, each of which are incorporated herein by reference. These reactions are performed in the presence of a soluble catalyst.

If the cycloaddition is a Huisgen-type dipolar cycloaddition, it may be triggered by the addition of a suitable catalyst, such as copper-(I) or copper-(II) ions and salts. For example, a combination of CuSO4 and sodium ascorbate effectively triggers most azide-alkyne cycloadditions in an aqueous medium. In embodiments the catalyst may be in a dilute solution. Suitable solvents which may be utilized to form a dilute solution include any biocompatible solvents within the purview of those skilled in the art which will not interfere with the reaction of the azide groups and alkyne groups of the side groups. Suitable solvents which may be utilized include, for example, polar solvents such as water, ethanol, triethylene glycol, dimethyl sulfoxide (DMSO), glymes (such as diglyme, triglyme, tetraglyme, and the like), polyethylene glycols, methoxy-polyethylene glycols, dimethylformamide, dimethylacetamide, gamma-butyrolactone, N-methylpyrollidone (NMP), ketones such as methyl ethyl ketone, cyclohexanone, diethylene glycol monoethyl ether acetate, diethylene glycol monobutyl ether acetate, diethylene glycol monomethyl ether, diethylene glycol monoethyl ether, diethylene glycol monobutyl ether, diethylene glycol monoisobutyl ether, diisobutyl ketone, diacetone alcohol, ethyl amyl ketone, ethyl lactate, and the like. In other embodiments, solvents such as tetrahydrofuran, ethyl acetate, isopropyl acetate, butyl acetate, isopropanol, butanol, acetone, and the like, may be utilized. In embodiments, combinations of any of the foregoing solvents may be utilized to form a dilute solution.

Click reactions that are performed without the use of a copper catalyst may also be used to crosslink chemically reactive side groups. A copper-free click reaction has been proposed for covalent modification of biomolecules in living systems. (See, e.g., Agard et al., 2004, J Am Chem Soc 126:15046-47.) The copper-free reaction uses ring strain in place of the copper catalyst to promote a [3+2] azide-alkyne cycloaddition reaction. For example, cyclooctyne is a 8-carbon ring structure comprising an internal alkyne bond. The closed ring structure induces a substantial bond angle deformation of the acetylene, which is highly reactive with azide groups to form a triazole. Thus, cyclooctyne derivatives may be used for copper-free click reactions, without the toxic copper catalyst.

Another type of copper-free click reaction was reported by Ning et al. (2010, Angew Chem Int Ed 49:3065-68), involving strain-promoted alkyne-nitrone cycloaddition. To address the slow rate of the original cyclooctyne reaction, electron-withdrawing groups are attached adjacent to the triple bond. Examples of such substituted cyclooctynes include difluorinated cyclooctynes, 4-dibenzocyclooctynol and azacyclooctyne. An alternative copper-free reaction involved strain-promoted alkyne-nitrone cycloaddition to give N-alkylated isoxazolines.

Surface Coating

In one embodiment, a BCW is formed on a surface of a substance (e.g., a cell, tissue or particle) and serves to enhance biocompatibility of the substance or to offer additional immunoprotection. In one embodiment, a surface is coated with DI and then contacted with a mixture of DM to form polymerized oligonucleotide structures on the surface which are crosslinked to form the BCW on the surface. It is understood and herein contemplated that the surface coating does not have to be a complete envelopment (i.e., a 100% coverage of the substance), but can comprise an incomplete coating. In one aspect, disclosed herein are BCW comprising compositions comprising a therapeutic agent wherein the BCW comprises 10, 11, 12, 13, 14, 15, 16, 17, 18, 19, 20, 25, 30, 35, 40, 45, 50, 55, 60, 65, 70, 75, 80, 81, 82, 83, 84, 85, 86, 87, 88, 89, 90, 91, 92, 93, 94, 95, 96, 97, 98, 99, or 100 percent coverage of the therapeutic agent.

In one embodiment, DI is coated on the surface of a three-dimensional object which may be of biological origin or a synthetic substrate for implantation in an animal. Numerous methods can be used to apply the DI to surfaces. These methods include contacting a streptavidin coated surface with a DI linked to a biotin (DI-biotin) molecule to allow for complex formation between the surface and the DI, or contacting a cell with a DI linked to cholesterol-TEG to facilitated coating of the cell surface with the DI, however any method known in the art for coating a surface with an oligonucleotide may be used to coat the surface with the DI.

In one embodiment, a DI coated surface is contacted with a mixture of one or more DM of the invention, and optionally one or more polymer or catalyst for crosslinking the side groups of the polymerized oligonucleotide structure.

Biological material can be encapsulated by utilizing interfacial polymerization to form a BCW on the surface of the biological material or microcapsule. This involves coating the biological material or microcapsule with DI, suspending the biological material or microcapsules in a macromer solution optionally containing one or more polymer or catalyst for crosslinking, and immediately polymerizing and crosslinking the BCW. A BCW is formed around the biological materials or the microcapsule. In one embodiment, the thickness of the BCW is dependent upon the time that the biological material is contacted with the macromer solution, and the concentration of macromer in the solution.

Control of BCW Permeability

The permeability of the BCW is determined in part by the molecular weight and crosslinking of the polymer. For example, in the case of short chains between crosslinks, the "pore" produced in the network will have relatively rigid boundaries and will be relatively small so that a macromolecule attempting to diffuse through the BCW will be predominantly restricted by a sieving effect. In the case that the chain length between crosslinks is long, the chain can fold and move around with a high motility so that diffusing macromolecules will encounter a free volume exclusion effect as well as a sieving effect.

Due to these two contrasting effects a straightforward relation between molecular weight cutoff for diffusion and the molecular weight of the starting oligomer is not completely definable. Yet, a desired release profile for a particular protein or a drug such as a peptide can be accomplished by adjusting the crosslink density and length. Correspondingly, a desired protein permeability profile can be designed to permit the diffusion of nutrients, oxygen, carbon dioxide, waste products, hormones, growth factors, transport proteins, and secreted cellularly synthesized products such as proteins, while restricting the diffusion of immune modulators such as antibodies and complement proteins, as well as the ingress of cells, inside the BCW, to protect transplanted cells or tissue.

In one embodiment, for purposes of encapsulating cells and tissue in a manner which prevents the passage of antibodies across the membrane but allows passage of nutrients essential for cellular metabolism, the thickness of the BCW membrane is between 50 and 1000 nm, and the molecular weight range of the BCW for diffusion is 10 kDa to 150 kDa.

Thickness and Conformation of BCW

Membrane thickness affects a variety of parameters, including perm-selectivity, rigidity, and size of the membrane. Thickness can be varied by selection of the reaction components and/or the reaction conditions. For example, the macromer concentration can be varied from a few percent to 100%, depending upon the macromer.

In the interfacial polymerization method, the duration of the polymerization can be varied to adjust the thickness of the polymer membrane formed. This correlation between membrane thickness and duration of polymerization occurs because, unless limited by concentration, the polymerization of the DM monomers is a continuously occurring process. Thus, the longer the duration of contact with a macromer solution, the more macromer will polymerize, and the thicker the resulting membrane. Additional factors which affect membrane thickness are the number of reactive groups per macromer and the concentration of DM in the macromer solution. This technique allows the creation of very thin membranes if one or more of the DM is provided at low concentration or thick membranes if neither DM is limiting, and the surface is contacted with the macromer solution for an extended time.

The thickness of membranes formed is determined in part by the viscosity of the macromer solution, the concentration of the macromer in that solution, the fluid mechanical environment of the suspension and surface active agents in the suspension. These membranes vary in thickness from between 50 and 1000 nanometers.

Non-Biological Surfaces

The macromer solution and initiator can also be applied to a non-biological surface intended to be placed in contact with a biological environment. Such surfaces include, for example, vascular grafts, contact lenses, intraocular lenses, ultrafiltration membranes, and containers for biological materials.

It is usually difficult to get good adhesion between polymers of greatly different physiochemical properties. The concept of a surface physical interpenetrating network was presented by Desai and Hubbel (N. P. Desai et al. (1992)). This approach to incorporating into the surface of one polymer a complete coating of a polymer of considerably different properties involved swelling the surface of the polymer to be modified (base polymer) in a mutual solvent, or a swelling solvent, for the base polymer and for the polymer to be incorporated (penetrant polymer or DI). The penetrant polymer diffused into the surface of the base polymer. This interface was stabilized by rapidly precipitating or deswelling the surface by placing the base polymer in a nonsolvent bath. This resulted in entanglement of the penetrant polymer within the matrix of the base polymer at its surface in a structure that was called a surface physical interpenetrating network.

This approach can be improved upon by polymerizing the BCW upon the surface of the base polymer in the swollen state. This results in much enhanced stability over that of the previous approach and in the enhancement of biological responses to these materials. The penetrant may be a chemically modified DI. Polymerization of the DI can be initiated by contact with a macromer solution.

Functionalization of the BCW

The functionalization of the BCW to confer specific biological activity would be particularly advantageous for many biomaterial applications, as such modification would permit the fabrication of biomaterials that possess properties designed to treat or address specific problems. In addition, such incorporation could serve to protect bioactive molecules, release them in relevant timeframe, and incorporate multiple such molecules. In particular, the development of singly or multifunctional BCW would advance the development of biomaterials for biomedical applications.

In one embodiment, the BCW of the invention can be further functionalized with one or more therapeutic agents. Functionalization can be achieved through methods described elsewhere herein or those known in the art including, but not limited to, physical adsorption, noncovalent interactions, and chemical conjugation. Therapeutic agents that can be used to generate functionalized BCWs include, but are not limited to, small molecules, macro molecules, ligands, antibodies, polypeptides, aptamers and nanoparticles. The terms also encompass pharmaceutically acceptable, pharmacologically active derivatives of beneficial agents specifically mentioned herein, including, but not limited to, salts, esters, amides, proagents, active metabolites, isomers, fragments, analogs, and the like. When the terms "therapeutic agent" is used, then, or when a particular agent is specifically identified, it is to be understood that the term includes the agent per se as well as pharmaceutically acceptable, pharmacologically active salts, esters, amides, proagents, conjugates, active metabolites, isomers, fragments, analogs, etc.

Biomedical Applications

The BCW described herein may be used in a variety of biomedical applications, such as in scaffolds and supports for cell growth in tissue engineering, coatings for biomedical implants such as intraocular lenses or other permanent implants made from polymeric, metal, glass, or ceramic materials, and coatings for cell culture apparatus such as cell culture plates, pipets, etc. The BCWs may be used for modifying the surface properties of sutures, temporary barrier films or fabrics in wound-healing applications, artificial hearts and blood vessels, catheters, filters for blood or other body fluids, and targeted controlled-release drug delivery vehicles and encapsulated cell drug delivery systems. The materials are preferably biodegradable when used for tissue engineering, wound healing, and targeted drug delivery applications, and are preferably non-degradable when used to modify implants, cell culture apparatus, filtration devices, and other devices intended for long term use or implantation.

In one aspect it is understood and herein contemplated that the BCW can allow for the controlled release of the therapeutic agent. In one aspect, the BCW can provide targeted release (such as, for example, a specific microenvironment (including, but not limited to reactive oxygen species or pH) or tissue specificity), delayed release, or prolonged release. In one aspect, the BCW can facilitate the release of the therapeutic agent into a disease, injury, or tumor microenvironment for at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 65, 70, 75, 80, 85, or 90 days.

The BCW of the invention can be polymerized around biologically active molecules to form a delivery system for the molecules or polymerized around cells, tissues, subcellular organelles or other sub-cellular components to encapsulate the biological material. The BCW can also be polymerized to incorporate biologically active molecules to impart additional properties to the polymer, such as resistance to bacterial growth or decrease in inflammatory response, as well as to encapsulate tissues. A wide variety of biologically active material (including therapeutic agents) can be encapsulated or incorporated, including proteins, peptides, polysaccharides, organic or inorganic drugs, nucleic acids, sugars, cells, and tissues.

Examples of cells which can be encapsulated include natural cells (e.g., primary cultures) as well as genetically engineered cells and established cell lines, including transformed cells. These include, but are not limited to pancreatic islet cells, mesenchymal stem cells (MSC), human foreskin fibroblasts, Chinese hamster ovary cells, beta cell insulomas, lymphoblastic leukemia cells, mouse 3T3 fibroblasts, dopamine secreting ventral mesencephanol cells, neuroblastoid cells, adrenal medulla cells, and T-cells. As can be seen from this partial list, cells of all types, including dermal, neural, blood, organ, muscle, glandular, reproductive, and immune system cells, as well as species of origin, can be encapsulated successfully by this method. In addition, bacteria and other microbial organisms, viruses, vitamins, cofactors, and retroviruses for gene therapy can be encapsulated by these techniques.

The biological material can be first enclosed in a structure such as a polysaccharide gel. (Lim, U.S. Pat. No. 4,352,883; Lim, U.S. Pat. No. 4,391,909; Lim, U.S. Pat. No. 4,409,331; Tsang, et al., U.S. Pat. No. 4,663,286; Goosen et al., U.S. Pat. No. 4,673,556; Goosen et al., U.S. Pat. No. 4,689,293; Goosen et al., U.S. Pat. No. 4,806,355; Rha et al., U.S. Pat. No. 4,744,933; Rha et al., U.S. Pat. No. 4,749,620, incorporated herein by reference.) Such gels can provide additional structural protection to the material.

The methodology described above can also be used to deliver therapeutics such as enzymes and other proteins, polysaccharides such as hyaluronic acid, nucleic acids such as antisense and ribozymes, and other organic and inorganic drugs.

Drug Delivery and Imaging

The BCWs also may be formed into matrices for use as drug delivery systems or for imaging purposes. For example, biodegradable microparticles or nanoparticles coated with the BCWs be can be used for targeted delivery of a therapeutic, prophylactic or diagnostic agent. For use in drug delivery, a therapeutic or prophylactic agent, such as an amino acid, bioactive peptide or protein, carbohydrate, sugar, or polysaccharide, nucleic acid or polynucleic acid, synthetic organic compound, or metal may be attached to the BCW through the side groups of the BCW using methods available in the art. Diagnostic agents including, but not limited to, radioactive materials, fluorescent materials, enzymatic materials, gases, and magnetic materials may also be encapsulated by or incorporated into a BCW of the invention. The side groups may be modified to increase the level of an incorporated agent. The BCW may be functionalized with a specific binding moiety, e.g., an antibody, which targets the particle for delivery to a particular site within the body. Hydrophilic, hydrophobic, acidic, basic or ionic side chains also may be attached to the polymerized oligonucleotide structures or the BCWs to expand their use as delivery devices.

In one aspect, the drug being delivered can be an anti-cancer agent. Anti-cancer agents that can be used in the disclosed BCW coated compositions include but are not limited to Abemaciclib, Abiraterone Acetate, Abitrexate (Methotrexate), Abraxane (Paclitaxel Albumin-stabilized Nanoparticle Formulation), ABVD, ABVE, ABVE-PC, AC, AC-T, Adcetris (Brentuximab Vedotin), ADE, Ado-Trastuzumab Emtansine, Adriamycin (Doxorubicin Hydrochloride), Afatinib Dimaleate, Afinitor (Everolimus), Akynzeo (Netupitant and Palonosetron Hydrochloride), Aldara (Imiquimod), Aldesleukin, Alecensa (Alectinib), Alectinib, Alemtuzumab, Alimta (Pemetrexed Disodium), Aliqopa (Copanlisib Hydrochloride), Alkeran for Injection (Melphalan Hydrochloride), Alkeran Tablets (Melphalan), Aloxi (Palonosetron Hydrochloride), Alunbrig (Brigatinib), Ambochlorin (Chlorambucil), Amboclorin Chlorambucil), Amifostine, Aminolevulinic Acid, Anastrozole, Aprepitant, Aredia (Pamidronate Disodium), Arimidex (Anastrozole), Aromasin (Exemestane), Arranon (Nelarabine), Arsenic Trioxide, Arzerra (Ofatumumab), Asparaginase *Erwinia chrysanthemi*, Atezolizumab, Avastin (Bevacizumab), Avelumab, Axitinib, Azacitidine, Bavencio (Avelumab), BEACOPP, Becenum (Carmustine), Beleodaq (Belinostat), Belinostat, Bendamustine Hydrochloride, BEP, Besponsa (Inotuzumab Ozogamicin), Bevacizumab, Bexarotene, Bexxar (Tositumomab and Iodine I 131 Tositumomab), Bicalutamide, BiCNU (Carmustine), Bleomycin, Blinatumomab, Blincyto (Blinatumomab), Bortezomib, Bosulif (Bosutinib), Bosutinib, Brentuximab Vedotin, Brigatinib, BuMel, Busulfan, Busulfex (Busulfan), Cabazitaxel, Cabometyx (Cabozantinib-S-Malate), Cabozantinib-S-Malate, CAF, Campath (Alemtuzumab), Camptosar, (Irinotecan Hydrochloride), Capecitabine, CAPDX, Carac (Fluorouracil—Topical), Carboplatin, CARBOPLATIN-TAXOL, Carfilzomib, Carmubris (Carmustine), Carmustine, Carmustine Implant, Casodex (Bicalutamide), CEM, Ceritinib, Cerubidine (Daunorubicin Hydrochloride), Cervarix (Recombinant HPV Bivalent Vaccine), Cetuximab, CEV, Chlorambucil, CHLORAMBUCIL-PREDNISONE, CHOP, Cisplatin, Cladribine, Clafen (Cyclophosphamide), Clofarabine, Clofarex (Clofarabine), Clolar (Clofarabine), CMF, Cobimetinib, Cometriq (Cabozantinib-S-Malate), Copanlisib Hydrochloride, COPDAC, COPP, COPP-ABV, Cosmegen (Dactinomycin), Cotellic (Cobimetinib), Crizotinib, CVP, Cyclophosphamide, Cyfos (Ifosfamide), Cyramza (Ramucirumab), Cytarabine, Cytarabine Liposome, Cytosar-U (Cytarabine), Cytoxan (Cyclophosphamide), Dabrafenib, Dacarbazine, Dacogen (Decitabine), Dactinomycin, Daratumumab, Darzalex (Daratumumab), Dasatinib, Daunorubicin Hydrochloride, Daunorubicin Hydrochloride and Cytarabine Liposome, Decitabine, Defibrotide Sodium, Defitelio (Defibrotide Sodium), Degarelix, Denileukin Diftitox, Denosumab, DepoCyt (Cytarabine Liposome), Dexamethasone, Dexrazoxane Hydrochloride, Dinutuximab, Docetaxel, Doxil (Doxorubicin Hydrochloride Liposome), Doxorubicin Hydrochloride, Doxorubicin Hydrochloride Liposome, Dox-SL (Doxorubicin Hydrochloride Liposome), DTIC-Dome (Dacarbazine), Durvalumab, Efudex (Fluorouracil—Topical), Elitek (Rasburicase), Ellence (Epirubicin Hydrochloride), Elotuzumab, Eloxatin (Oxaliplatin), Eltrombopag Olamine, Emend (Aprepitant), Empliciti (Elotuzumab), Enasidenib Mesylate, Enzalutamide, Epirubicin Hydrochloride, EPOCH, Erbitux (Cetuximab), Eribulin Mesylate, Erivedge (Vismodegib), Erlotinib Hydrochloride, Erwinaze (Asparaginase *Erwinia chrysanthemi*), Ethyol (Amifostine), Etopophos (Etoposide Phosphate), Etoposide, Etoposide Phosphate, Evacet (Doxorubicin Hydrochloride Liposome), Everolimus, Evista, (Raloxifene Hydrochloride), Evomela (Melphalan Hydrochloride), Exemestane, 5-FU (Fluorouracil Injection), 5-FU (Fluorouracil—Topical), Fareston (Toremifene), Farydak (Panobinostat), Faslodex (Fulvestrant), FEC, Femara (Letrozole), Filgrastim, Fludara (Fludarabine Phosphate), Fludarabine Phosphate, Fluoroplex (Fluorouracil—Topical), Fluorouracil Injection, Fluorouracil—Topical, Flutamide, Folex (Methotrexate), Folex PFS (Methotrexate), FOLFIRI, FOL- FIRI-BEVACIZUMAB, FOLFIRI-CETUXIMAB, FOLFIRINOX, FOLFOX, Folotyn (Pralatrexate), FU-LV, Fulvestrant, Gardasil (Recombinant HPV Quadrivalent Vaccine), Gardasil 9 (Recombinant HPV Nonavalent Vaccine), Gazyva (Obinutuzumab), Gefitinib, Gemcitabine Hydrochloride, GEMCITABINE-CISPLATIN, GEMCITABINE-OXALIPLATIN, Gemtuzumab Ozogamicin, Gemzar (Gemcitabine Hydrochloride), Gilotrif (Afatinib Dimaleate), Gleevec (Imatinib Mesylate), Gliadel (Carmustine Implant), Gliadel wafer (Carmustine Implant), Glucarpidase, Goserelin Acetate, Halaven (Eribulin Mesylate), Hemangeol (Propranolol Hydrochloride), Herceptin (Trastuzumab), HPV Bivalent Vaccine, Recombinant, HPV Nonavalent Vaccine, Recombinant, HPV Quadrivalent Vaccine, Recombinant, Hycamtin (Topotecan Hydrochloride), Hydrea (Hydroxyurea), Hydroxyurea, Hyper-CVAD, Ibrance (Palbociclib), Ibritumomab Tiuxetan, Ibrutinib, ICE, Iclusig (Ponatinib Hydrochloride), Idamycin (Idarubicin Hydrochloride), Idarubicin Hydrochloride, Idelalisib, Idhifa (Enasidenib Mesylate), Ifex (Ifosfamide), Ifosfamide, Ifosfamidum (Ifosfamide), IL-2 (Aldesleukin), Imatinib Mesylate, Imbruvica (Ibrutinib), Imfinzi (Durvalumab), Imiquimod, Imlygic (Talimogene Laherparepvec), Inlyta (Axitinib), Inotuzumab Ozogamicin, Interferon Alfa-2b, Recombinant, Interleukin-2 (Aldesleukin), Intron A (Recombinant Interferon Alfa-2b), Iodine I 131 Tositumomab and Tositumomab, Ipilimumab, Iressa (Gefitinib), Irinotecan Hydrochloride, Irinotecan Hydrochloride Liposome, Istodax (Romidepsin), Ixabepilone, Ixazomib Citrate, Ixempra (Ixabepilone), Jakafi (Ruxolitinib Phosphate), JEB, Jevtana (Cabazitaxel), Kadcyla (Ado-Trastuzumab Emtansine), Keoxifene (Raloxifene Hydrochloride), Kepivance (Palifermin), Keytruda (Pembrolizumab), Kisqali (Ribociclib), Kymriah (Tisagenlecleucel), Kyprolis (Carfilzomib), Lanreotide Acetate, Lapatinib Ditosylate, Lartruvo (Olaratumab), Lenalidomide, Lenvatinib Mesylate, Lenvima (Lenvatinib Mesylate), Letrozole, Leucovorin Calcium, Leukeran (Chlorambucil), Leuprolide Acetate, Leustatin (Cladribine), Levulan (Aminolevulinic Acid), Linfolizin (Chlorambucil), LipoDox (Doxorubicin Hydrochloride Liposome), Lomustine, Lonsurf (Trifluridine and Tipiracil Hydrochloride), Lupron (Leuprolide Acetate), Lupron Depot (Leuprolide Acetate), Lupron Depot-Ped (Leuprolide Acetate), Lynparza (Olaparib), Marqibo (Vincristine Sulfate Liposome), Matulane (Procarbazine Hydrochloride), Mechlorethamine Hydrochloride, Megestrol Acetate, Mekinist (Trametinib), Melphalan, Melphalan Hydrochloride, Mercaptopurine, Mesna, Mesnex (Mesna), Methazolastone (Temozolomide), Methotrexate, Methotrexate LPF (Methotrexate), Methylnaltrexone Bromide, Mexate (Methotrexate), Mexate-AQ (Methotrexate), Midostaurin, Mitomycin C, Mitoxantrone Hydrochloride, Mitozytrex (Mitomycin C), MOPP, Mozobil (Plerixafor), Mustargen (Mechlorethamine Hydrochloride), Mutamycin (Mitomycin C), Myleran (Busulfan), Mylosar (Azacitidine), Mylotarg (Gemtuzumab Ozogamicin), Nanoparticle Paclitaxel (Paclitaxel Albumin-stabilized Nanoparticle Formulation), Navelbine (Vinorelbine Tartrate), Necitumumab, Nelarabine, Neosar (Cyclophosphamide), Neratinib Maleate, Nerlynx (Neratinib Maleate), Netupitant and Palonosetron Hydrochloride, Neulasta (Pegfilgrastim), Neupogen (Filgrastim), Nexavar (Sorafenib Tosylate), Nilandron (Nilutamide), Nilotinib, Nilutamide, Ninlaro (Ixazomib Citrate), Niraparib Tosylate Monohydrate, Nivolumab, Nolvadex (Tamoxifen Citrate), Nplate (Romiplostim), Obinutuzumab, Odomzo (Sonidegib), OEPA, Ofatumumab, OFF, Olaparib, Olaratumab, Omacetaxine Mepesuccinate, Oncaspar (Pegaspargase), Ondansetron Hydrochloride, Onivyde (Irinotecan Hydrochloride Liposome), Ontak (Denileukin Diftitox), Opdivo (Nivolumab), OPPA, Osimertinib, Oxaliplatin, Paclitaxel, Paclitaxel Albumin-stabilized Nanoparticle Formulation, PAD, Palbociclib, Palifermin, Palonosetron Hydrochloride, Palonosetron Hydrochloride and Netupitant, Pamidronate Disodium, Panitumumab, Panobinostat, Paraplat (Carboplatin), Paraplatin (Carboplatin), Pazopanib Hydrochloride, PCV, PEB, Pegaspargase, Pegfilgrastim, Peginterferon Alfa-2b, PEG-Intron (Peginterferon Alfa-2b), Pembrolizumab, Pemetrexed Disodium, Perjeta (Pertuzumab), Pertuzumab, Platinol (Cisplatin), Platinol-AQ (Cisplatin), Plerixafor, Pomalidomide, Pomalyst (Pomalidomide), Ponatinib Hydrochloride, Portrazza (Necitumumab), Pralatrexate, Prednisone, Procarbazine Hydrochloride, Proleukin (Aldesleukin), Prolia (Denosumab), Promacta (Eltrombopag Olamine), Propranolol Hydrochloride, Provenge (Sipuleucel-T), Purinethol (Mercaptopurine), Purixan (Mercaptopurine), Radium 223 Dichloride, Raloxifene Hydrochloride, Ramucirumab, Rasburicase, R-CHOP, R-CVP, Recombinant Human Papillomavirus (HPV) Bivalent Vaccine, Recombinant Human Papillomavirus (HPV) Nonavalent Vaccine, Recombinant Human Papillomavirus (HPV) Quadrivalent Vaccine, Recombinant Interferon Alfa-2b, Regorafenib, Relistor (Methylnaltrexone Bromide), R-EPOCH, Revlimid (Lenalidomide), Rheumatrex (Methotrexate), Ribociclib, R-ICE, Rituxan (Rituximab), Rituxan Hycela (Rituximab and Hyaluronidase Human), Rituximab, Rituximab and, Hyaluronidase Human, Rolapitant Hydrochloride, Romidepsin, Romiplostim, Rubidomycin (Daunorubicin Hydrochloride), Rubraca (Rucaparib Camsylate), Rucaparib Camsylate, Ruxolitinib Phosphate, Rydapt (Midostaurin), Sclerosol Intrapleural Aerosol (Talc), Siltuximab, Sipuleucel-T, Somatuline Depot (Lanreotide Acetate), Sonidegib, Sorafenib Tosylate, Sprycel (Dasatinib), STANFORD V, Sterile Talc Powder (Talc), Steritalc (Talc), Stivarga (Regorafenib), Sunitinib Malate, Sutent (Sunitinib Malate), Sylatron (Peginterferon Alfa-2b), Sylvant (Siltuximab), Synribo (Omacetaxine Mepesuccinate), Tabloid (Thioguanine), TAC, Tafinlar (Dabrafenib), Tagrisso (Osimertinib), Talc, Talimogene Laherparepvec, Tamoxifen Citrate, Tarabine PFS (Cytarabine), Tarceva (Erlotinib Hydrochloride), Targretin (Bexarotene), Tasigna (Nilotinib), Taxol (Paclitaxel), Taxotere (Docetaxel), Tecentriq, (Atezolizumab), Temodar (Temozolomide), Temozolomide, Temsirolimus, Thalidomide, Thalomid (Thalidomide), Thioguanine, Thiotepa, Tisagenlecleucel, Tolak (Fluorouracil—Topical), Topotecan Hydrochloride, Toremifene, Torisel (Temsirolimus), Tositumomab and Iodine I 131 Tositumomab, Totect (Dexrazoxane Hydrochloride), TPF, Trabectedin, Trametinib, Trastuzumab, Treanda (Bendamustine Hydrochloride), Trifluridine and Tipiracil Hydrochloride, Trisenox (Arsenic Trioxide), Tykerb (Lapatinib Ditosylate), Unituxin (Dinutuximab), Uridine Triacetate, VAC, Vandetanib, VAMP, Varubi (Rolapitant Hydrochloride), Vectibix (Panitumumab), VeIP, Velban (Vinblastine Sulfate), Velcade (Bortezomib), Velsar (Vinblastine Sulfate), Vemurafenib, Venclexta (Venetoclax), Venetoclax, Verzenio (Abemaciclib), Viadur (Leuprolide Acetate), Vidaza (Azacitidine), Vinblastine Sulfate, Vincasar PFS (Vincristine Sulfate), Vincristine Sulfate, Vincristine Sulfate Liposome, Vinorelbine Tartrate, VIP, Vismodegib, Vistogard (Uridine Triacetate), Voraxaze (Glucarpidase), Vorinostat, Votrient (Pazopanib Hydrochloride), Vyxeos (Daunorubicin Hydrochloride and Cytarabine Liposome), Wellcovorin (Leucovorin Calcium), Xalkori (Crizotinib), Xeloda (Capecitabine), XELIRI, XELOX, Xgeva (Denosumab), Xofigo (Radium 223 Dichloride), Xtandi (Enzalutamide), Yervoy (Ipilimumab), Yondelis (Trabectedin), Zaltrap (Ziv-Aflibercept), Zarxio (Filgrastim), Zejula (Niraparib Tosylate Monohydrate), Zelboraf (Vemurafenib), Zevalin (Ibritumomab Tiuxetan), Zinecard (Dexrazoxane Hydrochloride), Ziv-Aflibercept, Zofran (Ondansetron Hydrochloride), Zoladex (Goserelin Acetate), Zoledronic Acid, Zolinza (Vorinostat), Zometa (Zoledronic Acid), Zydelig (Idelalisib), Zykadia (Ceritinib), and/or Zytiga (Abiraterone Acetate). Checkpoint inhibitors include, but are not limited to antibodies that block PD-1 (Nivolumab (BMS-936558 or MDX1106), CT-011, MK-3475), PD-L1 (MDX-1105 (BMS-936559), MPDL3280A, MSB0010718C), PD-L2 (rHIgM12B7), CTLA-4 (Ipilimumab (MDX-010), Tremelimumab (CP-675,206)), IDO, B7-H3 (MGA271), B7-H4, TIM3, LAG-3 (BMS-986016).

In one aspect, it is understood and herein contemplated that one way to treat a wound is through administration of the BCW coated therapeutic agent subcutaneously, intramuscularly, intravenously, topically (such as, for example, through the use of salves, creams, and/or ointments), but also by impregnating bandages, dressing, sutures, drapes, surgical adhesive, and/or staples with the BCW coated therapeutic agent. Thus, in one aspect, disclosed herein are medicated adhesive bandages, wound dressings, surgical drapes, sutures, salves, creams, or wound adhesives comprising a therapeutically effective amount of a BCW coated therapeutic agent.

Methods of Use and Pharmaceutical Compositions

In one embodiment, the BCW coated compositions as described herein may be utilized in the treatment and prevention of a disease or disorder in a subject in need thereof. Thus, the present invention provides methods for the treatment or prevention of diseases or disorders comprising administering to a subject in need thereof, an agent for the treatment of the disease or disorder that is encapsulated by or incorporated into a BCW of the invention using the methods described herein.

The compositions of the present invention may be administered either alone, or as a pharmaceutical composition in combination with one or more pharmaceutically or physiologically acceptable carriers, diluents or excipients. Such compositions may comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives.

Pharmaceutical compositions of the present invention may be administered in a manner appropriate to the disease to be treated (or prevented). The quantity and frequency of administration will be determined by such factors as the condition of the patient, and the type and severity of the patient's disease, although appropriate dosages may be determined by clinical trials.

When "an effective amount", or "therapeutic amount" is indicated, the precise amount of the compositions of the present invention to be administered can be determined by a physician with consideration of individual differences in age, weight, stage or severity of the disease or disorder being treated, and condition of the patient (subject). The optimal dosage and treatment regime for a particular patient can readily be determined by one skilled in the art of medicine by monitoring the patient for signs of disease and adjusting the treatment accordingly.

The administration of the subject compositions may be carried out in any convenient manner, including by aerosol inhalation, injection, ingestion, transfusion, implantation or transplantation. The compositions described herein may be administered to a patient subcutaneously, intradermally, intratumorally, intranodally, intramedullary, intramuscularly, by intravenous (i.v.) injection, or intraperitoneally. The compositions of the invention may be administered systemically or locally to a specific site.

The compositions of the present invention may also be administered using any number of scaffolds. Scaffolds have been utilized for a number of years within the context of tissue engineering (see, e.g., Principles of Tissue Engineering (Lanza, Langer, and Chick (eds.)), 1997. The present invention utilizes such scaffolds within the novel context of acting as an artificial lymphoid organ to support, maintain, or modulate the immune system, typically through modulation of T cells. Accordingly, the present invention includes BCW coated scaffold compositions and formulations which have demonstrated utility in tissue engineering. Accordingly, the type of scaffold that may be used in the compositions, devices and methods of the invention is virtually limitless and may include both biological and synthetic scaffolds. In one particular example, the compositions and devices set forth by U.S. Pat. Nos. 5,980,889; 5,913,998; 5,902,745; 5,843,069; 5,787,900; or 5,626,561 are utilized. Scaffolds comprise features commonly associated with being biocompatible when administered to a mammalian host. Scaffolds may be formed from both natural or synthetic materials. The scaffolds may be non-biodegradable in instances where it is desirable to leave permanent structures or removable structures in the body of an animal, such as an implant; or biodegradable. The scaffolds may take the form of sponges, implants, tubes, telfa pads, fibers, hollow fibers, lyophilized components, gels, powders, porous compositions, or nanoparticles. In addition, scaffolds can be designed to allow for sustained release of seeded cells or produced cytokine or other active agents. In certain embodiments, the scaffold of the present invention is flexible and elastic, and may be described as a semisolid scaffold that is permeable to substances such as inorganic salts, aqueous fluids and dissolved gaseous agents including oxygen.

In some embodiments, disclosed herein is a method of treating, inhibiting, reducing, ameliorating, decreasing, and/or preventing a disease or disorder in a subject in need thereof. In some embodiments, the method of any preceding aspects suppresses angiogenesis. In some embodiments, the method of any preceding aspects increases angiogenesis. The disease or disorder can be acute or chronic diseases and disorders relating to impaired wound healing including, for examples, ischemic heart disease, coronary artery disease, peripheral vascular disease diabetes mellitus, atherosclerosis, skin burn, or macular degeneration.

In some embodiments, disclosed herein is a method of treating a disease or disorder in a subject in need thereof, wherein the disease or disorder is selected from the table as shown below:

| list of cells that can be covered by BCW | list of diseases that can be treated by BCW-covered cells |
| --- | --- |
| mesenchymal stem cells | 1. tissue repair: myocardial infarction, liver cirrhosis, bone/cartilage damage, angiogenesis/wound healing, diabetic foot ulcer, lung repair and regeneration (chronic obstructive |

| list of cells that can be covered by BCW | list of diseases that can be treated by BCW-covered cells |
|---|---|
| | pulmonary disease, idiopathic pulmonary fibrosis) 2. immunomodulation prevents transplant rejection, graft versus host disease, autoimmune disease (rheumatoid arthritis, pancreatitis, inflammatory bowel disease, Crohn's disease, systemic lupus erythematosus and systemic sclerosis) |
| human neural stem cells | neurodegenerative disorder: Parkinson's disease, Alzheimer's disease |
| Pancreatic islets | diabetes |
| articular chondrocytes | cartilage damage |
| fibroblast | lung diseases (such as chronic obstructive pulmonary disease, cystic fibrosis, and asthma) |
| red blood cells | blood transfusion |
| platelet | wound healing |
| Cancer cells | vaccination |
| microbial cells: bacteria, fungi, yeast | Gastrointestinal Disorders; vaccination |

"Treat," "treating," "treatment," and grammatical variations thereof as used herein, include the administration of a composition with the intent or purpose of partially or completely preventing, delaying, curing, healing, alleviating, relieving, altering, remedying, ameliorating, improving, stabilizing, mitigating, and/or reducing the intensity or frequency of one or more a diseases or conditions, a symptom of a disease or condition, or an underlying cause of a disease or condition. Treatments according to the invention may be applied preventively, prophylactically, palliatively or remedially. Prophylactic treatments are administered to a subject prior to onset (e.g., before obvious signs of cancer), during early onset (e.g., upon initial signs and symptoms of cancer), or after an established development of cancer. Prophylactic administration can occur for day(s) to years prior to the manifestation of symptoms of an infection.

A "decrease" can refer to any change that results in a smaller gene expression, protein expression, amount of a symptom, disease, composition, condition, or activity. A substance is also understood to decrease the genetic output of a gene when the genetic output of the gene product with the substance is less relative to the output of the gene product without the substance. Also, for example, a decrease can be a change in the symptoms of a disorder such that the symptoms are less than previously observed. A decrease can be any individual, median, or average decrease in a condition, symptom, activity, composition in a statistically significant amount. Thus, the decrease can be a 1, 2, 3, 4, 5, 6, 7, 8, 9, 10, 15, 20, 25, 30, 35, 40, 45, 50, 55, 60, 65, 70, 75, 80, 85, 90, 95, or 100% decrease so long as the decrease is statistically significant.

"Inhibit," "inhibiting," and "inhibition" mean to decrease an activity, response, condition, disease, or other biological parameter. This can include but is not limited to the complete ablation of the activity, response, condition, or disease. This may also include, for example, a 10% reduction in the activity, response, condition, or disease as compared to the native or control level. Thus, the reduction can be a 10, 20, 30, 40, 50, 60, 70, 80, 90, 100%, or any amount of reduction in between as compared to native or control levels.

The terms "prevent," "preventing," "prevention," and grammatical variations thereof as used herein, refer to a method of partially or completely delaying or precluding the onset or recurrence of a disease and/or one or more of its attendant symptoms or barring a subject from acquiring or reacquiring a disease or reducing a subject's risk of acquiring or reacquiring a disease or one or more of its attendant symptoms.

In one aspect, the BCW can be used to treat an autoimmune disease, deliver a therapeutic to a subject with an autoimmune disease or treat symptoms or injuries associated with an autoimmune disease. Examples of autoimmune diseases include, but are not limited to Achalasia, Acute disseminated encephalomyelitis, Acute motor axonal neuropathy, Addison's disease, Adiposis dolorosa, Adult Still's disease, Agammaglobulinemia, Alopecia areata, Alzheimer's disease, Amyloidosis, Ankylosing spondylitis, Anti-GBM/Anti-TBM nephritis, Antiphospholipid syndrome, Aplastic anemia, Autoimmune angioedema, Autoimmune dysautonomia, Autoimmune encephalomyelitis, Autoimmune enteropathy, Autoimmune hemolytic anemia, Autoimmune hepatitis, Autoimmune inner ear disease (AIED), Autoimmune myocarditis, Autoimmune oophoritis, Autoimmune orchitis, Autoimmune pancreatitis, Autoimmune polyendocrine syndrome, Autoimmune retinopathy, Autoimmune urticaria, Axonal & neuronal neuropathy (AMAN), Baló disease, Behcet's disease, Benign mucosal emphigoid, Bickerstaff s encephalitis, Bullous pemphigoid, Castleman disease (CD), Celiac disease, Chagas disease, Chronic fatigue syndrome, Chronic inflammatory demyelinating polyneuropathy (CIDP), Chronic recurrent multifocal osteomyelitis (CRMO), Churg-Strauss Syndrome (CSS), Eosinophilic Granulomatosis (EGPA), Cicatricial pemphigoid, Cogan's syndrome, Cold agglutinin disease, Congenital heart block, Coxsackie myocarditis, CREST syndrome, Crohn's disease, Dermatitis herpetiformis, Dermatomyositis, Devic's disease (neuromyelitis optica), Diabetes mellitus type 1, Discoid lupus, Dressler's syndrome, Endometriosis, Enthesitis, Eosinophilic esophagitis (EoE), Eosinophilic fasciitis, Erythema nodosum, Essential mixed cryoglobulinemia, Evans syndrome, Felty syndrome, Fibromyalgia, Fibrosing alveolitis, Giant cell arteritis (temporal arteritis), Giant cell myocarditis, Glomerulonephritis, Goodpasture's syndrome, Granulomatosis with Polyangiitis, Graves' disease, Guillain-Barre syndrome, Hashimoto's encephalopathy, Hashimoto's thyroiditis, Hemolytic anemia, Henoch-Schonlein purpura (HSP), Herpes gestationis or pemphigoid gestationis (PG), Hidradenitis Suppurativa (HS) (Acne Inversa), Hypogammalglobulinemia, IgA Nephropathy, IgG4-related sclerosing disease, Immune thrombocytopenic purpura (ITP), Inclusion body myositis (IBM), Interstitial cystitis (IC), Inflamatory Bowel Disease (IBD), Juvenile arthritis, Juvenile diabetes (Type 1 diabetes), Juvenile myositis (JM), Kawasaki disease, Lambert-Eaton syndrome, Leukocytoclastic vasculitis, Lichen planus, Lichen sclerosus, Ligneous conjunctivitis, Linear IgA disease (LAD), Lupus nephritis, Lupus vasculitis, Lyme disease chronic, Meniere's disease, Microscopic polyangiitis (MPA), Mixed connective tissue disease (MCTD), Mooren's ulcer, Mucha-Habermann disease, Multifocal Motor Neuropathy (MMN) or MMNCB, Multiple sclerosis, Myasthenia gravis, Myositis, Narcolepsy, Neonatal Lupus, Neuromyelitis optica, Neutropenia, Ocular cicatricial pemphigoid, Optic neuritis, Ord's thyroiditis, Palindromic rheumatism (PR), PANDAS, Paraneoplastic cerebellar degeneration (PCD), Paroxysmal nocturnal hemoglobinuria (PNH), Parry Romberg syndrome, Pars planitis (peripheral uveitis), Parsonnage-Turner syndrome, Pemphigus, Peripheral neuropathy, Perivenous encephalomyelitis, Pernicious anemia (PA), POEMS syndrome, Polyarteritis nodosa, Polyglandular syndromes type I, II, III, Polymyalgia rheumatica, Polymyositis, Postmyocardial infarction syndrome, Postpericardiotomy syndrome, Primary biliary cirrhosis, Primary sclerosing cholangitis, Progesterone dermatitis, Psoriasis, Psoriatic arthritis, Pure red cell aplasia (PRCA), Pyoderma gangrenosum, Raynaud's phenomenon, Reactive Arthritis, Reflex sympathetic dystrophy, Relapsing polychondritis, Restless legs syndrome (RLS), Retroperitoneal fibrosis, Rheumatic fever, Rheumatoid arthritis, Rheumatoid vasculitis, Sarcoidosis, Schmidt syndrome, Schnitzler syndrome, Scleritis, Scleroderma, Sjögren's syndrome, Sperm & testicular autoimmunity, Stiff person syndrome (SPS), Subacute bacterial endocarditis (SBE), Susac's syndrome, Sydenham chorea, Sympathetic ophthalmia (SO), Systemic Lupus Erythematosus, Systemic scleroderma, Takayasu's arteritis, Temporal arteritis/Giant cell arteritis, Thrombocytopenic purpura (TTP), Tolosa-Hunt syndrome (THS), Transverse myelitis, Type 1 diabetes, Ulcerative colitis (UC), Undifferentiated connective tissue disease (UCTD), Urticaria, Urticarial vasculitis, Uveitis, Vasculitis, Vitiligo, Vogt-Koyanagi-Harada Disease, and Wegener's granulomatosis (or Granulomatosis with Polyangiitis (GPA)). Accordingly, in one aspect, disclosed herein are methods of treating, inhibiting, reducing, ameliorating, decreasing and/or preventing an autoimmune disease, symptom of an autoimmune disease, or injury resulting from an autoimmune disease in a subject comprising administering to the subject a composition comprising a BCW coated therapeutic agent.

In one aspect, the BCW can be used to treat any disease where uncontrolled cellular proliferation occurs such as cancers. A representative but non-limiting list of cancers that the disclosed compositions can be used to treat is the following: lymphoma, B cell lymphoma, T cell lymphoma, mycosis fungoides, Hodgkin's Disease, myeloid leukemia, bladder cancer, brain cancer, nervous system cancer, head and neck cancer, squamous cell carcinoma of head and neck, lung cancers such as small cell lung cancer and non-small cell lung cancer, neuroblastoma/glioblastoma, ovarian cancer, skin cancer, liver cancer, melanoma, squamous cell carcinomas of the mouth, throat, larynx, and lung, cervical cancer, cervical carcinoma, breast cancer, and epithelial cancer, renal cancer, genitourinary cancer, pulmonary cancer, esophageal carcinoma, head and neck carcinoma, large bowel cancer, hematopoietic cancers; testicular cancer; colon cancer, rectal cancer, prostatic cancer, or pancreatic cancer. Thus, in one aspect, disclosed herein are methods of treating, inhibiting, reducing, ameliorating, decreasing and/or preventing a cancer and/or metastasis in a subject comprising administering to the subject a composition comprising a BCW coated therapeutic agent.

In one aspect, the disease, disorder, or condition being treated is associated with angiogenesis (either by increasing vascularization to propagate the disease or disorder or where angiogenesis is part of the healing process such as, for example, wound healing).

Accordingly, in some embodiments, disclosed herein is a cell coated with BCW for treating, inhibiting, reducing, ameliorating, decreasing, and/or preventing the disease or disorder of any preceding aspect, wherein the cell is selected from the group consisting of mesenchymal stem cells, human neural stem cells, Pancreatic islets, articular chondrocytes, fibroblast, red blood cells, platelet, cancer cells, and microbial cells such as bacteria, fungi, or yeast.

In one aspect, disclosed herein are methods of treating, preventing, and/or reducing a disease or disorder (e.g., acute or chronic diseases and disorders relating to impaired wound healing including, for examples, ischemic heart disease, coronary artery disease, peripheral vascular disease diabetes mellitus, atherosclerosis, skin burn, or macular degeneration) in a subject in need thereof comprising administering to the subject a therapeutically effective amount of the composition of any preceding aspects (e.g., BCW coated MSCs or islet cells). The disclosed methods can be performed any time prior to and/or after the onset of the disease or disorder. In some aspects, the disclosed methods can be employed 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 years; 12, 11, 10, 9, 8, 7, 6, 5, 4, 3, 2, or 1 months; 30, 29, 28, 27, 26, 25, 24, 23, 22, 21, 20, 19, 18, 17, 16, 15, 14, 13, 12, 11, 10, 9, 8, 7, 6, 5, 4, or 3 days; 60, 48, 36, 30, 24, 18, 15, 12, 10, 9, 8, 7, 6, 5, 4, 3, or 2 hours prior to the onset of the disease or disorder; or 1, 2, 3, 4, 5, 6, 7, 8, 9, 10, 15, 20, 25, 30, 35, 40, 45, 50, 55, 60, 75, 90, 105, 120 minutes; 3, 4, 5, 6, 7, 8, 9, 10, 11, 12, 15, 18, 24, 30, 36, 48, 60 hours; 3, 4, 5, 6, 7, 8, 9, 10, 11, 12, 13, 14, 15, 16, 17, 18, 19, 20, 21, 22, 23, 24, 25, 26, 27, 28, 29, 30, 45, 60, 90 or more days; 4, 5, 6, 7, 8, 9, 10, 11, 12 or more months; 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1 years after the onset of the disease or disorder.

For example, disclosed herein are methods of treating, inhibiting, reducing, ameliorating, decreasing tissue, organ, and/or cellular damage due to a physical insult (such as, for example myocardial infarction, liver cirrhosis, bone/cartilage damage, angiogenesis/wound healing, diabetic foot ulcer, lung repair and regeneration (chronic obstructive pulmonary disease, idiopathic pulmonary fibrosis), abrasion, puncture, laceration, contusion, blunt force trauma, ischemia, hemorrhagic stroke, surgery, transplant, sunburn, chemical burn, high temperature burn, low temperature burn) in a subject comprising administering to the subject a composition comprising a BCW coated therapeutic agent.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

Example 1: Molecularly Regulated Reversible DNA Polymerization

These experiments provide a method to construct BCW on live mammalian cells. A framing DNA template is synthesized to direct the formation of the crosslinked matrix on the plasma membrane, which avoids the direct cell contact with potentially cytotoxic polymers to a great extent. Moreover, the entire procedure of synthesis does not involve harsh reactions with each step operated under strict physiological conditions. BCW is ultrathin with a negligible volume compared to the size of the cells. Finally, the synthesis of BCW is accomplished with simple cell incubation in solutions but without complicated devices or operations. Thus, it is promising to realize high-throughput synthesis of BCW on any type of mammalian cell for broad cell-based research and applications.

The materials and methods are now described.

Materials and Instrumentation

Dibenzocyclooctyne-PEG4-NHS ester, Cy5-DBCO and Cy3 NHS Ester were purchased from Click Chemistry Tools (Scottsdale, AZ). Oligonucleotides (Table 1) were purchased from Integrated DNA Technologies (Coralville, IA). Sodium alginate (medium viscosity, 80~120 kDa) and O-(2-Aminoethyl)-O'-(2-azidoethyl)pentaethylene glycol (NH2-PEG6-N3) were purchased from Sigma-Aldrich (St. Louis, MO). Streptavidin coated particles were purchased from Spherotech (Lake Forest, IL). Pegylated polylysine (26 kDa) was purchased from Nanosoft Polymers (Lewisville, NC). Quantum™ FITC-5 MESF was purchased from Bangs Laboratories (Fishers, IN). Carboxyfluorescein succinimidyl ester (CFSE) and Live/Dead viability/cytotoxicity kit were purchased from Invitrogen (Carlsbad, CA).

$^1$H NMR was performed on a Bruker 500 MHz NMR spectrometer. UV-vis absorption spectra were recorded using a Thermo Scientific NanoDrop 2000c spectrophotometer. The gel electrophoresis was run at 80 V for 20 minutes and the images of gels were recorded using a CRI Maestro EX System (Woburn, MA). Flow cytometry analysis was performed using a guava EasyCyte™ flow cytometer (Millipore). FEI Talos F200x High-resolution Transmission Electron Microscope was used to record TEM images. Malvern Zetasizer Nano ZS was used to do size and zeta potential analysis. Olympus IX73 inverted microscope was used to record cell images. Olympus Fluoview 1000 was used to record confocal fluorescence images.

TABLE 1

Oligonucleotides

| DNA name | Sequence (5→3) | SEQ ID NO: |
|---|---|---|
| Cholesterol-TEG-DI | CCTCATCCCACTCCTACCTAAA CCAAAAAAAAAA/3CholTEG/ | 1 |
| DI-Biotin | CCTCATCCCACTCCTACCTAAA CCAAAAAAAAAA/3Bio/ | |
| DM1 | GGTTTAGGTAGGAGTGGGATGA GGCCAAATCCTCATCCCACTCC TACC | 2 |
| DM1-FAM | GGTTTAGGTAGGAGTGGGATGA GGCCAAATCCTCATCCCACTCC TACC/36-FAM/ | |
| DM2-NH2 | /5AmMC6/AAAAACCTCATCCCA CTCCTACCTAAACCGGTAGGAG TGGGATGAGGATTTGG | 3 |

General Cell Culture Conditions

CCRF-CEM (CCL-119, human T lymphoblastic leukemia cell line) and K-562 (CCL-243, chronic myelogenous leukemia cell line) were purchased from ATCC (Manassas, VA) and maintained in RPMI-1640 supplemented with 10% FBS. NK-92MI (natural killer cell) was purchased from ATCC (Manassas, VA) and maintained in alpha minimum essential medium with recommended supplements. Primary Aortic Smooth Muscle Cells were purchased from ATCC (Manassas, VA) and maintained in M231 containing Smooth Muscle Cell Growth Supplement. Human bone marrow CD34+ hematopoietic stem cells were purchased from StemCell Technologies (Tukwila, WA) and expanded with StemSpan serum-free expansion medium supplemented with CC100 cytokine supplements. hMSC (Normal Human Bone Marrow Derived Mesenchymal Stem Cells) was purchased from Lonza (Walkersville, MD) and maintained in recommended growth medium (Lonza). RFP-Tagged human bone marrow derived MSCs (RFP-MSCs) were purchased from Angio-Proteomie (Boston, MA) and maintained in stem cell growth medium (Lonza). Cells were maintained at 37° C. in an atmosphere of 5% CO2 and 95% relative humidity.

Preparation of Dibenzocyclooctyne-Modified DNA (DNA-DBCO)

100 µL of DNA-NH2 solution (1 mM) was added to 375 µL of modification buffer (DPBS, 50 mM NaHCO3). Then 25 µL of DBCO-PEG4-NHS ester (DMSO, 30 mM) was added and allowed to react for 6 hours. It was repeated twice. The product DNA-DBCO was collected and purified using a 3 kDa Amicon Ultra Centrifugal Filter.

Preparation of Azide-Modified Alginate (Alginate-N3)

50 mg sodium alginate was dissolved in 5 mL of MES buffer (50 mM, pH=5). To this solution, NHS (14 mg, 0.12 mmol), EDC (116 mg, 0.60 mmol) and NH2-PEG6-N3 (28 mg, 0.08 mmol) were added. After stirring for 30 min at room temperature, 55 µL of 6 M NaOH was added to adjust pH to 7.5-8.0. The reaction proceeded overnight at room temperature. Purification was achieved by 3 days of dialysis against water (10,000 MWCO membrane). To further remove any unreacted reagents, the alginate-N3 solution was precipitated in cold acetone, filtered and dried. The final product alginate-N3 was dissolved in d.i. H2O, filtered through a 0.22 µm membrane, and lyophilized. Alginate-N3 was analyzed using NMR spectroscopy.

Preparation of Alginate-DM2 Macromer

The alginate-DM2 macromer was prepared using copper-free click reaction by mixing alginate-N3 and DNA-DBCO. In brief, 100 µL of 1% w/v solution of alginate-N3 was incubated with 30 µL of 1 mM DNA-DBCO for 4 hours at 37° C. After conjugation, the alginate-DM2 macromer was collected and purified using a 100 kDa Amicon Ultra Centrifugal Filter. For Cy5 modification, 100 µL of 1% w/v solution of alginate-DM2 macromer was mixed with 30 µL of 1 mM Cy5-DBCO for 2 hours at 37° C. Gel electrophoresis and UV-Vis spectroscopy were used to confirm the successful conjugation.

Quantitative Analysis of Alginate-DM2 Macromer

To a solution containing 1% w/v alginate, variable concentrations of DM2 were added (50 µM, 100 µM, 150 µM, 200 µM, 400 µM) and the absorption spectra of the different solutions were recorded. The increase in the absorbance at λ=260 nm corresponded to the amount of DM2. A calibration curve relating the absorbance features of the systems as a function of DM2 concentration was generated. Then, 1% w/v of alginate-DM2 macromer was prepared and the absorbance at λ=260 nm was recorded. Based on the calibration curve, the DM2 concentration in 1% w/v alginate-DM2 solution was evaluated spectroscopically. Based on this quantitative analysis, 2 to 3 DNA molecules were conjugated to one alginate polymer chain.

Synthesis of BCW on the Particle Surface

Streptavidin-coated nanoparticles (1 mg) were mixed with biotinylated DNA initiator (DI, 2 nmol) in 500 µL of PBS buffer at room temperature for 1 hour on a rotator. DI-modified particles were collected by centrifugation and further washed with PBS. To examine the polymerization of DM1 and alginate-DM2 on the particles, 0.1 mg of particles were incubated in 800 μL of PBS containing DM1 (1 μM) and alginate-DM2 macromer (1 μM) for 3 hours at room temperature. To examine polyelectrolyte complexation, the particles with the template were incubated with 0.01% (w/v) polylysine in PBS for 5 min. After centrifugation and washing with PBS twice, the particles were further incubated with 0.05% (w/v) alginate in PBS for 5 minutes. For each step, the size and zeta potential of particles were monitored using Malvern Zetasizer Nano ZS.

Examination of BCW Stability

Alginate-DM2 macromer was labeled with Cy5. The analysis of BCW was performed by tracking the changes of the Cy5 signal as the function of time. In brief, particles (5 μm) were covered with the template or BCW using the procedure as described above. Particles were incubated in the 10% fetal bovine serum (FBS)-supplemented RPMI 1640. An aliquot of particle solutions was removed at predetermined time points. After washed with DPBS, they were analyzed using flow cytometry. Experiments were performed in triplicate.

Synthesis of BCW on Live Mammalian Cells

CCRF-CEM cells were centrifuged, washed twice and re-suspended in DPBS. $1 \times 10^6$ cells were incubated in 400 μL of Cholesterol-TEG-DI solution (1 μM, DPBS) for 30 min for incorporation of DI into cell membrane. Then DI-modified cells were collected, washed and subsequently mixed with DM1 (1 μM) and alginate-DM2 macromer (1 μM) in DPBS for 3 h to form the supramolecular DNA template. To test the effect of reaction time on the formation of the template on the cells, the polymerization time was varied from 1 to 3 hours. The cells were collected and the fluorescence intensity (Cy5 signal from alginate-DM2 macromer) was measured by flow cytometry. For the subsequent polyelectrolyte complexation, cells covered with the template were sequentially treated with 0.01% (w/v) polylysine for 1 minute and 0.05% (w/v) alginate for 5 minutes. Finally, the cells covered with BCW were collected by centrifugation before any characterization.

Figure 21:
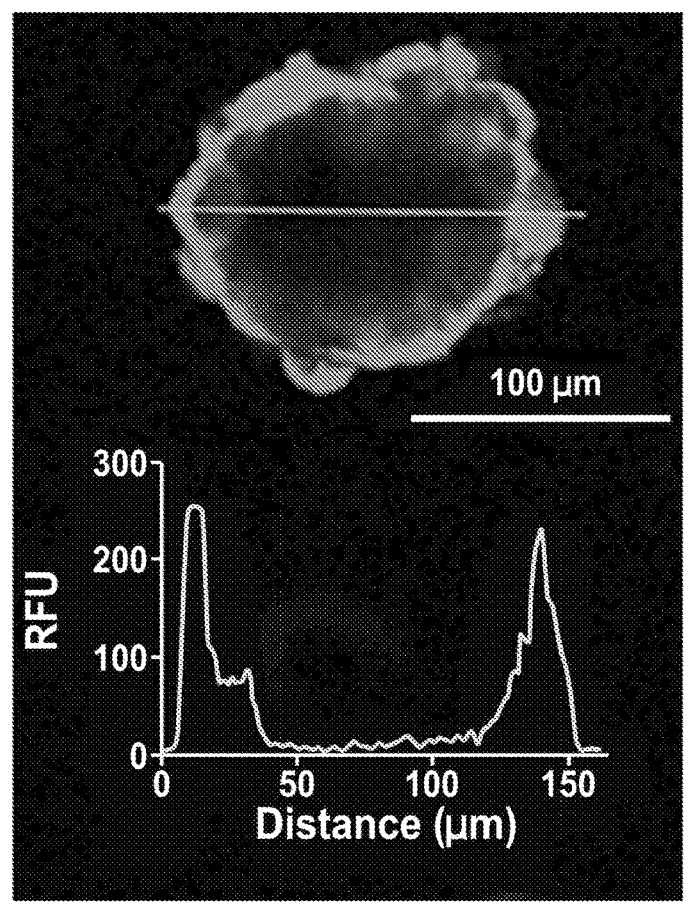
FIG. 21 shows image of BCW-covered MSC spheroids. Red:Cy5.

After being detached from the culture flask, dissociated MSCs were washed and then incubated in the cholesterol-TEG-DI solution (1 μM) for 30 min for the incorporation of DI into the cell membrane through cholesterol insertion. After washing, DI-modified MSCs were mixed with alginate-DM2 macromer (1 μM) and DM1 (1 μM) or alginate-DM1 macromer (1 μM) to form the supramolecular DNA template. Using either DM1, alginate-DM1 macromer or their mixture helps adjust the density of alginate. The polymerization time was varied from 1 to 3 h. MSCs were examined using fluorescence microscopy and flow cytometry. For the subsequent polyelectrolyte complexation and/or crosslinking via click chemistry, template-covered MSCs were treated with 0.05% (w/v) polylysine (conjugated with or without DBCO) and then 0.05% (w/v) alginate and/or alginate-N3 to form BCW-covered MSCs. Polylysine was labeled with Cy3-NHS ester and/or DBCO-NHS ester. The molecular weight/concentration of polylysine was varied. The procedure for BCW construction on MSC spheroids was nearly the same as that for dissociated MSCs except the following steps. MSCs were incubated for 4 hours in an ultra-low adherent plate to form MSC spheroids. Then, cholesterol-TEG-DI solution (1 μM) was added into the suspension of MSC spheroids. After washing, MSC spheroids were incubated in the mixture of alginate-DM2 macromer and DM1 or alginate-DM1 macromer. Other steps were the same. FIG. 21 shows the representative confocal microscopy image of BCW-covered MSC spheroids (A line was drawn for showing fluorescence distribution; red: Cy5-alginate-DM2). The viability of MSCs or MSC spheroids were measured by Live/Dead viability/cytotoxicity kit. Spheroids were treated with trypsin to dissociate MSCs for staining. The stained live/dead cells were counted using image J and the viability was reported as the ratio of living cells to total cells.

Quantitation of DI on the Cell Surface

To test the effect of incubation time on the display of DI on the cell surface, $5 \times 10^5$ of cells were incubated in 400 μL of Cholesterol-TEG-DI solution (1 DPBS) at room temperature for a different period of time. To test the effect of DI concentration on the display of DI on the cell surface, $5 \times 10^5$ of cells were incubated with Cholesterol-TEG-DI (0.1-10 μM) in DPBS for 30 minutes. DI-modified cells were collected, washed and subsequently stained with DM1-FAM (1 μM). The mean fluorescence intensity (MFI) of cells in each group was measured by flow cytometry and compared with the known standards (Quantum™ FITC MESF, Bangs Laboratories) to determine the number of DI per cell.

Evaluation of Shielding Enhancement

Centrifugal force and osmotic imbalance were used to demonstrate the effects of physical assaults on cells. In the study with the centrifugal force, cells covered with or without BCW were suspended in the DPBS at a concentration of $1 \times 10^6$ cells/mL. The centrifugation was repeated by five times. Each centrifugation was performed for 5 minutes at 4° C. The centrifugation force was varied from 110 to 6,200 g. Cells were re-suspended in new DPBS after each centrifugation. After 5 times of centrifugation, the cells were incubated in the culture media for 24 hours and their viability was measured by Live/Dead viability/cytotoxicity kit. In brief, cells were incubated with calcein-AM and ethidium homodimer-1 at a concentration of 1 μM each. After 15 minutes incubation at room temperature in the dark, cells were imaged using fluorescence microscopy. Live and dead cells were counted using ImageJ. The viability was reported as the ratio of living cells to total cells.

Mammalian cells swell under hypotonic conditions to rupture their plasma membrane. To evaluate the response of cells to osmotic imbalance, cells ($1 \times 10^6$ cells/mL) covered with or without BCW were stained with calcein-AM and re-suspended in a series of NaCl solutions (0.1%-0.8%). After 10 minutes incubation, cells were imaged using fluorescence microscopy. The cells with ruptured membrane were barely imaged under the microscope. So the cells maintaining integrity (green fluorescence) were counted. The viability was reported as the ratio of the cells with integrity to total cells. The BCW-mediated shielding enhancement was determined using the following equation:

$$\% \text{ shielding enhancement} = \frac{N_{BCW} - N_{native}}{N_{native}} \times 100$$

where NBCW denotes the number of viable BCW-covered cells and Nnative denotes the number of viable native cells.

Biological assaults were studied both in vitro and in vivo. The co-culture of K562 cells and immune effector cells is a common assay to examine immune attack. Thus, in the in vitro assay, target cells (K562 cells) were labeled by incubation with 1 μM CFSE for 5 minutes. The labeled cells were further covered with BCW according to the standard procedure described above. Target cells were transferred into a 48-well plate at $1 \times 10^5$ cells/well. Immune effector cells (NK-92MI cells) were added to each well at varied effector/target ratios. The final volume was adjusted to 400 µL. The co-culture of K562 cells with NK-92MI cells was maintained at 37° C. for 3 hours. After that, propidium iodide (PI) was added to each sample and incubated in the dark for 15 minutes to label dead cells. Cells were imaged using fluorescence microscopy. CFSE labeled and PI labeled cells were counted using ImageJ. The cell viability was determined by (Nc-Np)/Nc, where Nc and Np indicate the number of CFSE-positive cells and the number of PI-positive cells, respectively.

In the in vivo assay, RFP-hMSCs cells were subcutaneously transplanted into C57BL/6 mice (age of 6 to 8 weeks). To avoid cell dissemination after transplantation, cells were transplanted with fibrinogen. In brief, $1 \times 10^6$ cells were mixed with 50 µL of fibrinogen solution (20 mg/mL) and 50 µL of thrombin solution (2 U/mL) and injected subcutaneously to the dorsal flank of mice. The mice were imaged at day 1 and 7 after cell transplantation using the Maestro In Vivo Imaging System (CRI, Woburn, MA). As MSCs can release signaling molecules to induce the growth of blood vessels, MSCs were compared with or without BCW in inducing the growth of blood vessels. $1 \times 10^6$ human MSCs were injected to the dorsal flank of mice. Mice were sacrificed with $CO_2$ asphyxiation at day 10. The tissue in the transplantation site was harvested, fixed in 4% paraformaldehyde solution, blocked into paraffin, and sectioned (5 µm thickness). The sectioned tissues were deparaffinized, boiled in sodium citrate buffer, blocked with 3% BSA solution, and treated with rabbit anti-mouse CD31 antibody (1:200 dilution) followed by incubation with Cy5-Goat anti-Rabbit secondary antibody (1:200 dilution). The tissues were mounted in SlowFade Diamon Antifade Mountant with DAPI. The fluorescent images were taken under an Olympus IX73 microscope (Center Valley, PA). The CD31 positive areas were analyzed using Image J. The paired student t test was used to compare the two groups.

Figures 18A, 18B, 18C:
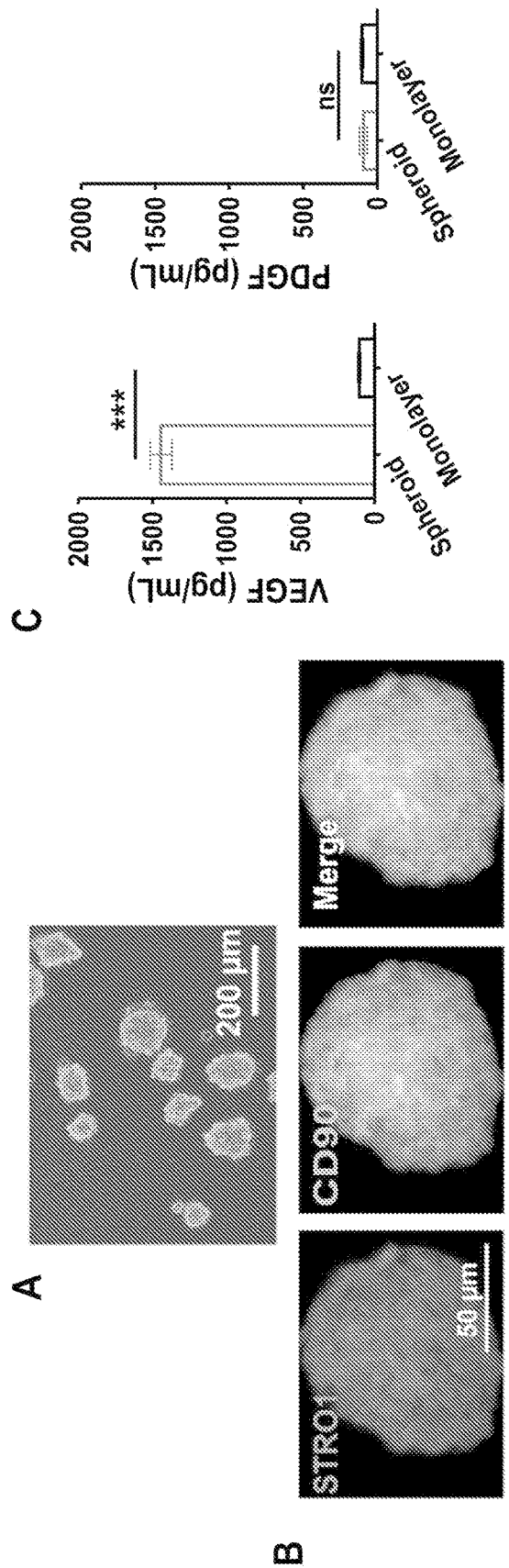
FIGS. 18A-18C show preparation and characterization of MSC spheroids.

BCW-covered MSC spheroids were cultured under a hypoxic condition to test MSC survival under stress as in shown in FIG. 20. The engineered spheroids were mixed with a fibrinogen solution (20 mg/mL) and a thrombin solution (2 U/mL; 20 mM CaCl2) to form spheroids in fibrin hydrogel (Fn). Fn was used for two reasons. First, it can be used as a model to mimic a tissue or an in vivo environment. Second, how exogenous signaling molecules regulate the survival of MSC spheroids can be examined. Fn is used as the carrier of the exogenous signaling molecules. Fn with the spheroids is transferred to the cell culture plate and incubated at 37° C. for 1 hour. Then DMEM were added into the plate and transferred the plate into a hypoxia incubator chamber. In a transplantation site, MSCs not only experienced hypoxia but also a low level of nutrients. Thus, DMEM supplemented with either 0.5% or 10% FBS were used for MSC culture. At different time points, trypsin (0.05%) was added to lyse Fn hydrogels to release the spheroids for Live/Dead staining. The spheroids were treated with trypsin to get dissociated cells. The number of live cells were quantified using a fluorescence microscope and a flow cytometer. The cells dissociated from the spheroids were also re-plated for post-stress analyses including cell attachment and morphology. Moreover, MSC spheroids were snap-frozen, embedded in OCT compound and sectioned for the immunostaining of MSC markers (FIG. 18B). Naked MSC spheroids, dissociated MSCs and BCW-covered dissociated MSCs were cultured under the same condition for comparison.

For in vivo evaluation, cells expressing cytosolic fluorescent proteins (e.g., RFP or GFP) have been widely used for in vivo live cell imaging. BCW-covered RFP-expressing human bone marrow MSC spheroids were used for the in vivo evaluation. The procedure for the transplantation of the spheroids was the same as we reported for dissociated MSCs. In brief, 30 to 50 BCW-covered MSC spheroids was subcutaneously injected to the dorsal flank of BALB/c mice (age of 8 weeks) after mixed with 50 µL of fibrinogen solution (20 mg/mL) and 50 µL of thrombin solution (2 U/mL; 20 mM CaCl2). The mice were imaged at day 1, 7 and 14 after cell transplantation using the Maestro In Vivo Imaging System. Color-coding of fluorescence intensity in arbitrary units was equally scaled for all images and normalized to that recorded at day 1. The three controls used for in vitro comparison were also be used herein. The animal study was performed according to the protocol approved by the Institutional Animal Care and Use Committee (IACUC). The use of human MSCs was approved by the Institutional Biosafety Committee (IBC). The sample size was determined by power analysis.

Preparation of aFn. The aptamer-fibrinogen conjugate (Apt-Fg) was synthesized using the thiol-ene reaction. Briefly, the fibrinogen solution was functionalized with acrylic acid N-hydroxysuccinimide ester to get acrylated fibrinogen. Acrylated fibrinogen was reacted with the thiol-conjugated aptamer to get Apt-Fg. Apt-Fg and fibrinogen was mixed to form a pre-gel solution with varied mole ratios to control the density of the aptamer. The pre-gel solution was mixed with a thrombin (2 U/mL) solution containing 10 mM $CaCl_2$ to form aFn. To load MSC spheroids, the pre-gel solution was mixed with the spheroids before mixed with the thrombin solution.

Figure 22:
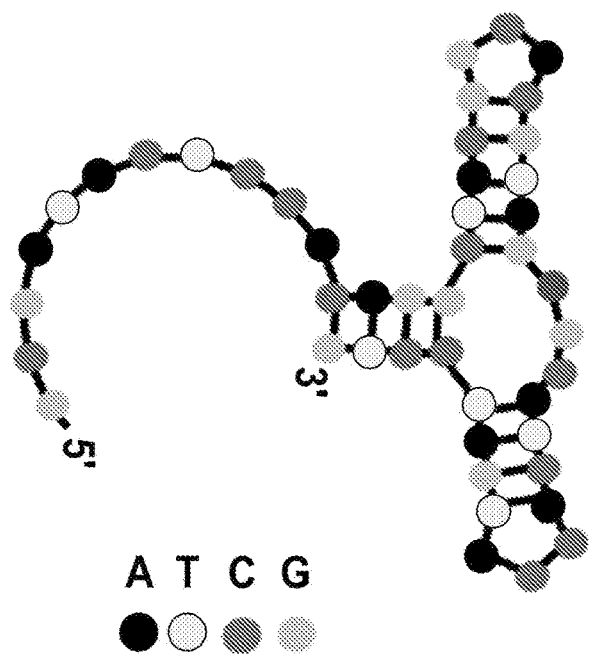
FIG. 22 shows stem-loop structure of the aptamer.

To examine sequestration, aFn was immersed in 1 mL of release medium (containing PBS, 0.1% albumin, pH 7.4) for 12 hours. The media was measured with ELISA kits to determine the efficiency of PDGF-BB sequestration (retention), i.e., the amount remained in the aFn divided by the initial amount. To examine the release kinetics, the release medium was collected and replaced with a fresh medium at different time points for two weeks. The binding affinity was varied by finely mutating and tuning the stem-loop structure of the anti-PDGF-BB aptamer (FIG. 22). The binding affinities ($K_D$ values) of aptamer derivatives were examined by using surface plasmon resonance spectroscopy. In addition, the diffusion model was applied to fit the experimental data and calculate the apparent diffusivity of PDGF-BB in aFn. To examine the bioactivity of released PDGF-BB, release media was collected and diluted into 10 ng/mL for MSC culture. PDGF-BB bioactivity was tested using MSC proliferation with the stock solution (long/mL) as 100% for normalization.

The results of the experiments are now described.

In nature, DNA is used as a template to make mRNA (i.e., transcription) and mRNA is used to direct the assembly of amino acids to produce polypeptides (i.e., translation). This basic mechanism has been applied to develop genetic engineering methods for the functionalization of cells (e.g., MSCs). The method herein for biomolecular surface engineering does not involve genetic modification or manipulation. FIG. 16 shows that a supramolecular DNA template is generated from DNA monomers (DMs) via hybridization chain reaction (HCR) on the cell surface. This template directs polysaccharide (e.g., alginate) assembly and complexation with polypeptides (e.g., polylysine) to form a biomolecular matrix (i.e., BCW) through polyelectrolyte complexation (PC). As alginate is conjugated with DM, the formation of the DNA template leads to automatic alginate assembly for the next-step PC. The entire procedure of BCW construction is conducted under physiological conditions without the involvement of any harsh conditions (e.g., covalent conjugation). Thus, this method can be applied to engineer BCW on the surface of MSC spheroids with high biocompatibility. In addition, this method can be further applied using many different polymers.

The experiments demonstrate the development of a method for the synthesis of BCW using supramolecular DNA molecules as a framing template to direct molecular assembly and crosslinking of polysaccharides and polypeptides (FIG. 1A). DNA, polysaccharide and polypeptide are three essential polymers in nature. They have been widely used to build up materials for biological and biomedical applications. For instance, DNA molecules have been studied for directed organic synthesis and nanotechnology (Gartner et al., 2004, Science 305:1601-1605; Rothemund, 2006, Nature, 440:297; Winfree et al., 1998, Nature, 394:539; Yan et al., 2003, Science, 301:1882-1884; He et al., 2008, Nature, 452:198; Praetorius and Dietz, 2017, Science, 355; Ke et al., 2012, Science, 338:1177-1183). In the method presented herein, the template is synthesized with two DNA hairpins through hybridization chain reaction (Dirks and Pierce, 2004, Proc Natl Acad Sci, 101:15275-15278) and an alginate-polylysine matrix is crosslinked through polyelectrolyte complexation (Michaels, 1965, Ind Eng Chem, 57:32-40; Decher, 1997, Science 277:1232-1237). Notably, as alginate is initially conjugated with one DNA hairpin to form an alginate-DNA macromer, the formation of the supramolecular template leads to automatic alginate assembly on the cell membrane for the next-step polyelectrolyte complexation. Moreover, the entire procedure of construction is conducted under physiological conditions. Thus, DNA-templated molecular assembly and crosslinking is a promising method for the synthesis of BCW.

The alginate-DNA macromer was synthesized using click chemistry and the success of the synthesis was confirmed using gel electrophoresis and UV spectroscopy (FIG. 2 and FIG. 3). Alginate is a negatively charged polymer that may repel DNA hybridization. Thus, after alginate was conjugated with the DNA hairpin, it was important to examine whether DNA hairpins could maintain the ability of polymerization. The gel image (FIG. 4) suggested that the two DNA hairpins (DM1 and alginate-DM2) polymerized. The polymerization of DM1 and alginate-DM2 on the particles and the height of the supramolecular DNA template was examined. The diameter of the particles was increased by ~280 nm, suggesting that the template was ~140 nm in height. The zeta potential of the particles was decreased by ~70% (FIG. 5). These data demonstrate that DM1 and alginate-DM2 polymerized to form a supramolecular template on the particle surface.

Figures 5A, 5B:
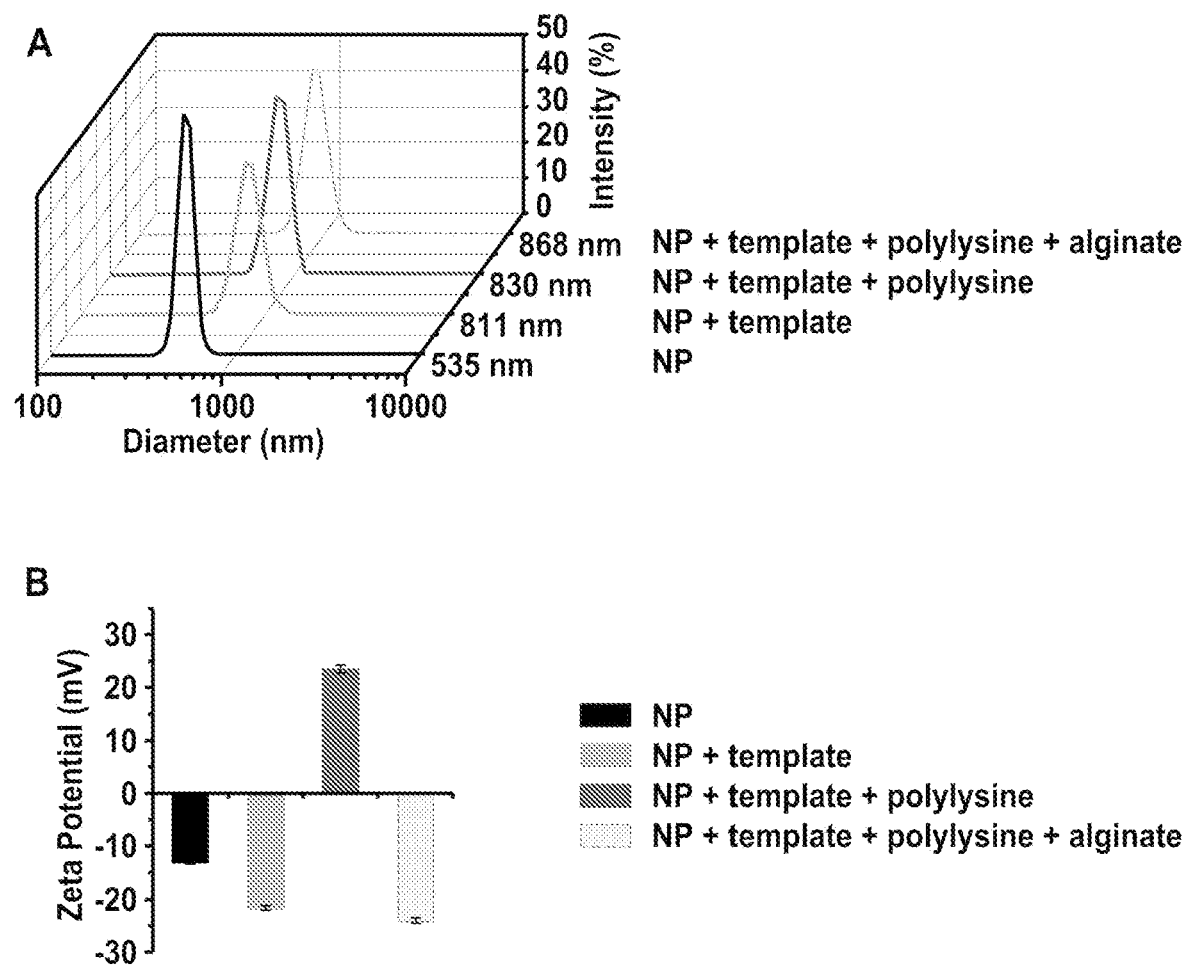
FIGS. 5A and 5B depict the characterization of BCW synthesis on the particle surface.

As alginate was conjugated to DM2, the polymerization of DM1 and alginate-DM2 allowed alginate alignment on the particle surface for reaction with polylysine. Indeed the treatment of the template-covered particles with polylysine led to an increase of the diameter (FIG. 5A) and the reversal of the zeta potential (FIG. 5B). As alginate and polylysine were fluorescently labeled, the particle suspension was also imaged. Consistent with the measurements of size and zeta potential, the imaging analysis suggests that the framing DNA template can form on the particle surface and also importantly this template can direct molecular assembly and crosslinking of alginate and polylysine through polyelectrolyte complexation to form BCW (FIG. 1B). As DNA can be degraded in biological fluids, the particles were incubated in fetal bovine serum to examine the stability of the template and BCW. The particles were analyzed with flow cytometry. The template-covered particles lost over 90% of fluorescence intensity within one week. By contrast, the BCW-covered ones could maintain high fluorescence intensity after the initial decrease by ~10% (FIG. 1C). These results suggest that BCW is highly stable in biological fluids.

Figure 1D:
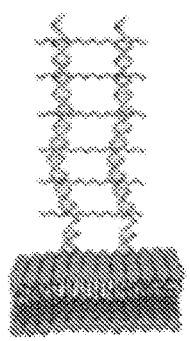
Figure 1E:
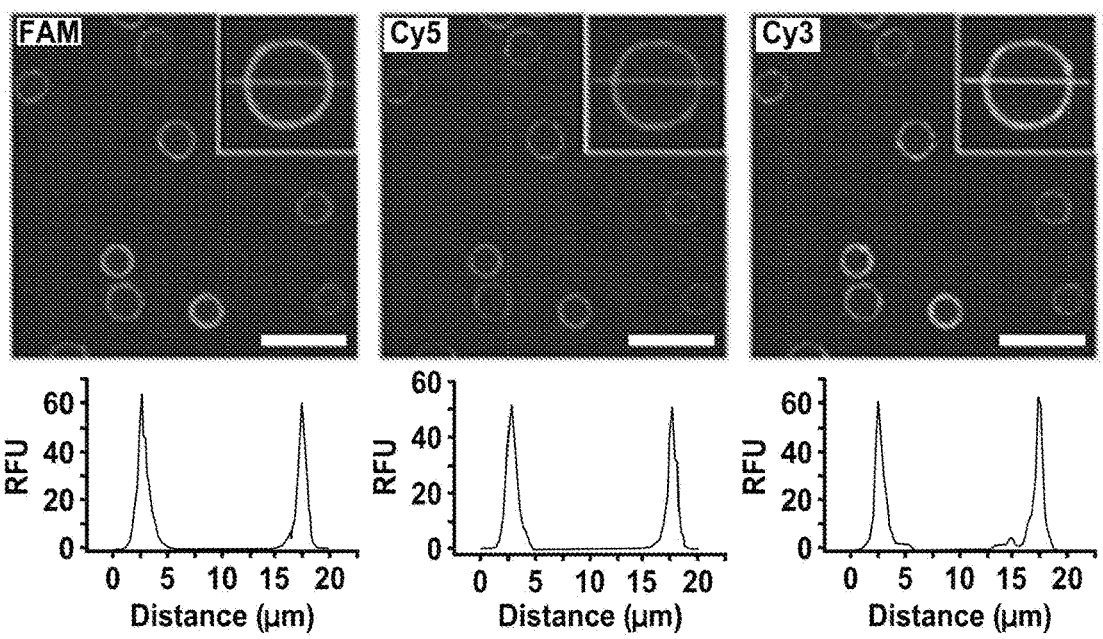
Figure 6A:
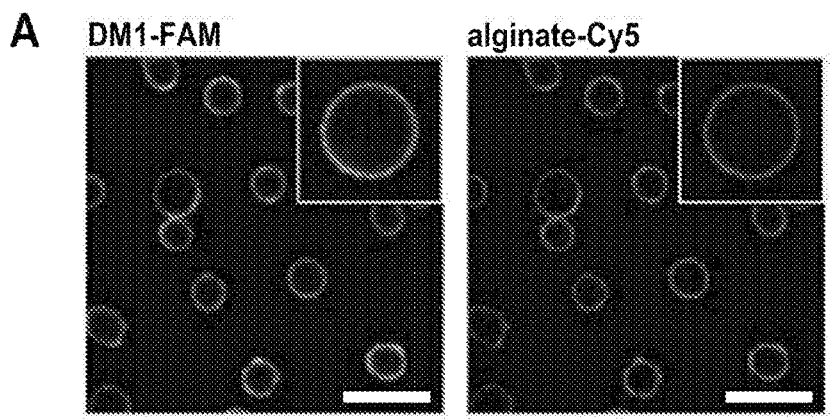
FIGS. 6A-6C depict the characterization of the template on the cell surface.
Figure 6B:
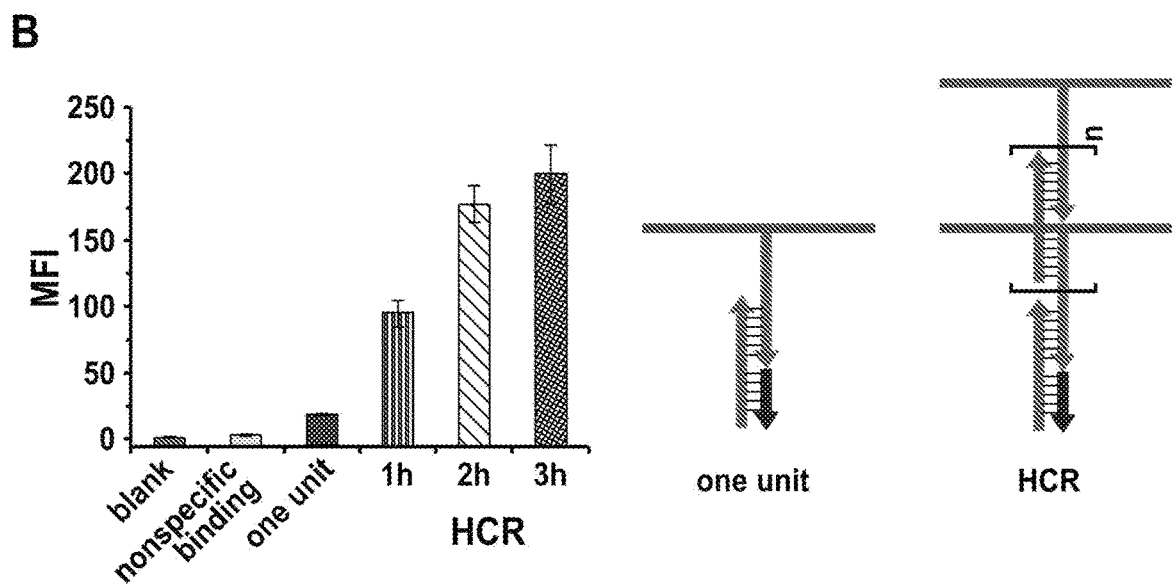
Figure 6C:
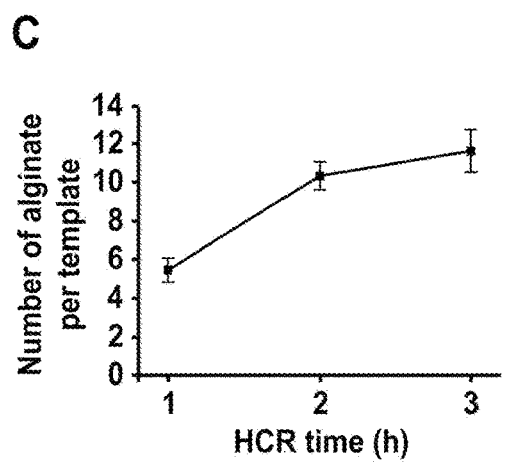
Figure 7:
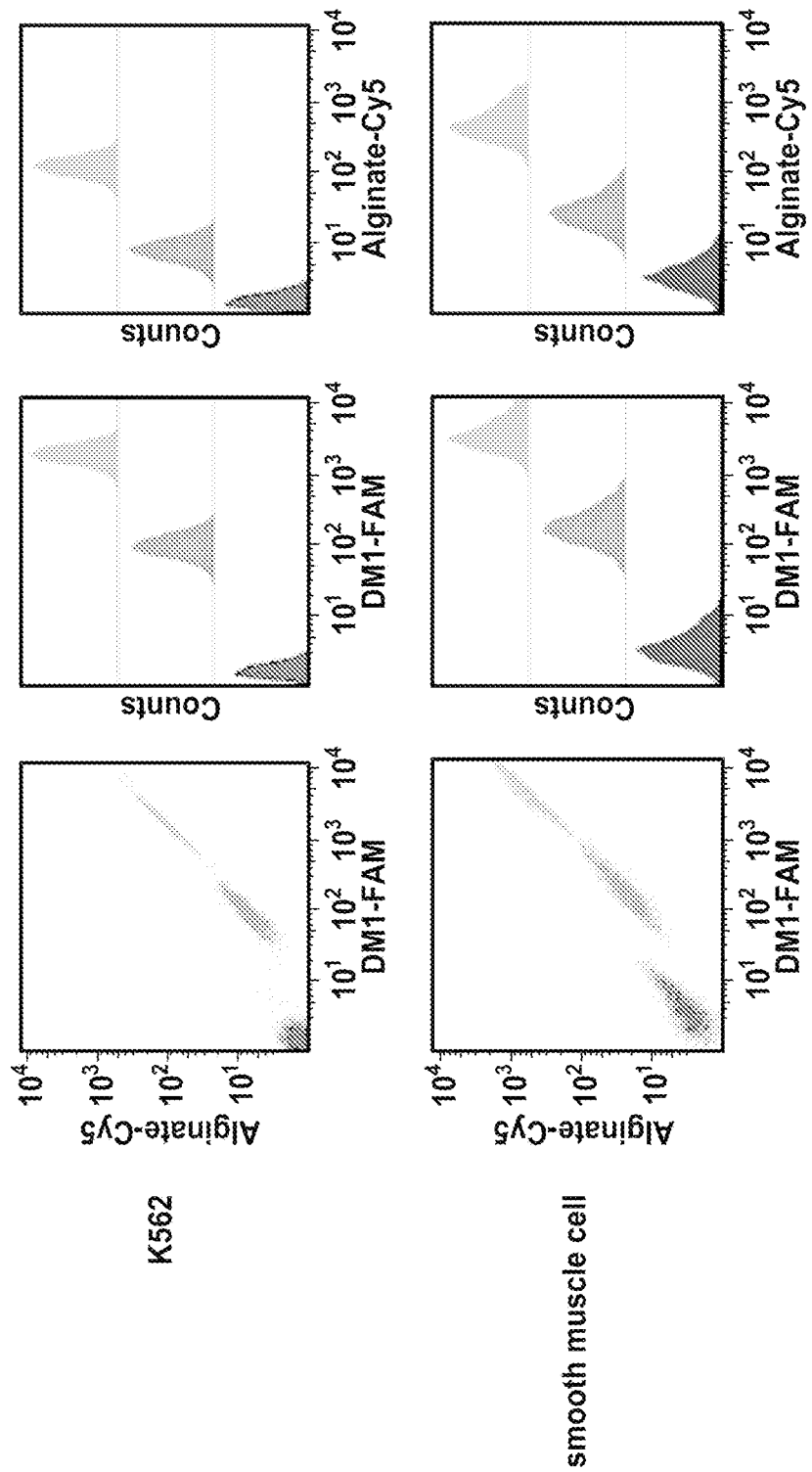
FIG. 7 depicts flow cytometry analysis of the template formation on four different types of cells.
Figure 7:
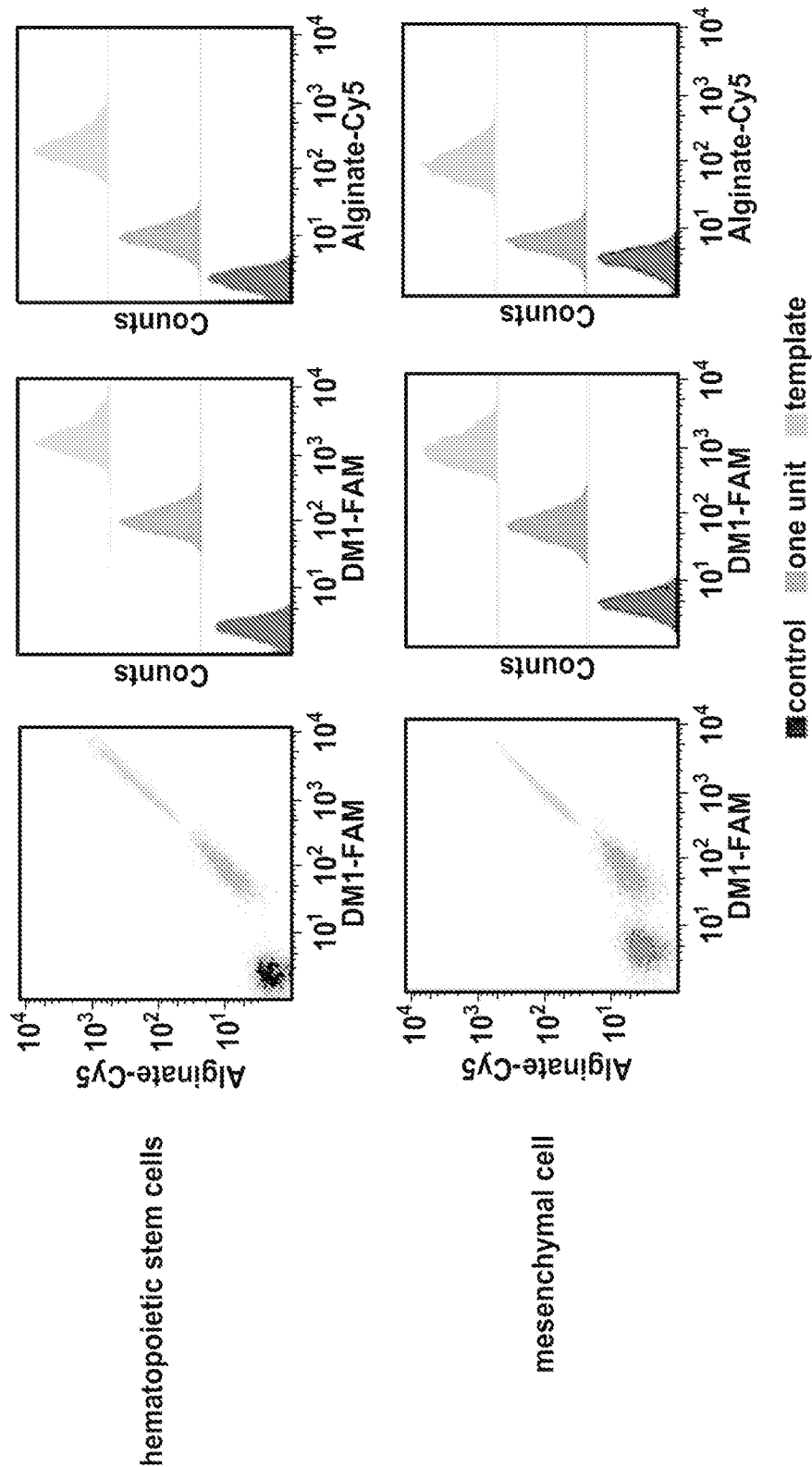
Figure 8:
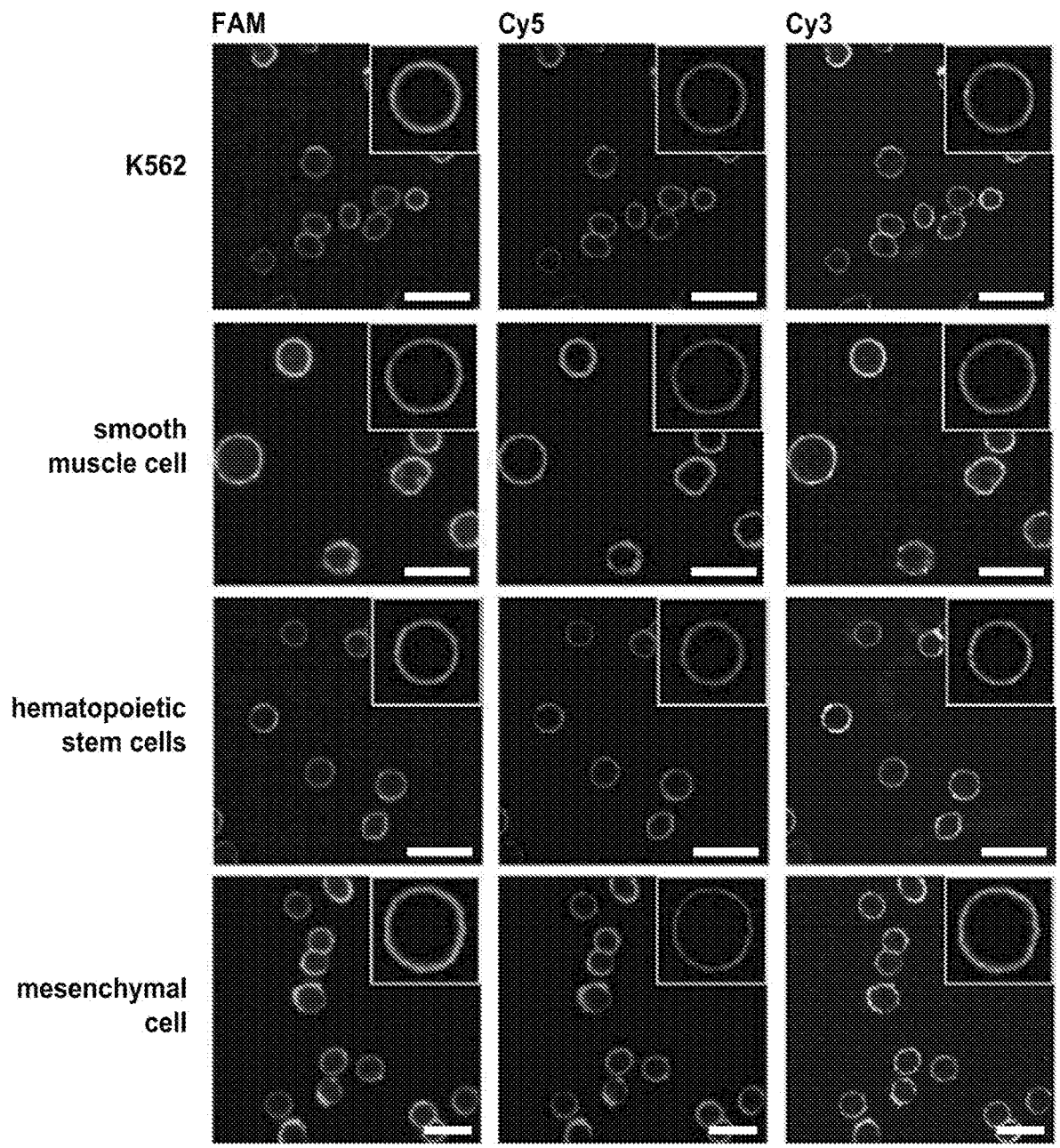
FIG. 8 depicts confocal fluorescence images of BCW on four different types of cells. Scale bar: 30 μm. FAM was from DM1-FAM. Cy5 was from alginate-Cy5. Cy3 was from polylysine-Cy3.

Next, whether the method would be effective in synthesizing BCW on the plasma membrane of live cells was examined. First, the polymerization of DM1 and alginate-DM2 on the cell surface was examined. The fluorescence imaging analysis showed the strong signals of FAM and Cy5 (FIG. 6A), demonstrating the success of DNA polymerization and DNA-templated alginate assembly on live cells. The imaging results are consistent with the flow cytometry analysis (FIG. 1D). The calculation suggested that one DNA template growing for 3 h had approximately 10 alginate molecules (FIG. 6B and FIG. 6C). Next the cells were incubated in the solution of Cy3-labeled polylysine for 1 minute. The fluorescence images clearly demonstrate that BCW formed on the cells (FIG. 1E). The same location displayed the signals of three fluorescent labels for the DNA template, alginate and polylysine on the cell membrane concomitantly (FIG. 1E). The fluorescence intensity inside the cells was negligible compared to that on the cell membrane, suggesting that the cellular uptake of these three molecules was minimal. To demonstrate the potential universality of this method, the synthesis of BCW on the membrane of four other mammalian cells was examined. BCW successfully formed on the cell membrane in all cases (FIG. 7 and FIG. 8). Together, the data demonstrate that DNA-templated molecular assembly and crosslinking is an effective method for the synthesis of BCW on the plasma membrane of mammalian cells.

Figure 11:
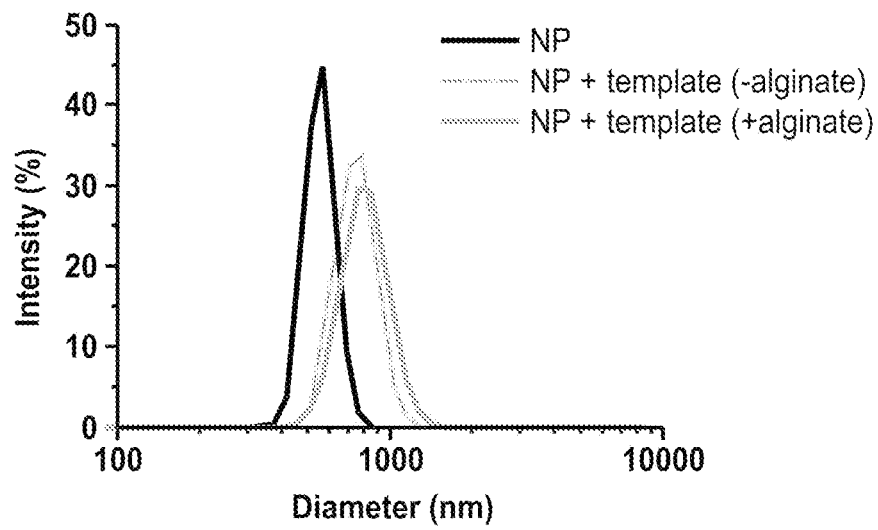
FIG. 11 depicts an analysis of DNA polymerization (with or without alginate) on the particle surface using dynamic light scattering.
Figure 12:
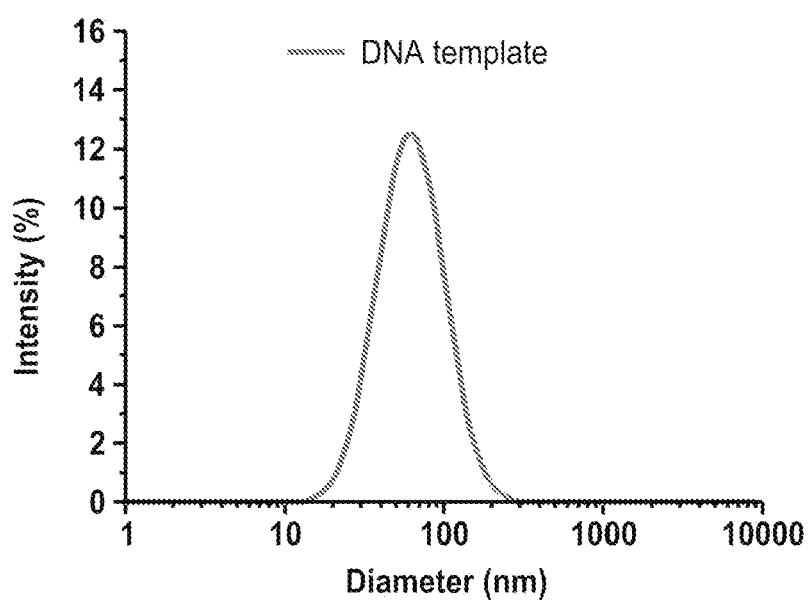
FIG. 12 depicts a dynamic light scattering analysis of the DNA template.

The native cells were incubated in the solution of polylysine. The amount of polylysine on native cells was one order of magnitude lower than that of BCW (FIG. 9A). More importantly, the distribution of polylysine on the cell membrane was significantly scattered with large gaps (FIG. 9B). Thus, while cells can be directly treated with cationic polymers followed by alternate deposition of charged polymers19, this operation may suffer from this heterogeneous distribution and coverage of cationic polymers as shown in FIG. 9 and high cytotoxicity as well. Instead of relying on the direct deposition of cationic polylysine on the naked cell surface, this method involves the direct reaction between polylysine and alginate that has been aligned on the framing DNA template. To further understand the effectiveness of the method, the amount of DNA initiators on the cell surface was quantified. This amount increased with the incubation time and the concentration (FIG. 10). When the cells were incubated in the solution with 1 μM of DNA initiator, the surface of one cell displayed approximately $4\times10^6$ DNA initiators. Supposed that each DNA initiator formed one template, the average distance between two DNA templates was 8.2 nm (Table 2). Considering that the DNA template was approximately 140 nm in height (FIG. 11) and 68 nm in hydrodynamic diameter (FIG. 12), the whole cell would be adequately covered by DNA templates for the alginate-polylysine complexation in the synthesis of BCW.

Table 2: Calculation of the average distance between two adjacent DNA templates. The cell was assumed as a sphere with a radius of 6 μm to calculate the surface area. Each template was assumed to be a dot. N dots were randomly distributed onto a circle with its area equal to the cell. N was the number of DNA initiator. The distance was calculated using the imdistline matlab function. 10 pairs of adjacent dots were randomly chosen to calculate the average distance.

| DI concentration | Number of DNA/cell | The average distance between two adjacent DNA |
|---|---|---|
| 0.1 μM | $3.3 \times 10^6$ | 12.7 nm |
| 0.25 μM | $3.5 \times 10^6$ | 10.8 nm |
| 0.5 μM | $3.6 \times 10^6$ | 9.7 nm |
| 1 μM | $3.9 \times 10^6$ | 8.2 nm |
| 2 μM | $4.3 \times 10^6$ | 7.7 nm |
| 5 μM | $5.1 \times 10^6$ | 7.3 nm |
| 10 μM | $5.2 \times 10^6$ | 6.5 nm |

Figure 1F:
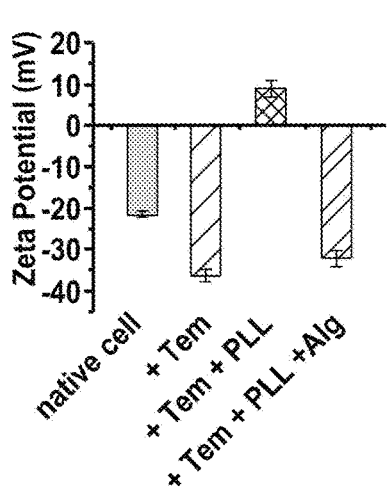
Figure 1G:
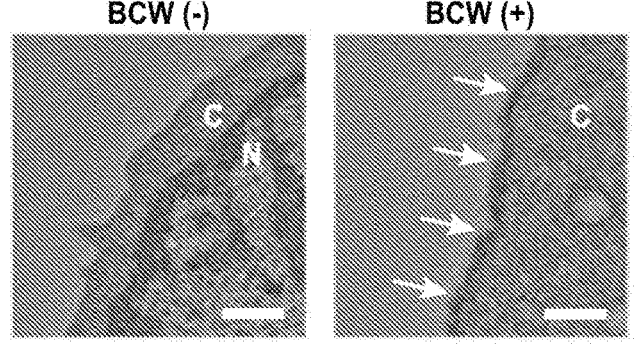

The surface charge of the cells was examined during the synthesis of BCW. The negative zeta potential of the cells was decreased by 72% after polymerization, further confirming the formation of the DNA template. Template-directed alginate-polylysine complexation reversed the zeta potential to +9 mV (FIG. 1F). The cell surface was also examined using transmission electron microscopy. The images confirm that the DNA-templated alginate-polylysine complexation led to the formation BCW on the cell membrane (FIG. 1G). Notably, the thickness of BCW is at the level of 100 nm, giving an ultralow polymer-to-cell ratio. It makes this method fundamentally different from other methods that need hydrogels of several hundred microns as a cell cover (Lim and Sun, 1980, Science, 210:908-910). Such a thick hydrogel cover is associated with problems such as poor molecular transport and high occupancy volume.

After demonstrating the formation of BCW on mammalian cells, the effect of BCW on cell viability was studied. The inability to maintain high cell viability is a major reason for the failure of many traditional methods for cell engineering or protection. For instance, the direct deposition of cationic polymers on the naked cell membrane is well-known to cause high cytotoxicity (Fischer et al., 2003, Biomaterials, 24:1121-1131). In this method, a framing template was synthesized on the cell membrane before the treatment of cells with polylysine. Polylysine would mainly react with DNA-templated alginate, sparing the plasma membrane of cells. Moreover, the entire procedure of BCW formation did not involve any harsh conditions. Thus, high cell viability maintained after the synthesis of BCW (FIG. 13A).

Figures 13A, 13B, 13C, 13D, 13E, 13F:
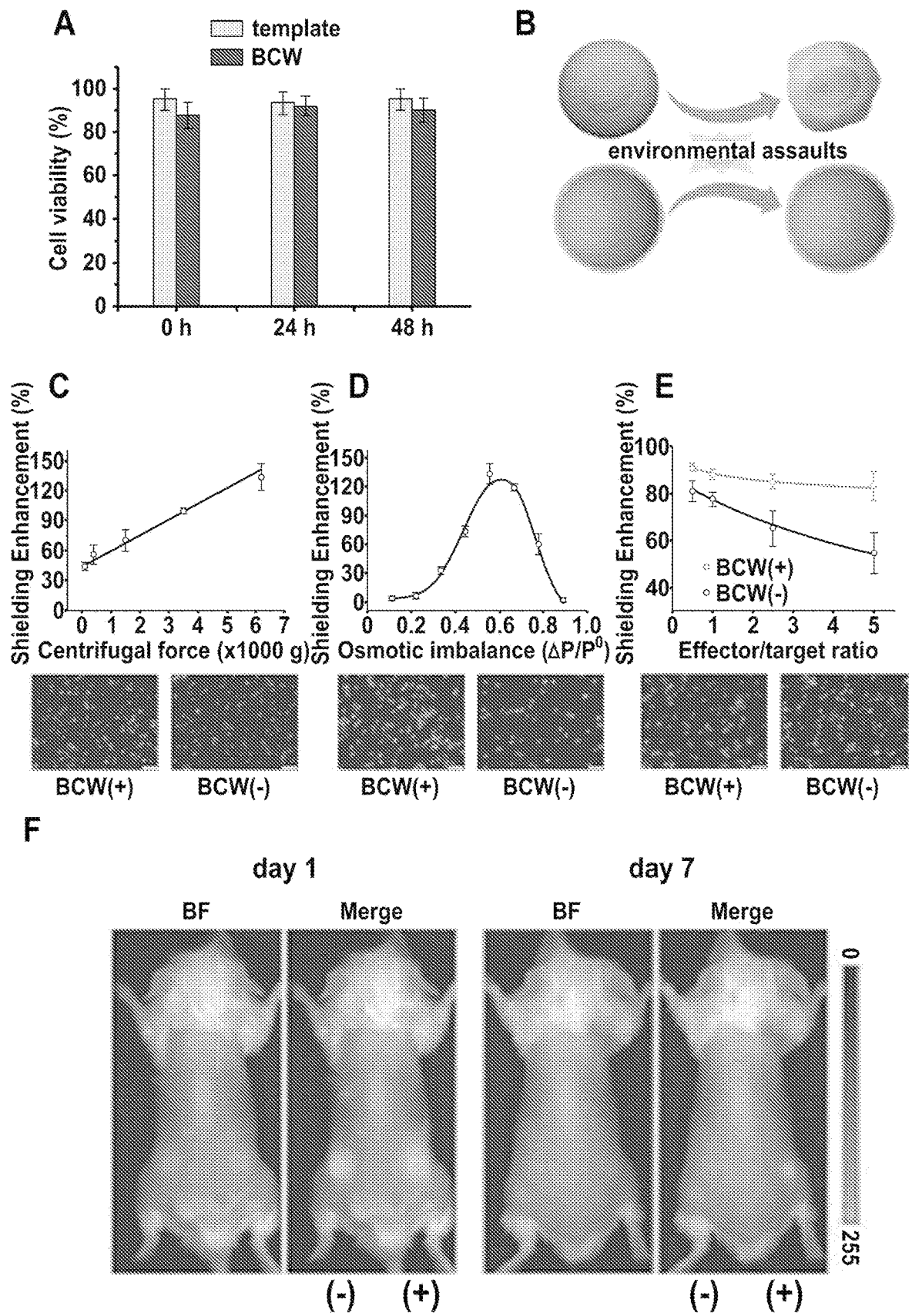
Figure 15:
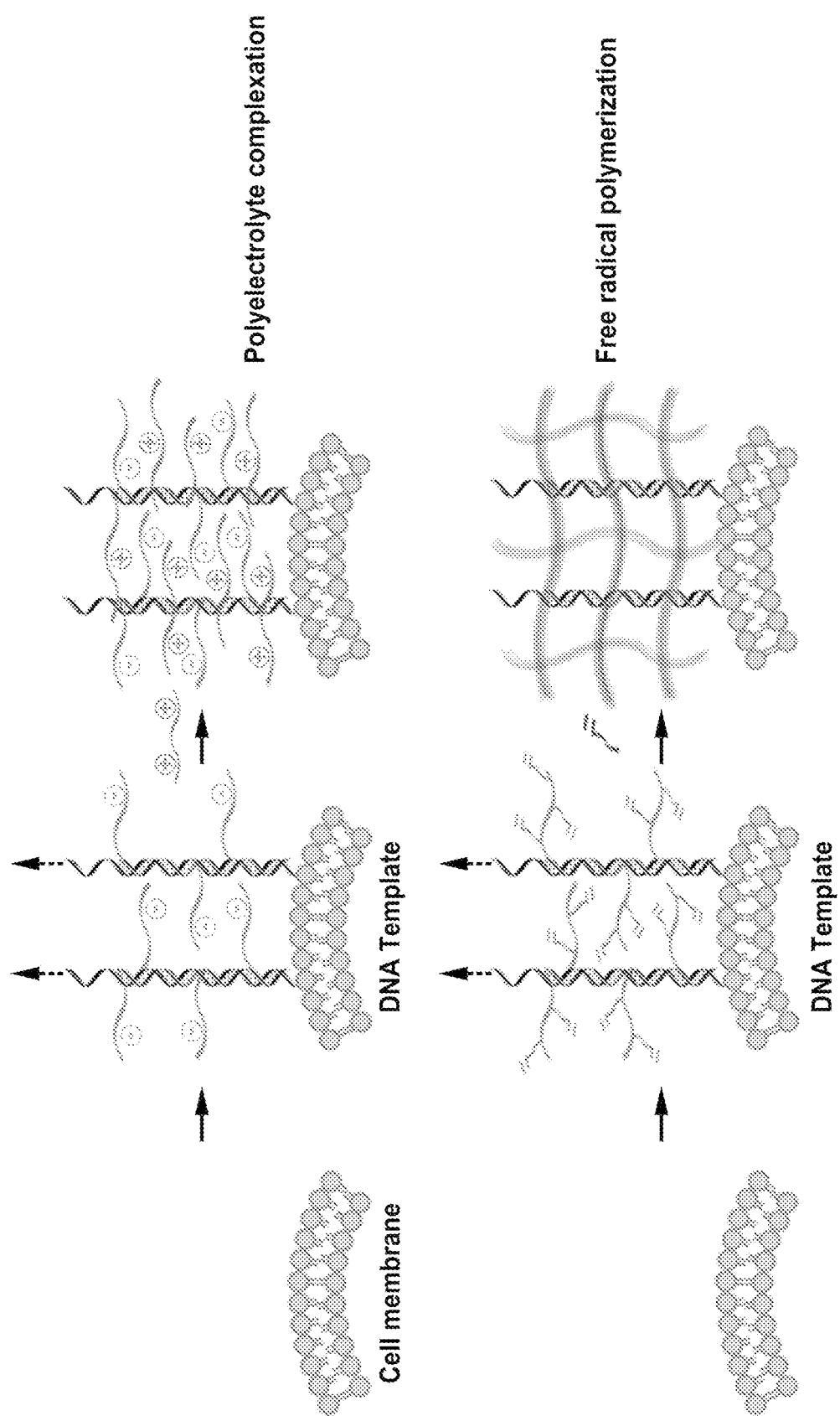
FIG. 15 depicts a schematic diagram demonstrating three different methods that can be employed to synthesize BCW.
Figure 17:
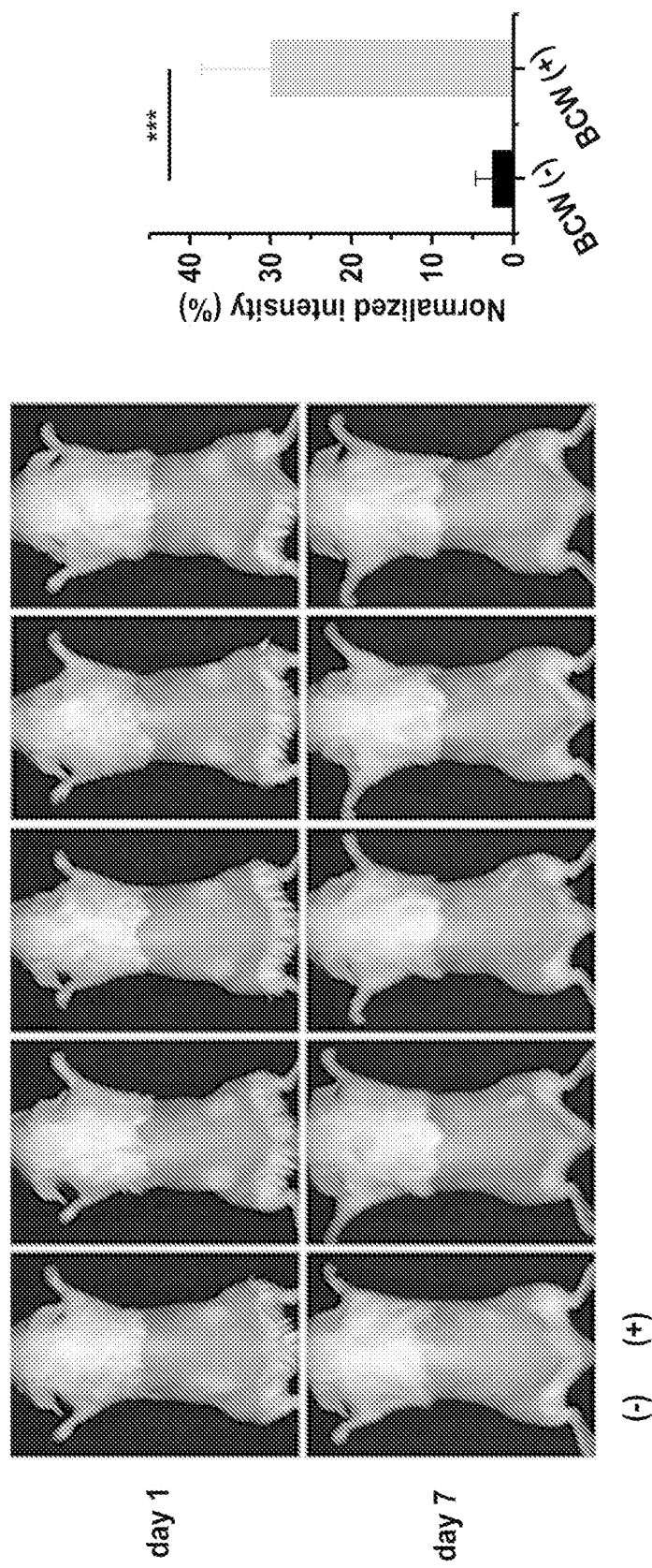
FIG. 17 shows examination of MSC survival after subcutaneous cell transplantation. Human bone marrow MSCs expressed red fluorescence protein (RFP). ***, P<0.001.

Finally, experiments were performed to examine whether BCW would shield mammalian cells from environmental assaults (FIG. 13B). Reiterative centrifugation and osmotic imbalance were used as physical assaults. Naked cells were highly sensitive to centrifugation. For instance, when the centrifugal force was as low as 110 g, over 30% of the cells lost cell viability after five cycles of centrifugation. By contrast, approximately 85% of the cells could maintain viability even though the centrifugal force was increased over 6,000 g (FIG. 14). Notably, the shielding enhancement increased linearly with the centrifugal force (FIG. 13C). The effect of osmotic imbalance on the cell viability was also examined. The shielding enhancement-osmotic imbalance relationship exhibits a bell curve (FIG. 13D). The shielding enhancement was over 100% with the osmotic imbalance varied in the range from 0.5 to 0.7, showing that BCW could significantly enhance the integrity and viability of the cells exposed to an imbalanced osmotic pressure (FIG. 13D and Table 3). In addition to the two physical assaults, cell viability was also studied after the cells were exposed to biological assaults using both in vitro and in vivo assays. In the in vitro assay, a natural killer cell line (NK-92MI) was used to attack BCW-covered cells. The results show that BCW can protect the cells. For instance, when the effector/target ratio was 5:1, ~50% of target cells were killed whereas ~85% of BCW-covered cells could maintain viability (FIG. 13E). Consistent with the results of in vitro cell protection, the BCW-covered bone marrow mesenchymal stem cells (MSCs) could be detected at day 7 after transplantation into mice whereas the naked cells virtually disappeared (FIG. 13F). In the next experiment, human bone marrow MSCs expressing red fluorescence protein (RFP; Mw: 27 kDa) with fibrin hydrogel (Fn) were subcutaneously injected into the immunocompetent mice. As foreign cells in the host, human bone marrow MSCs are attacked by the murine immune system. As shown in FIG. 17, while MSCs were detected at day 1, the cells were barely detected in the mice transplanted with naked MSCs (i.e., without BCW) at day 7. The RFP signal intensity in the transplantation site was nearly the same as that of the background. By contrast, the data show that 30% of BCW-covered MSCs can still survive at day 7 (FIG. 17). This sharp difference between the BCW (+) and BCW (−) groups strongly supports that BCW has the ability to protect human bone marrow MSCs in the murine in vivo environment for better and prolonged MSC survival.

As MSCs have the ability to stimulate the growth of blood vessels, the blood vessels in the transplantation site were stained. Consistent with the analysis of the whole mouse imaging, BCW-covered MSCs induced the growth of more blood vessels than the naked MSCs (FIG. 13G). Taken together, these data demonstrate that BCW holds great potential to shield mammalian cells from environmental assaults.

Table 3: Effect of osmotic imbalance on the viability of cells covered with or without BCW. For the clear legibility of shielding enhancement, the middle groups were highlighted with red.

| Osmotic imbalance ($\Delta P/P0$) | Cell viability (%) | |
|---|---|---|
| | BCW(+) | BCW(−) |
| 1/9 | 98.6 ± 0.05 | 95.4 ± 0.6 |
| 2/9 | 97.5 ± 4.2 | 92.0 ± 2.8 |
| 3/9 | 79.0 ± 1.7 | 60.3 ± 2.6 |
| 4/9 | 69.0 ± 1.9 | 38.8 ± 0.2 |
| 5/9 | 50.0 ± 3.1 | 21.8 ± 5.2 |
| 6/9 | 37.6 ± 0.5 | 17.1 ± 1.7 |
| 7/9 | 11.3 ± 4.9 | 7.0 ± 2.0 |
| 8/9 | 5.9 ± 0.9 | 5.8 ± 1.8 |

Different from dissociated MSCs, MSC spheroids form close cell-cell attachment internally and, in principle, do not need external attachment to a tissue or a substrate for survival. Accordingly, BCW can prolong the aggregation state of MSC spheroids for better MSC survival in comparison with dissociated MSCs with BCW and naked MSC spheroids.

Exogenous signaling molecules for promoting the survival of MSC spheroids. MSC spheroids (FIG. 18A) by suspending MSCs in an ultra-low adherent plate. Cell staining (FIG. 18B) indicated that MSC spheroids remained undifferentiated after the formation of spheroids. As MSCs can release various growth factors, different growth factors were measured using ELISA. The results for vascular endothelial growth factor (VEGF) and platelet-derived growth factor-BB (PDGF-BB) are shown in FIG. 18C. MSC spheroids secreted much more VEGF than those dissociated MSCs under the monolayer culture. Both MSC spheroids and dissociated MSCs secreted much less PDGF-BB. Notably, VEGF secreted by MSCs can stimulate neighboring cells (e.g., endothelial cells) via paracrine signaling and PDGF is a principle survival factor that inhibits the apoptosis of various cell types.

Figures 19A, 19B, 19C:
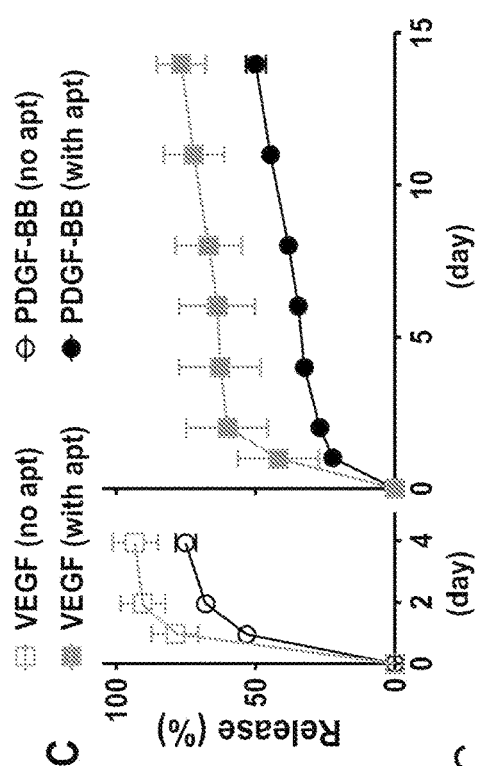
FIGS. 19A-19C show aptamer-functionalized Fn hydrogels (aFn) for controlled release of VEGF and PDGF-BB.

Next, aptamer (apt) was applied to functionalize fibrin hydrogel (Fn) to control the release of VEGF or PDGF-BB. Aptamer-functionalized Fn hydrogels (aFn) exhibited the structure of a crosslinked mesh with threads (FIG. 19A). Aptamer incorporation was confirmed using a FAM-labeled complementary sequence to stain the aptamer (FIG. 19B). The growth factors were released more rapidly from the native Fn than from aFn (FIG. 19C). These data clearly demonstrate that aFn can be used to control the release of exogenous signaling molecules.

The survival of dissociated MSCs and MSC spheroids was tested cultured in aFn. Without VEGF or PDGF-BB, both dissociated MSCs and MSC spheroids died under hypoxic conditions (FIG. 20A). However, the number of live MSCs in the spheroids was 60% higher than that of dissociated MSCs. It indicates that MSC spheroids are superior to dissociated MSCs in maintaining MSC survival. Further evaluation was done the effect of VEGF and PDGF-BB on the survival of MSC spheroids. Their concentration in aFn was 50 ng/mL. The results show that VEGF and PDGF-BB exhibited a big difference in promoting MSC survival. Under the same culture condition, PDGF-BB nearly doubled the survival rate of MSCs compared with the "no GF" control (FIG. 20B). These results clearly show that PDGF-BB is more effective than VEGF in promoting the survival of MSC spheroids. As MSCs and MSC spheroids secret a very low level of PDGF-BB (FIG. 18C), PDGF-BB can be used as a promising exogenous signaling molecule for further promoting the survival of MSC spheroids and MSCs.

Together, BCW promotes the survival of MSC spheroids and BCW and PDGF-BB synergistically promote the survival of MSC spheroids and the release of signaling molecules.

Example 2: DNA-Templated Synthesis of Biomimetic Cell Wall for Nanoencapsulation and Protection of Mammalian Cells DNA Template-Directed Polymer Assembly and Crosslinking.

Figures 2A, 2B:
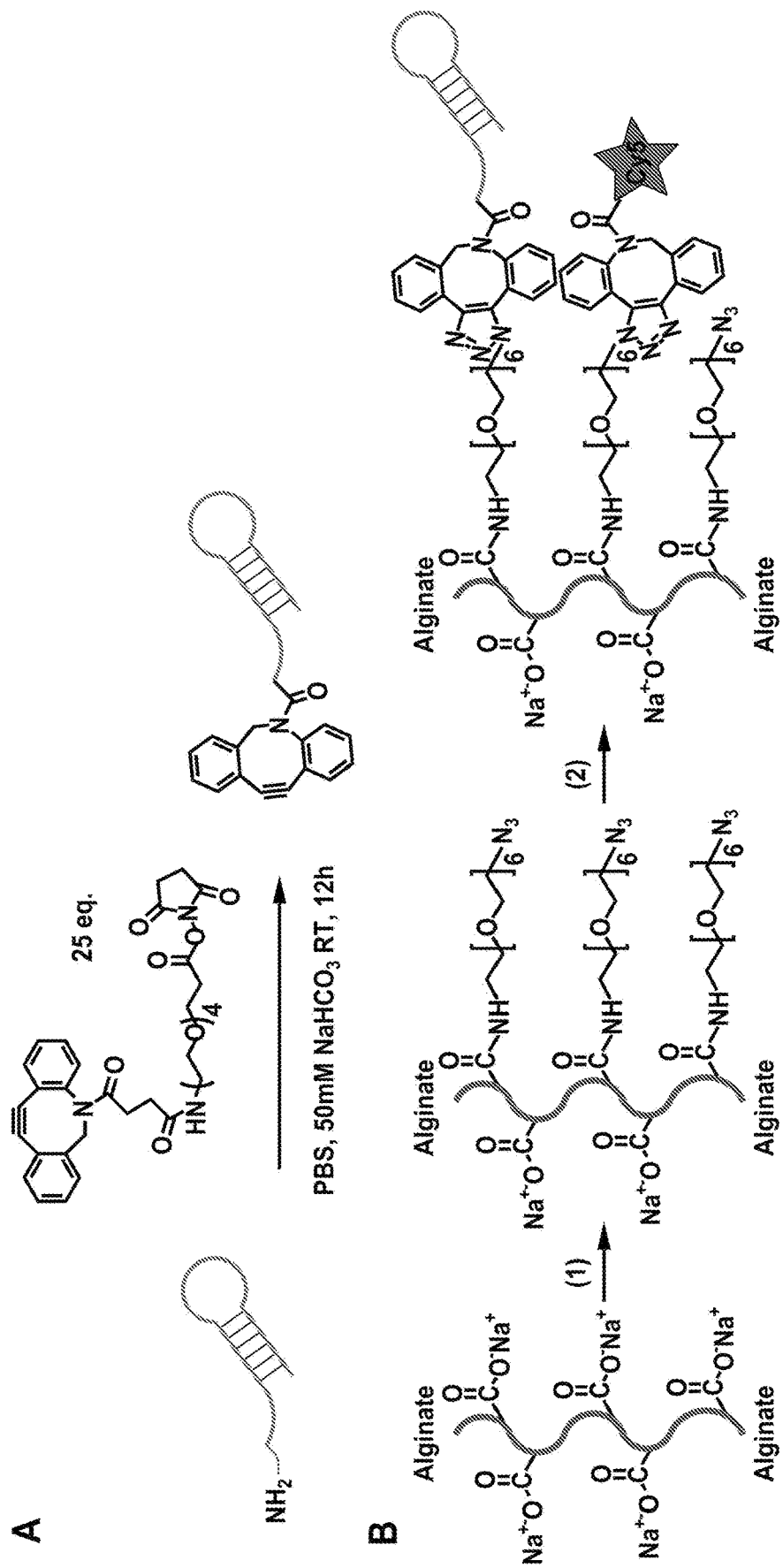
FIGS. 2A-2B depict the synthesis of alginate-DM2 macromer.
Figure 3A:
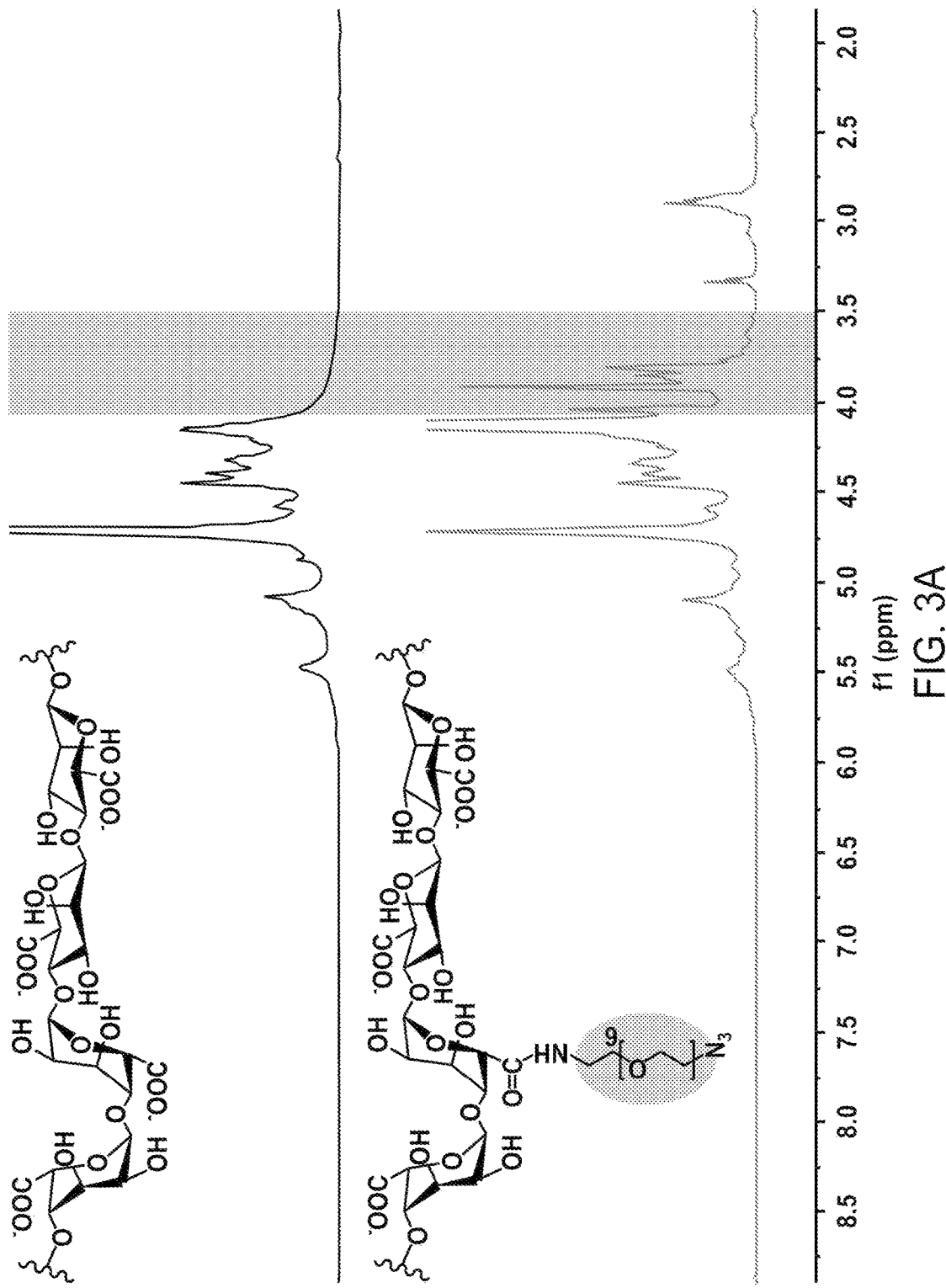

Alginate and DNA were conjugated to synthesize the alginate-DNA macromer using copper-free click chemistry (FIGS. 2A-2B). After conjugation, this macromer was characterized using UV spectroscopy and gel electrophoresis. The results demonstrate that these two polymers can be conjugated to form a hybrid macromer (FIGS. 3A-3C). However, as alginate and DM2 are both negatively charged, the presence of alginate in the macromer repelled intermolecular DM1-DM2 hybridization during HCR. Moreover, as alginate was conjugated with DM2, alginate can affect DM1-DM2 hybridization due to steric hindrance. Thus, it is important to examine whether two DNA hairpins can maintain the ability of hybridization for polymerization. The gel image (FIGS. 4A-4B) shows that DM1 and alginate-DM2 can polymerize, indicating that steric hindrance and charge interactions did not significantly affect HCR. Notably, as alginate was conjugated to DM2, the result also shows that the polymerization of the two DNA hairpins led to alginate assembly during the polymerization.

Further examination was done on the polymerization of DM1 and alginate-DM2 on the DNA initiator-coated particles. Specifically, streptavidin-coated particles were sequentially treated with biotinylated DNA initiators and the solution of DM1 and alginate-DM2. The analysis of dynamic light scattering (DLS) showed that the radius of the particles was increased by ~140 nm (FIGS. 5A-5B). As the calculated length of one pair of DM1 and DM2 is approximately 16 nm, the increase of the particle size demonstrated that the polymerization of DM1 and alginate-DM2 led to the formation of the supramolecular DNA polymer, and more importantly that this supramolecular polymer functioned as a template to direct alginate assembly. Consistent with the DLS characterization, the zeta potential of the particles was decreased by ~70% owing to the increased density of negative charges on the particle surface (FIGS. 5A-5B).

As alginate assembled during the formation of the supramolecular DNA template, the template can further function as a framing structure to direct alginate-polylysine crosslinking. Indeed, the treatment of the template-covered particles with polylysine led to an increase of the diameter and the reversal of the zeta potential (FIG. 5B). As alginate and polylysine were fluorescently labeled, the particle suspension was also imaged. The imaging analysis of the particle suspension is consistent with the measurements of size and zeta potential (FIG. 1B). These results further demonstrate that the supramolecular DNA template can form on the particle surface and also importantly this template can direct molecular assembly and crosslinking of alginate and polylysine through polyelectrolyte complexation to form BCW.

As BCW is exposed to biological fluids in potential applications, template- or BCW-coated particles were incubated in serum to examine the stability of the template and BCW with flow cytometry. Based on the examination of the fluorescence signal of Cy5-conjugated alginate, the template-covered particles lost over 80% of fluorescence intensity within the first two days (FIG. 1C). By contrast, the BCW-covered ones maintained high fluorescence intensity during the two-week incubation after the initial decrease by 5 to 10% (FIG. 1C). The signal of FAM-labeled DM1 in the template also quickly decreased (FIG. 23). However, while the signal of DM1 in BCW decreased, this decrease was much slower than that in the template. This observation is reasonable as the template is an uncrosslinked open system whereas BCW has the crosslinked alginate-polylysine complexes. The data also show that while the signal of DM1 in BCW was close to the background level in one week (FIG. 23), the signal of alginate in BCW can be maintained over 90% (FIG. 1C). These data indicate that while the DNA template by itself or in BCW is degradable in biological fluids, the crosslinked alginate-polylysine cover once formed has high stability. The degradation of the DNA template after the construction of BCW can be beneficial to reduce potential inflammatory response caused by the interaction of DNA and toll-like receptors if BCW-covered cells are used for in vivo cell transplantation.

Synthesis of BCW on Mammalian Cells.

Whether this method is effective in synthesizing BCW on the plasma membrane of live mammalian cells was studied using the CCRF-CEM cell line as the primary cell model. Cholesterol-conjugated DNA initiators were immobilized on the cell membrane through the insertion of cholesterol into the lipid bilayer. This insertion was sufficient for the immobilization of DNA initiators and the initiation of HCR since membrane lipids are the major components in the plasma membrane. To examine the formation of the framing template on the cell surface (FIG. 16), flow cytometry was used to analyze the signals of DM1 and alginate-DM2. Both of these signals exhibited a sharp shift (FIG. 1D). Importantly, the comparison between the one-unit and template groups demonstrates the success of DNA polymerization for the formation of the framing template on live cells (FIG. 1D).

The effect of time on the formation of the framing template was studied the next. The results indicate that within 3 h, one DNA template can grow to the level of displaying approximately 10 alginate molecules (FIGS. 6B and 6C). The fluorescence imaging was consistent with the flow cytometry analysis, showing the strong signals of FAM and Cy5 localized on the cell membrane (FIGS. 1E and 6A).

Figure 25:
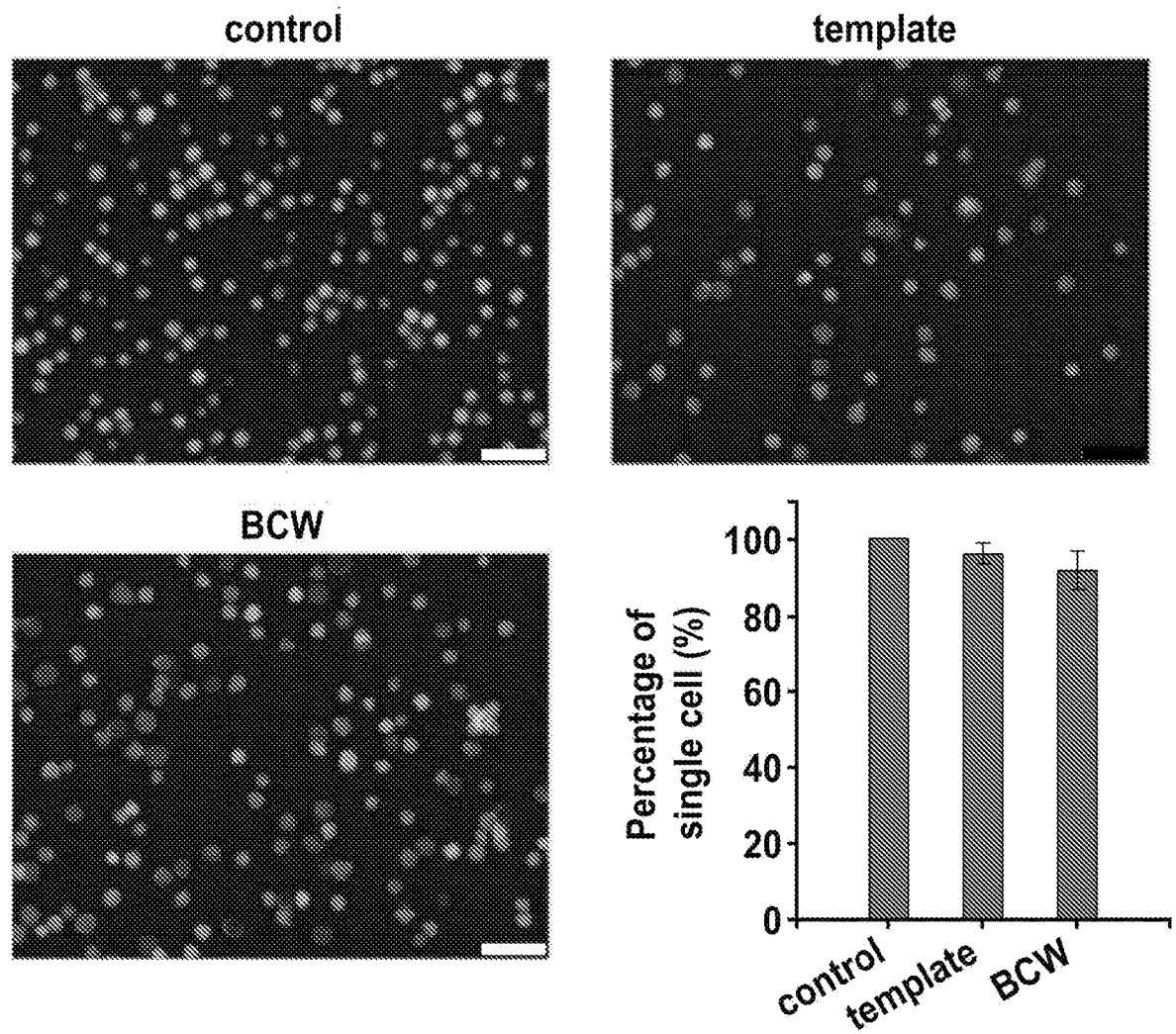
FIG. 25 shows fluorescence imaging for the examination of the yield of single cells. The cells were stained with Calcein-AM (green). Red: Alginate-Cy5. Scale bars: 50 Data are presented as mean±standard deviation as indicated by error bars (n=8). The images show that the construction of the template and BCW did not cause significant cell aggregation.

After demonstrating the formation of the template, whether this template can direct the formation of BCW on live cells was examined. The template-covered cells were incubated in the solution of Cy3-labeled polylysine for 1 minute before centrifugation. The fluorescence images clearly show the strong Cy3 signals on the cell surface (FIG. 16). Moreover, the same location on the cell membrane displayed the signals of three fluorescent labels for the DNA template, alginate and polylysine concomitantly (FIGS. 1E and 6A). It is also important to note that the fluorescence intensity inside the cells was minimal compared to that on the cell membrane (FIG. 1E and FIG. 24). These data clearly demonstrate that the template can direct alginate-polylysine crosslinking to form BCW on the cells, and that the cellular uptake of any molecule used for BCW synthesis was virtually negligible. The yield of single cells after the formation of BCW was further quantified. The percentage of single cells was over 90% (FIG. 25). It indicates that the majority of BCW-covered cells were separate with minimal cell aggregation.

Figure 26A:
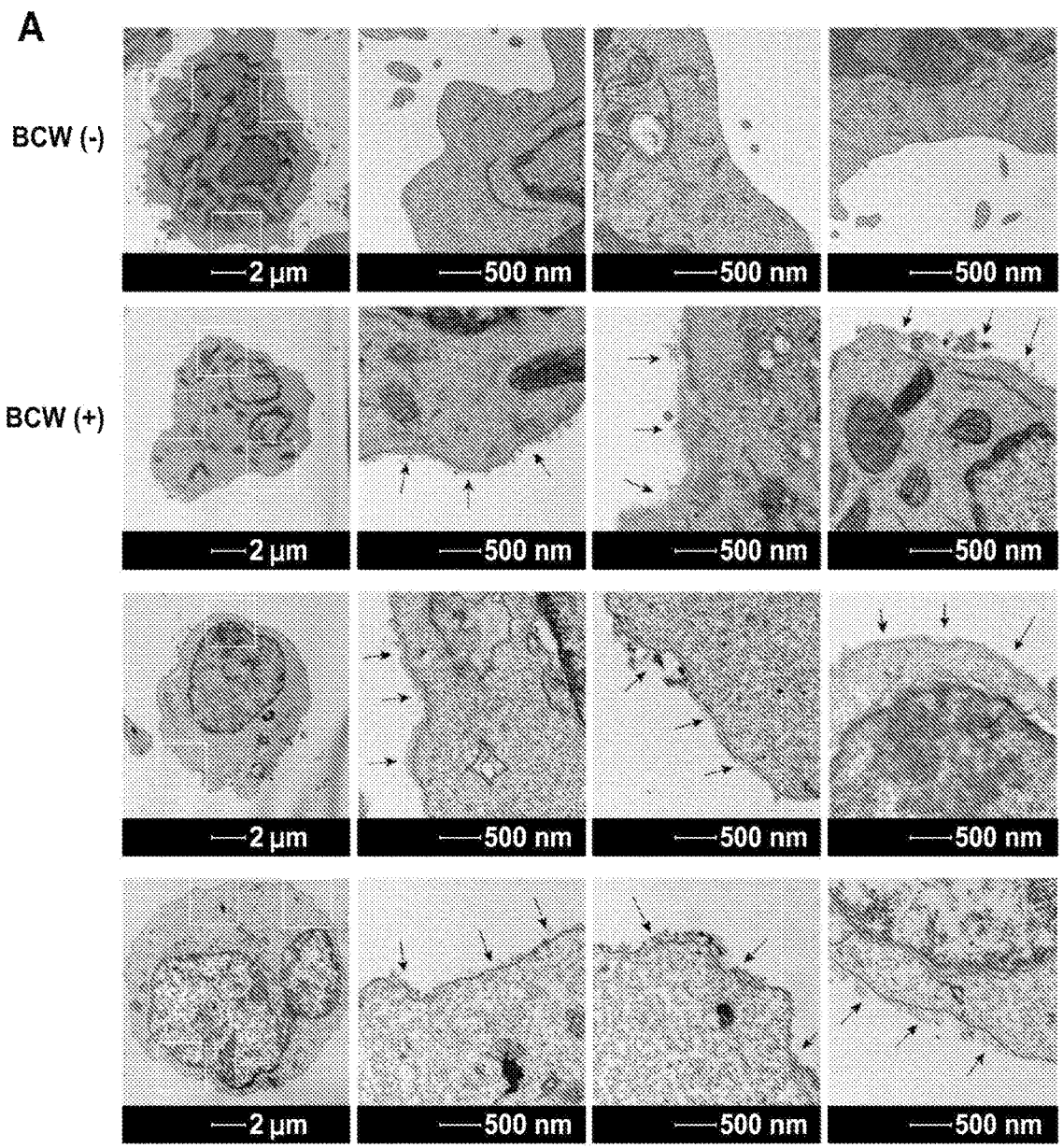
FIGS. 26A-26B show examination of BCW on the cell surface using the TEM (FIG. 26A) and STEM (FIG. 26B) modes. Three BCW-covered cells as labeled with BCW (+) were imaged using the TEM mode (FIG. 26A) and three locations for each cell were chosen for higher magnification. The scale bar is depicted at the bottom of each image. The arrows point to BCW.
Figure 26B:
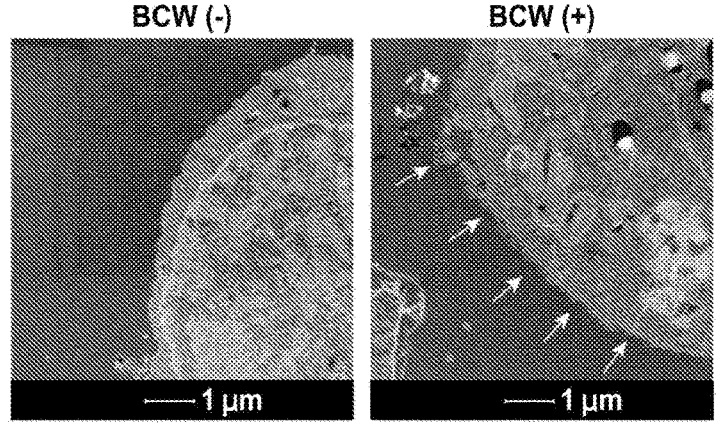

BCW was also examined using zeta potential and transmission electron microscopy (TEM). The negative zeta potential of the cells was decreased by 72% after the formation of the framing template (FIG. 1F). This negative zeta potential was reversed to 9 mV after template-directed alginate-polylysine complexation and a further treatment with alginate led to the reversal of the zeta potential (FIG. 1F). The TEM images indicate that the DNA-templated alginate-polylysine complexation led to the formation of BCW on the cell membrane with a thickness of approximately 70 to 150 nm (FIGS. 1G, 26A and 26B). The ultrathin BCW ensures an ultralow polymer-to-cell ratio. It makes this method fundamentally different from other methods that need hydrogels of several hundred microns to cover cells. Such a thick hydrogel cover is associated with problems such as poor molecular transport and high occupancy volume.

As the positively charged polylysine was directed to crosslink with the negatively charged alginate, one may suggest to directly cover the positively charged polylysine on the negatively charged cell surface. To address this potential concern and illustrate the advantage of the method shown herein, the cells were incubated in the solution of polylysine. The amount of polylysine on native cells was one order of magnitude lower than that of BCW (FIG. 9A). It is also important to note that the distribution of polylysine on the cell membrane was heterogeneous and significantly scattered with large gaps (FIG. 9B). Thus, while live cells can be directly treated with cationic polymers like polylysine, it is challenging to solve this problem of highly heterogeneous polymer distribution, let alone high cytotoxicity. In contrary, the current invention spares the negatively charged cell surface from this direct deposition of cationic polylysine. With this method, one can generate a negatively charged supramolecular template that is able to direct the complexation between polylysine and alginate.

Figure 10A:
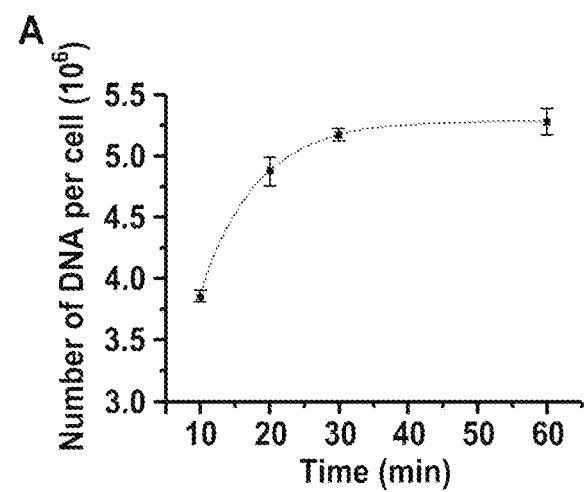
FIGS. 10A-10B depict the quantitation of DNA initiator (DI) on the cell surface.
Figure 10B:
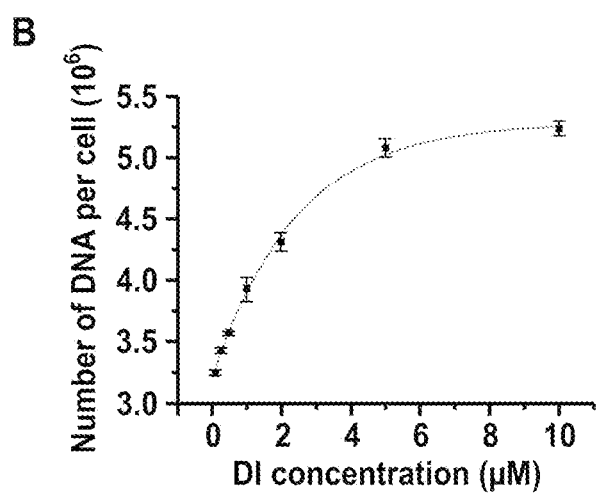
Figures 32, 33:
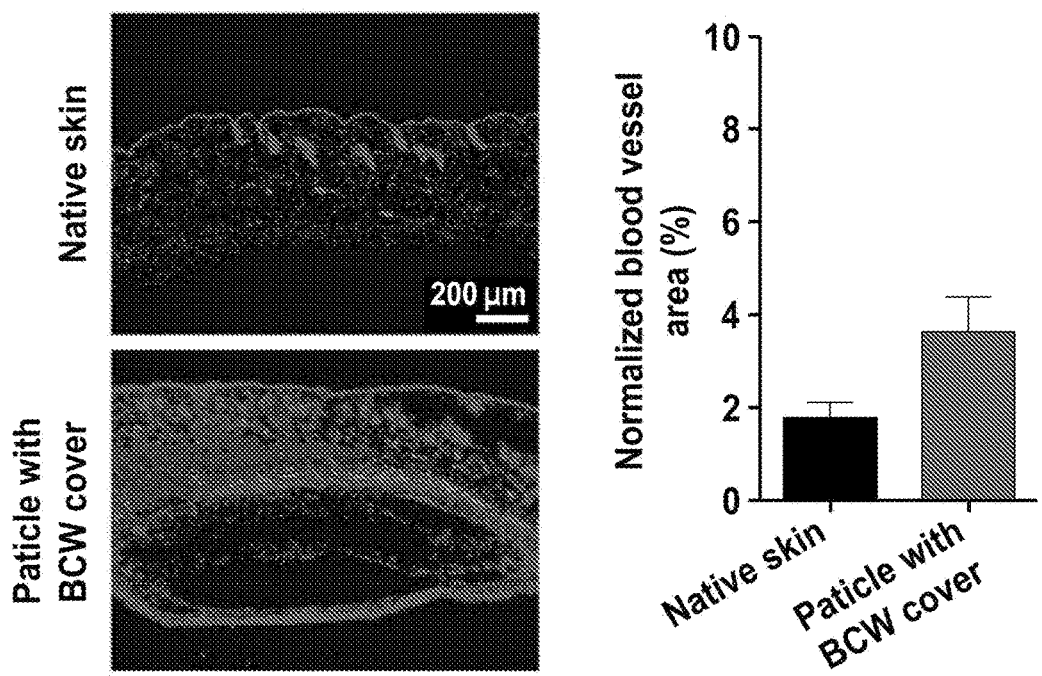
FIG. 32 shows examination of the effect of the alginate-polylysine matrix on angiogenesis. The particles were covered with the alginate-polylysine matrix and implanted subcutaneously. After 10 days, the tissues were collected and stained with the mouse-specific anti-CD31 antibody for the examination of blood vessels. Red: Anti-CD31. Blue: DAPI. Data are presented as mean±standard deviation as indicated by error bars (n=6).
FIG. 33 shows calculation of the average distance between two adjacent DNA templates. The distance was calculated using the imdistline matlab function. 10 pairs of adjacent dots were randomly chosen to calculate the average distance. Specifically, the cell was assumed as a sphere with a radius of 6 μm to calculate the total surface area of a cell. As one DNA initiator was assumed to induce the formation of one DNA template, we got N templates randomly distributed on the cell surface. One dot represented one DNA initiator or template. Thus, N dots represented how many DNA initiators or templates were distributed onto the surface area of a cell in the calculation.

To further examine the effectiveness of our method in producing BCW, we quantified the amount of DNA initiators on the cell surface. This amount increased with the incubation time and the concentration (FIGS. 10A-10B). When the cells were incubated in the solution with 1 µM of DNA initiator, the surface of one cell displayed approximately 4×10$^6$ DNA initiators. Supposed that each DNA initiator formed one template, the average distance between two DNA templates was 8.2 nm (FIG. 33). Considering that the DNA template was approximately 140 nm in height (FIG. 11) and 68 nm in hydrodynamic diameter (FIG. 12), the whole cell surface can be adequately covered by supramolecular DNA templates for the alginate-polylysine complexation in the synthesis of BCW.

Figure 27A:
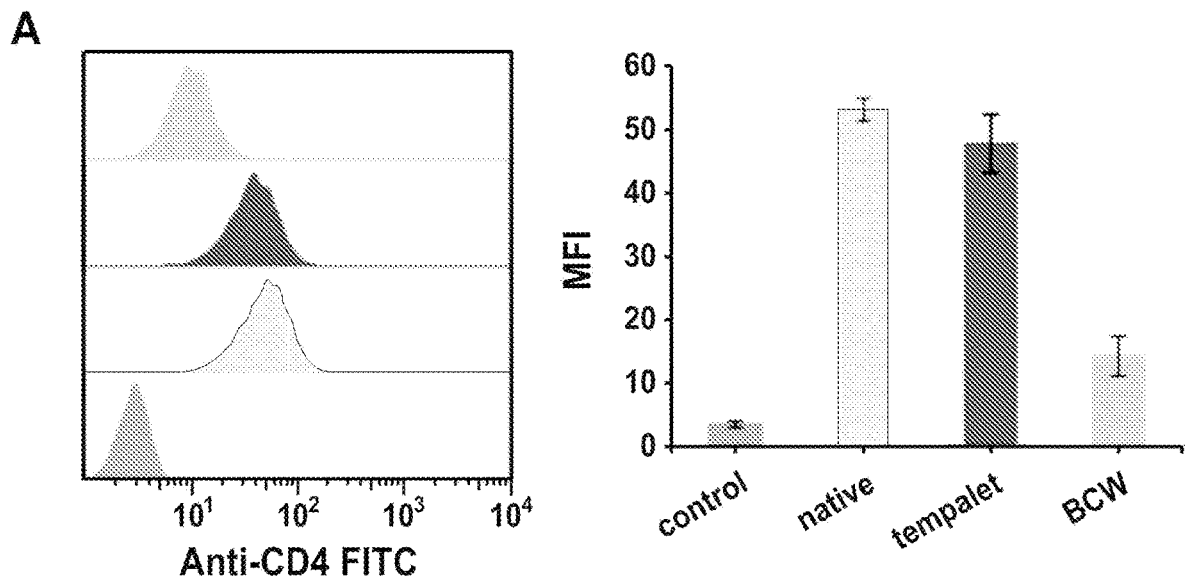
FIGS. 27A-27B show examination of antibody transport across BCW. Flow cytometry analysis (FIG. 27A) and fluorescence imaging (FIG. 27B) of CCRF-CEM cells covered with or without BCW. Green: Anti-CD4-FITC. Blue: DAPI. Scale bars: 50 Data are presented as mean±standard deviation as indicated by error bars (n=3).
Figure 27B:
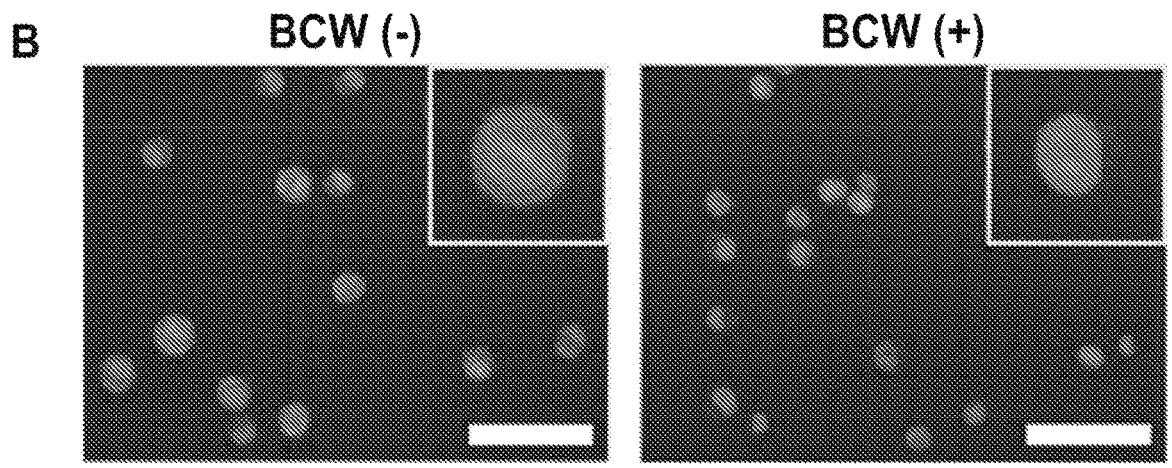
Figures 28A, 28B:
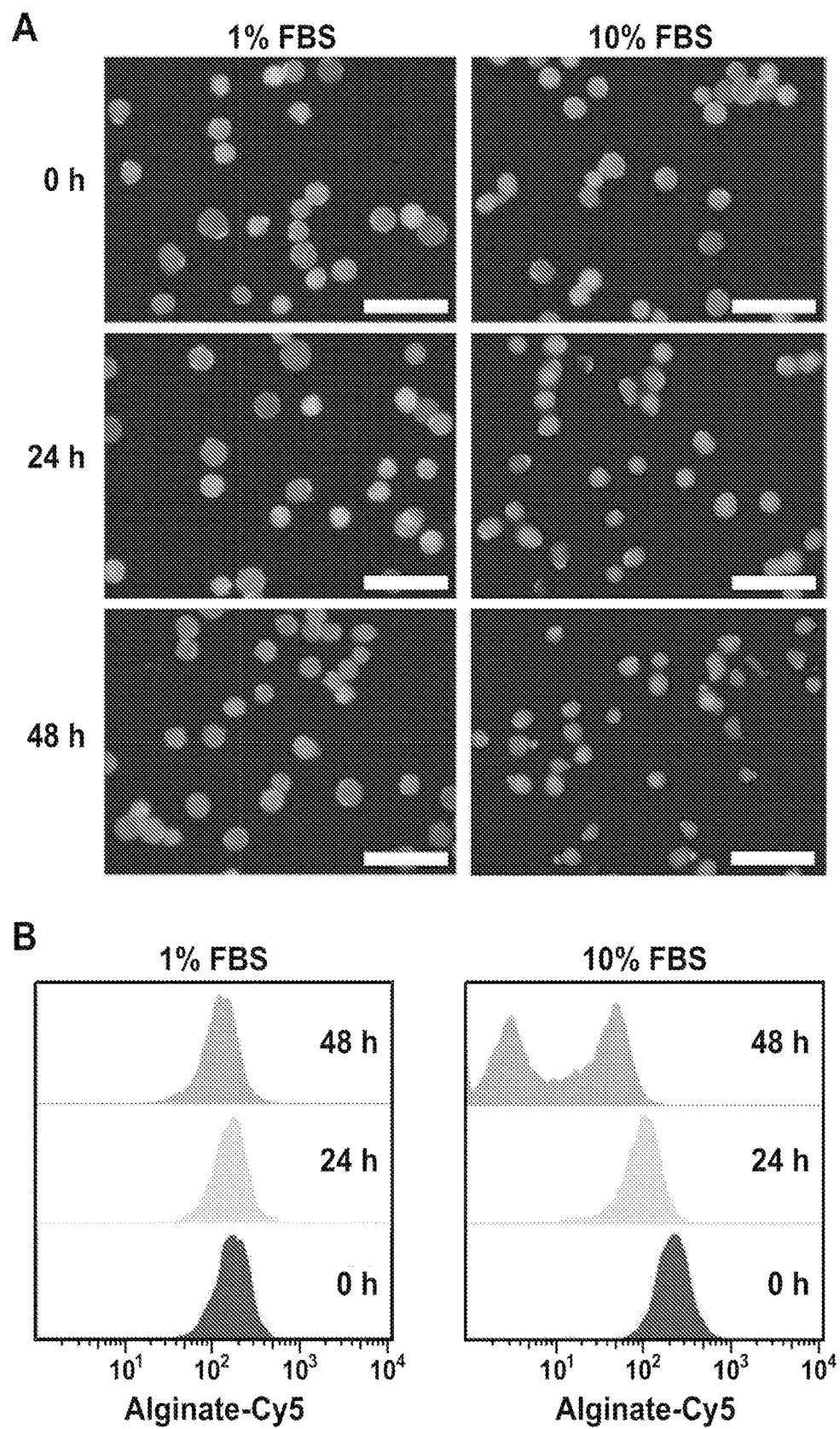
FIGS. 28A-28B show examination of the stability of BCW on CCRF-CEM cells. The cells were cultured in the cell culture media supplemented with 1% or 10% FBS and examined at different time points using fluorescence microscopy (FIG. 28A) and flow cytometry (FIG. 28B). Green: Calcein-AM; Red: Alginate-Cy5. Scale bars: 50 μm.

Molecular transport across BCW and the stability of BCW on the cell surface was also characterized. Molecular transport was examined by incubating cells in the solution of FITC-labeled anti-CD4 antibody that can recognize and bind CCRF-CEM cells. The data show that while BCW was permeable to the antibody, it significantly blocked antibody transport in comparison to the template or the naked cell membrane (FIGS. 27A and 27B). The stability was examined in two situations. One group of BCW-covered cells were cultured in a normal culture medium (10% FBS), and the other group of BCW-covered cells were cultured in a reduced-serum medium (1% FBS). With the treatment of 10% FBS, the fluorescence intensity of BCW on the cell surface decreased after 24 and 48 h (FIGS. 28A and 28B). With the treatment of 1% FBS, the fluorescence intensity of BCW on the cell surface barely changed during the 48 h culture (FIGS. 28A and 28B). As CCRF-CEM cells are divided faster in 10% FBS than in 1% FBS, these data indicate that BCW had high stability against enzymatic degradation, and that BCW-covered cells could maintain their normal capability of cell proliferation. Moreover, as the signal of alginate-Cy5 primarily came from the surface rather than the inside of the cells, the data suggest that BCW was not internalized during the procedures of BCW construction and cell culture.

After the synthesis and characterization of BCW on CCRF-CEM cells, we further synthesized BCW on the membrane of additional four types of live mammalian cells using the exactly same protocol. BCW successfully formed on the cell membrane in all cases (FIGS. 7 and 8). Together, the data demonstrate that DNA-templated molecular assembly and crosslinking is an effective, universal method for the synthesis of BCW on the plasma membrane of live mammalian cells.

Evaluation of Shielding Effectiveness.

Figures 29A, 29B:
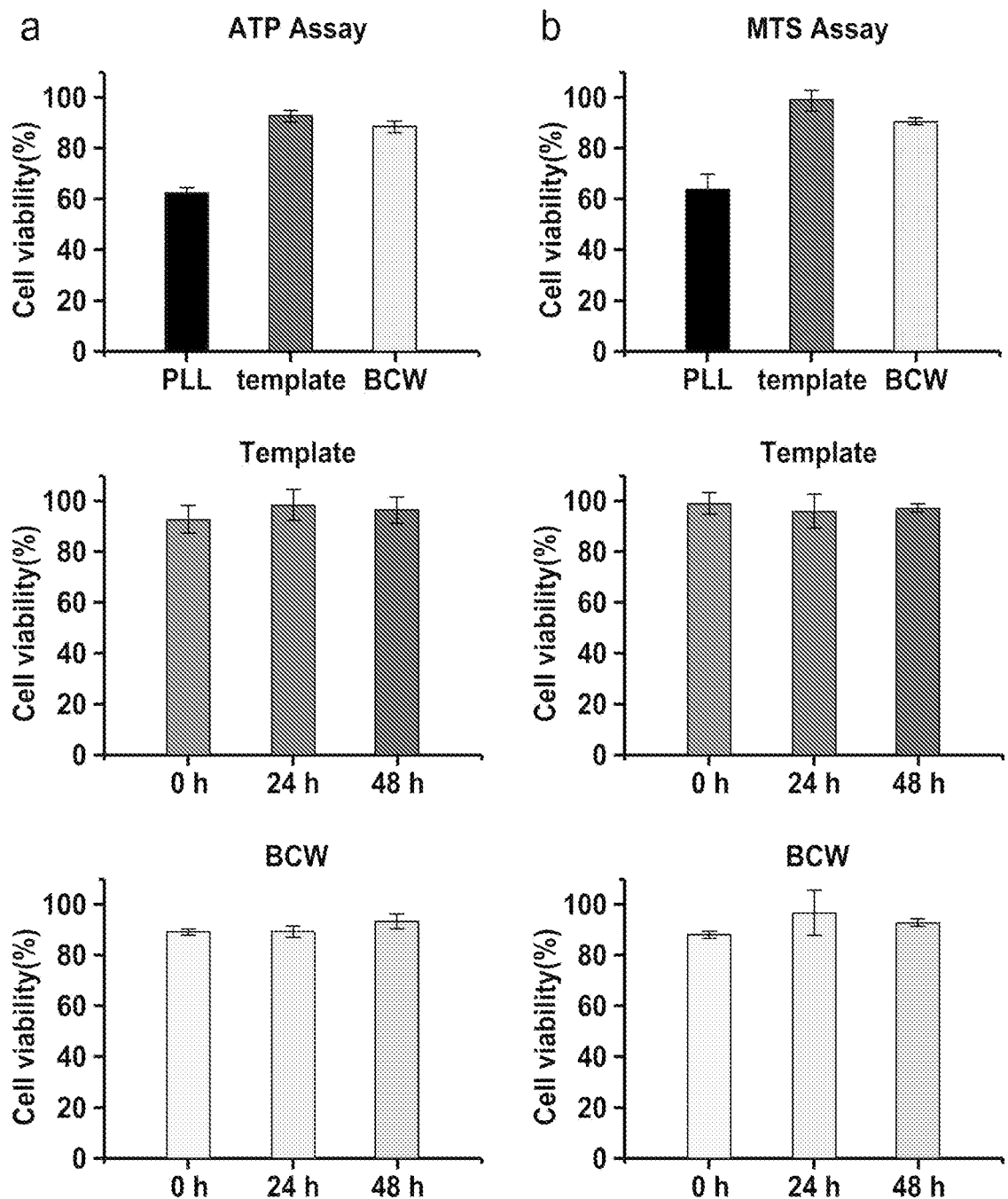
FIGS. 29A-29B show examination of cell viability during and after the construction of the template and BCW. Cell viability was analyzed using ATP (FIG. 29A) and MTS (FIG. 29B) assays. The native cells were used as 100%. The cells were also exposed to polylysine for comparison. Data are presented as mean±standard deviation as indicated by error bars (n=3).

After demonstrating the formation of BCW on mammalian cells, the effect of BCW on cell viability was studied. The inability to maintain high cell viability is a major reason for the failure of many traditional methods for cell surface engineering and/or shielding. For instance, the direct deposition of cationic polymers on the naked cell membrane is well-known to cause high cytotoxicity. In the method disclosed herein, a framing template was synthesized on the cell membrane before the treatment of cells with polylysine. Polylysine mainly react with DNA-templated alginate, sparing the plasma membrane of cells. Moreover, the entire procedure of BCW formation did not involve any harsh conditions. Indeed BCW-covered cells can maintain much higher viability than those naked cells directly exposed to polylysine (FIG. 13A and FIGS. 29A-29B).

As BCW was developed for cell protection, the effectiveness of BCW in shielding mammalian cells from physical and biological assaults was examined (FIG. 13B). Reiterative centrifugation and osmotic imbalance were used as physical assaults. The results show that naked cells were highly sensitive to centrifugation (FIG. 14). For instance, when the centrifugal force was as low as 110 g, over 30% of the cells lost cell viability during the procedure of cyclic washing and centrifugation. By contrast, even though the centrifugal force was increased over 6,000 g, approximately 85% of the cells could maintain viability (FIG. 14). Thus, these data clearly demonstrate that BCW can shield live cells from the damage of centrifugation (FIG. 13C). The shielding enhancement increased linearly with the centrifugal force (FIG. 13C), indicating that live cells can be protected more effectively in a harsher centrifugation situation. The effect of osmotic imbalance on the cell viability was also examined. The shielding enhancement-osmotic imbalance relationship exhibits a bell curve (FIG. 13D). This relationship indicates that when the osmotic imbalance changed from 0.1 to 0.6, BCW was strong enough to protect the covered cells. With a further increase of the osmotic imbalance, BCW can still play the role of shielding the cells while this shielding effect started to weaken (FIG. 13D and FIG. 34).

Figure 30:
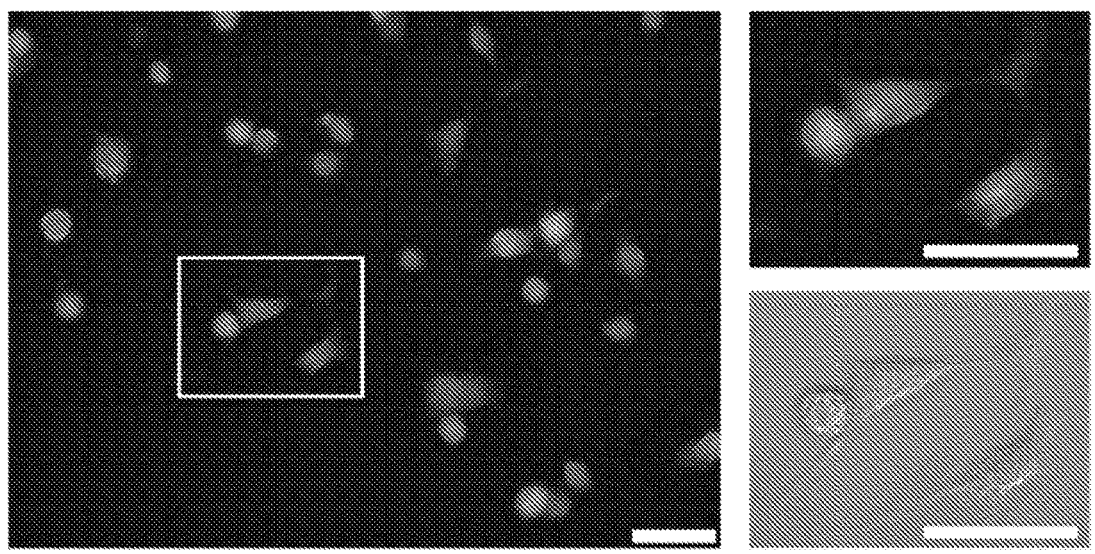
FIG. 30 shows fluorescence imaging of BCW-covered MSCs on the cell culture plate after 2-day culture. Green: Calcein-AM; Red: Alginate-Cy5. Scale bars: 50 μm.
Figure 31:
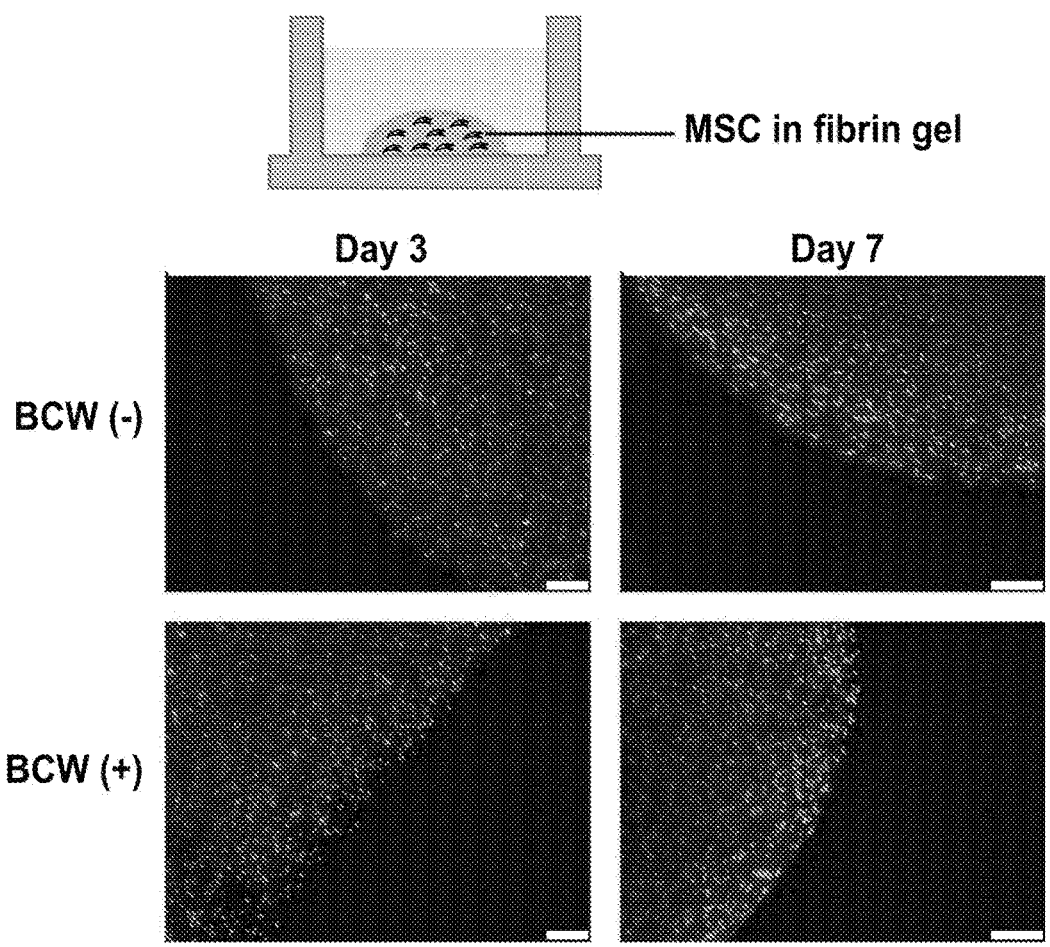
FIG. 31 shows examination of cell retention in fibrin gels. The results show that both BCW-covered and naked MSCs stayed within fibrin gels during the 7-day in vitro culture. Green: Calcein-AM. Scale bars: 200 μm.
Figures 35, 36:
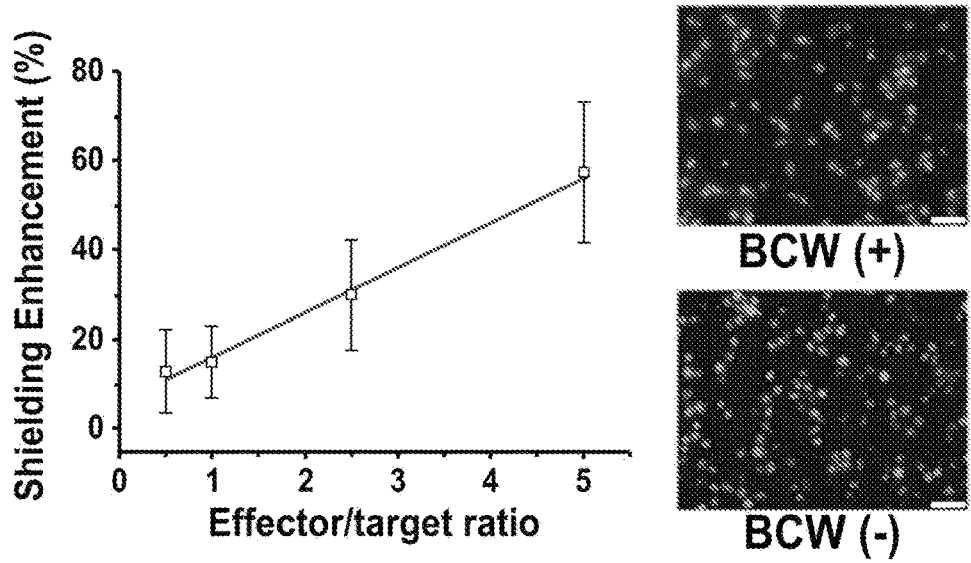
FIG. 35 shows effect of osmotic imbalance on the viability of cells covered with or without BCW. For the clear legibility of shielding enhancement, the middle groups were highlighted with red. Data were presented as mean±s.d, n=3.
FIG. 36 shows shielding enhancement-immune attack relationship. K562 and NK-92MI were used as target and effector cells, respectively. Representative images were taken at the 2.5:1 effector/target ratio. Green: CFSE. Red: dead cells. Scale bars: 50 μm. Data are presented as mean±standard deviation as indicated by error bars (n=3).

In addition to the two physical assaults, we also studied cell viability after the cells were exposed to biological assaults using both in vitro and in vivo assays. In the in vitro assay, a natural killer cell line (NK-92MI) was used to attack BCW-covered K562 cells. The results show that BCW enhanced the survival rate of the target cells from the assault of NK-92MI virtually linearly (FIG. 36 and FIG. 13E). For instance, when the effector/target ratio was 5:1, ~50% of target cells lost viability whereas ~85% of BCW-covered cells could maintain viability (FIG. 13E). In the in vivo assay, human bone marrow mesenchymal stem cells (MSCs) expressing red fluorescence protein (RFP) were subcutaneously transplanted into BALB/c mice. As foreign cells, human MSCs would be quickly destroyed in mice through the host immune response. As indicated by the signal of RFP, MSCs covered with (+) or without (−) BCW were initially detected. However, the RFP signal was barely detected in the mice transplanted with naked MSCs (i.e., no BCW) at day 7. In contrast, the RFP intensity maintained 30% in the mice transplanted with BCW-covered MSCs (FIG. 13F and FIG. 17). So the sharp difference strongly demonstrates that BCW can shield human MSCs from biological assaults in the in vivo environment. To better understanding this shielding effect, two in vitro experiments were also conducted. In the first one, BCW-covered MSCs were incubated in the cell culture plate. The results demonstrate that adherent MSCs maintain viability, break BCW and attach to the cell culture plate for proliferation (FIG. 30). In the second one, the fibrin hydrogel with MSCs was transferred into the cell culture plate. The results show that MSCs covered with or without BCW did not migrate from the fibrin hydrogel to the outside (FIG. 31), indicating that the disappearance of MSCs from the implantation site in mice did not result from MSC migration. As it is known that MSCs can induce the growth of blood vessels because of their ability of releasing angiogenic factors, in another in vivo assay, MSCs were transplanted into mice for examining angiogenesis. The tissues at the transplantation sites were collected and stained with a mouse-specific anti-CD31 antibody as CD31 is a typical endothelial cell biomarker. The data show that BCW-covered MSCs could stimulate more angiogenesis than the naked cells (FIG. 13G and FIG. 32). Taken together, both in vitro and in vivo data demonstrate that BCW can cover and shield mammalian cells from environmental assaults.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of generating a biomimetic cell wall (BCW) structure on a surface comprising generating polymerized oligonucleotide structures comprising at least two side groups linked to a molecule for crosslinking on the surface and crosslinking the molecule-linked side groups of the polymerized oligonucleotide structures, wherein the method of generating the polymerized oligonucleotide structures on the surface comprises the steps of:
   a) contacting a surface with a first initiator oligonucleotide molecule (DI), wherein the initiator oligonucleotide molecule comprises an oligonucleotide region which is not bound to the surface and a binding region which becomes bound to the surface;
   b) contacting the DI-bound surface with a first DNA monomer (DM), wherein the first DM comprises an oligonucleotide sequence complementary to a region of the DI and further comprises an oligonucleotide sequence that is not complementary to the DI, such that a portion of the DM hybridizes to the DI and a portion of the DM does not hybridize to the DI; and
   c) contacting the DI and the first DM-bound surface with a second DNA monomer (DM), wherein the second DM comprises an oligonucleotide sequence complementary to the region of the first DM which is not complementary to the DI and further comprises an oligonucleotide sequence that is identical to a nucleotide sequence of the DI, such that a portion of the second DM hybridizes to the first DM and a portion of the second DM serves as a DI to initiate a next round of hybridization; and wherein at least one of the first DM and the second DM is further linked to the molecule for crosslinking at the side group to form the polymerized oligonucleotide structure, providing that the linked molecule for crosslinking is conjugated to at least one of the second DM.

2. The method of claim 1, wherein the binding region of the DI comprises at least one of biotin, cholesterol-TEG, an antibody, a protein, a peptide, and a receptor ligand.

3. The method of claim 1, wherein a sequence of the DI comprises SEQ ID NO: 1.

4. The method of claim 1, wherein a sequence of the first DM comprises SEQ ID NO: 2.

5. The method of claim 1, wherein a sequence of the second DM comprises SEQ ID NO: 3.

6. The method of claim 1, wherein the molecule-linked side group is selected from the group consisting of a charged side group, a free-radical polymerizable side group and a chemically reactive side group.

7. The method of claim 6, wherein the molecule-linked side group is a charged side group and wherein the method of crosslinking comprises contacting the polymerized oligonucleotide structures with a composition comprising a charged molecule, wherein the charged molecule comprises an opposing charge to the charged side group.

8. The method of claim 7, wherein the charged side group is an anionic side group, and the method of crosslinking comprises contacting the polymerized oligonucleotide-structures with a composition comprising a polycationic molecule.

9. The method of claim 8, wherein the polycationic molecule is selected from the group consisting of polylysine, chitosan, polyornithine, a cationic cellulose derivative, a cationic polyacrylate, DEAE-Dextran and poly (dimethylaminoethyl methacrylate).

10. The method of claim 8, wherein the anionic side group comprises alginate and wherein the polycationic molecule is polylysine.

11. The method of claim 6, wherein the side group is a chemically reactive side group comprising at least one moiety capable of undergoing a cycloaddition reaction.

12. The method of claim 11, wherein the moiety capable of undergoing a cycloaddition reaction is selected from the group consisting of an azide and an alkyne moiety.

13. The method of claim 6, wherein the side group is capable of being crosslinked through free radical polymerization.

14. The method of claim 13, wherein the side group is photopolymerizable.

15. A BCW generated according to the method of claim 1.

16. A BCW comprising polymerized oligonucleotide-polymer structures having side groups that are crosslinked to form the BCW according to the method of claim 1.

17. A composition comprising a surface that has been coated with the BCW of claim 16.

18. The composition of claim 17, wherein the surface is selected from the group consisting of a cell surface, a tissue surface, and the surface of a biomedical device.

19. The composition of claim 17, wherein the surface comprises a therapeutic agent.

20. The composition of claim 19, wherein the therapeutic agent is selected from the group consisting of biodegradable microparticles or nanoparticles, and cells for administration to a subject in need thereof.

21. A method of inhibiting, reducing, decreasing and/or ameliorating a disease or disorder in a subject in need thereof comprising administering to the subject the composition of claim 19.

* * * * *

SEQUENCE LISTING

```
<160> NUMBER OF SEQ ID NOS: 3

<210> SEQ ID NO 1
<211> LENGTH: 34
<212> TYPE: DNA
<213> ORGANISM: Artificial Sequence
<220> FEATURE:
<223> OTHER INFORMATION: Synthetic Construct

<400> SEQUENCE: 1
cctcatccca ctcctaccta aaccaaaaaa aaaa                              34

<210> SEQ ID NO 2
<211> LENGTH: 48
<212> TYPE: DNA
<213> ORGANISM: Artificial Sequence
<220> FEATURE:
<223> OTHER INFORMATION: Synthetic Construct

<400> SEQUENCE: 2
ggtttaggta ggagtgggat gaggccaaat cctcatccca ctcctacc               48

<210> SEQ ID NO 3
<211> LENGTH: 53
<212> TYPE: DNA
```

```
<213> ORGANISM: Artificial Sequence
<220> FEATURE:
<223> OTHER INFORMATION: Synthetic Construct

<400> SEQUENCE: 3
aaaaacctca tcccactcct acctaaaccg gtaggagtgg gatgaggatt tgg        53
```